US012712686B2

(12) United States Patent
Park et al.

(10) Patent No.: US 12,712,686 B2
(45) Date of Patent: Aug. 18, 2026

(54) METHOD AND APPARATUS FOR TRANSMITTING OR RECEIVING BASED ON DISTRIBUTED RESOURCE UNIT TONE PLAN IN WIRELESS LAN SYSTEM

(71) Applicant: LG Electronics Inc., Seoul (KR)

(72) Inventors: Eunsung Park, Seoul (KR); Jinyoung Chun, Seoul (KR); Jinsoo Choi, Seoul (KR); Dongguk Lim, Seoul (KR); Insik Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 19/054,022

(22) Filed: Feb. 14, 2025

(65) Prior Publication Data

US 2025/0260527 A1 Aug. 14, 2025

(30) Foreign Application Priority Data

Feb. 14, 2024 (KR) ........................ 10-2024-0021279
Feb. 19, 2024 (KR) ........................ 10-2024-0023608
Feb. 23, 2024 (KR) ........................ 10-2024-0026699
Feb. 28, 2024 (KR) ........................ 10-2024-0029146
Mar. 4, 2024 (KR) ........................ 10-2024-0030888
Mar. 13, 2024 (KR) ........................ 10-2024-0035334
Mar. 21, 2024 (KR) ........................ 10-2024-0039295
Mar. 27, 2024 (KR) ........................ 10-2024-0042025
May 20, 2024 (KR) ........................ 10-2024-0065383
Jan. 24, 2025 (WO) ................ PCT/KR2025/001457

(51) Int. Cl.
*H04W 4/00* (2018.01)
*H04L 5/00* (2006.01)

(52) U.S. Cl.
CPC .................................. *H04L 5/0044* (2013.01)

(58) Field of Classification Search
CPC ..................................................... H04L 5/0044
See application file for complete search history.

(56) References Cited

U.S. PATENT DOCUMENTS 11,711,184 B2 * 7/2023 Yang ................... H04L 27/2621
370/329
12,267,821 B2 * 4/2025 Kim ...................... H04W 72/23
(Continued)

FOREIGN PATENT DOCUMENTS

CN 116896433 A * 10/2023 ........... H04L 1/0069
KR 10-1928447 B1 12/2018
(Continued)

OTHER PUBLICATIONS

International Search Report in International Appln. No. PCT/KR2025/001457, mailed on May 2, 2025, 3 pages (only Official Copy).

*Primary Examiner* — Thai Dinh Hoang
(74) *Attorney, Agent, or Firm* — Fish & Richardson P.C.

(57) ABSTRACT

A method and an apparatus for transmitting or receiving based on a distributed resource unit tone plan in a WLAN system are disclosed. A method according to an embodiment of the present disclosure may include generating, by a first station (STA), a physical layer protocol data unit (PPDU) including at least one field; and transmitting, by the first STA, the PPDU to at least one second STA on a bandwidth including a 20 MHz channel. Here, the at least one field may be transmitted on at least one distributed resource unit (DRU).

18 Claims, 12 Drawing Sheets

(56) References Cited

U.S. PATENT DOCUMENTS

| | | | | |
|---|---|---|---|---|
| 2016/0165482 | A1* | 6/2016 | Yang | H04L 27/26132 370/336 |
| 2017/0034829 | A1* | 2/2017 | Yang | H04L 5/005 |
| 2017/0273083 | A1* | 9/2017 | Chen | H04L 5/001 |
| 2019/0109684 | A1* | 4/2019 | Chen | H04L 5/003 |
| 2019/0253296 | A1* | 8/2019 | Chen | H04L 27/2605 |
| 2021/0281454 | A1* | 9/2021 | Yang | H04L 5/0053 |
| 2021/0409249 | A1* | 12/2021 | Chen | H04L 27/2657 |
| 2022/0311565 | A1* | 9/2022 | Hu | H04L 5/0044 |
| 2022/0416988 | A1* | 12/2022 | Cao | H04B 1/69 |
| 2023/0035113 | A1 | 2/2023 | Shellhammer et al. | |
| 2023/0048884 | A1* | 2/2023 | Yang | H04L 5/0041 |
| 2024/0154777 | A1* | 5/2024 | Liu | H04L 5/0044 |
| 2024/0205899 | A1* | 6/2024 | Gong | H04W 72/0453 |
| 2024/0297811 | A1* | 9/2024 | Chen | H04L 25/0226 |
| 2024/0365320 | A1* | 10/2024 | Yang | H04W 72/0453 |

FOREIGN PATENT DOCUMENTS

| | | | | |
|---|---|---|---|---|
| KR | 10-2023-0007471 | A | 1/2023 | |
| KR | 10-2023-0043135 | A | 3/2023 | |
| TW | 202310583 | A * | 3/2023 | H04L 27/26134 |
| WO | WO-2023284548 | A1 * | 1/2023 | H04L 27/2602 |
| WO | WO-2023025056 | A1 * | 3/2023 | H04L 27/2602 |
| WO | WO-2023059403 | A1 * | 4/2023 | H04L 27/2613 |

* cited by examiner

METHOD AND APPARATUS FOR TRANSMITTING OR RECEIVING BASED ON DISTRIBUTED RESOURCE UNIT TONE PLAN IN WIRELESS LAN SYSTEM

CROSS-REFERENCE TO RELATED APPLICATIONS

This application claims the benefit of earlier filing date and right of priority to Korean Application No. 10-2024-0021279, filed on Feb. 14, 2024, Korean Application No. 10-2024-0023608, filed on Feb. 19, 2024, Korean Application No. 10-2024-0026699, filed on Feb. 23, 2024, Korean Application No. 10-2024-0029146, filed on Feb. 28, 2024, Korean Application No. 10-2024-0030888, filed on Mar. 4, 2024, Korean Application No. 10-2024-0035334, filed on Mar. 13, 2024, Korean Application No. 10-2024-0039295, filed on Mar. 21, 2024, Korean Application No. 10-2024-0042025, filed on Mar. 27, 2024, Korean Application No. 10-2024-0065383, filed on May 20, 2024, and International Application No. PCT/KR2025/001457, filed on Jan. 24, 2025, the contents of which are all hereby incorporated by reference herein in their entireties.

TECHNICAL FIELD

The present disclosure relates to a transmission or reception method and device based on a distributed resource unit tone plan in a wireless local area network (WLAN) system.

BACKGROUND

New technologies for improving transmission rates, increasing bandwidth, improving reliability, reducing errors, and reducing latency have been introduced for a wireless LAN (WLAN). Among WLAN technologies, an Institute of Electrical and Electronics Engineers (IEEE) 802.11 series standard may be referred to as Wi-Fi. For example, technologies recently introduced to WLAN include enhancements for Very High-Throughput (VHT) of the 802.11ac standard, and enhancements for High Efficiency (HE) of the IEEE 802.11ax standard.

In order to provide a more advanced wireless communication environment, improved technologies for Extremely High Throughput (EHT) are being discussed. For example, technologies for MIMO and multiple access point (AP) coordination that support increased bandwidth, efficient utilization of multiple bands, and increased spatial streams are being studied, and in particular, various technologies are being studied to support low latency or real-time traffic. Furthermore, new technologies are being discussed to support ultra high reliability (UHR), including improvements or extensions of EHT technologies.

SUMMARY

The technical problem of the present disclosure is to provide a transmission or reception method and device based on a distributed resource unit tone plan in a WLAN system.

The technical objects to be achieved by the present disclosure are not limited to the above-described technical objects, and other technical objects which are not described herein will be clearly understood by those skilled in the pertinent art from the following description.

A method according to an aspect of the present disclosure includes generating, by a first station (STA), a physical layer protocol data unit (PPDU) including at least one field; and transmitting, by the first STA, the PPDU to at least one second STA on a bandwidth including a channel of a certain size, wherein the at least one field may be transmitted on at least one distributed resource unit (DRU) and based on the at least one DRU including a 26-tone DRU, the 26-tone DRU may be one of a plurality of predefined 26-tone DRU candidates. Here, two pilot tones for a 26-tone DRU candidate may be defined by applying a shift value to two tone indexes in specific order among the 26 tones of the 26-tone DRU candidate, and the shift value may be one of nine different shift values for the plurality of 26-tone DRU candidates.

A method according to an additional aspect of the present disclosure includes receiving, by a second STA, a physical layer protocol data unit (PPDU) including at least one field from a first STA on a bandwidth including a channel of a certain size; and decoding, by the second STA, the at least one field received on at least one distributed resource unit (DRU), wherein the at least one field may be transmitted on at least one distributed resource unit (DRU) and based on the at least one DRU including a 26-tone DRU, the 26-tone DRU may be one of a plurality of predefined 26-tone DRU candidates. Here, two pilot tones for a 26-tone DRU candidate may be defined by applying a shift value to two tone indexes in specific order among the 26 tones of the 26-tone DRU candidate, and the shift value may be one of nine different shift values predefined for the plurality of 26-tone DRU candidates.

According to the present disclosure, a transmission or reception method and device based on a distributed resource unit tone plan in a WLAN system may be provided.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
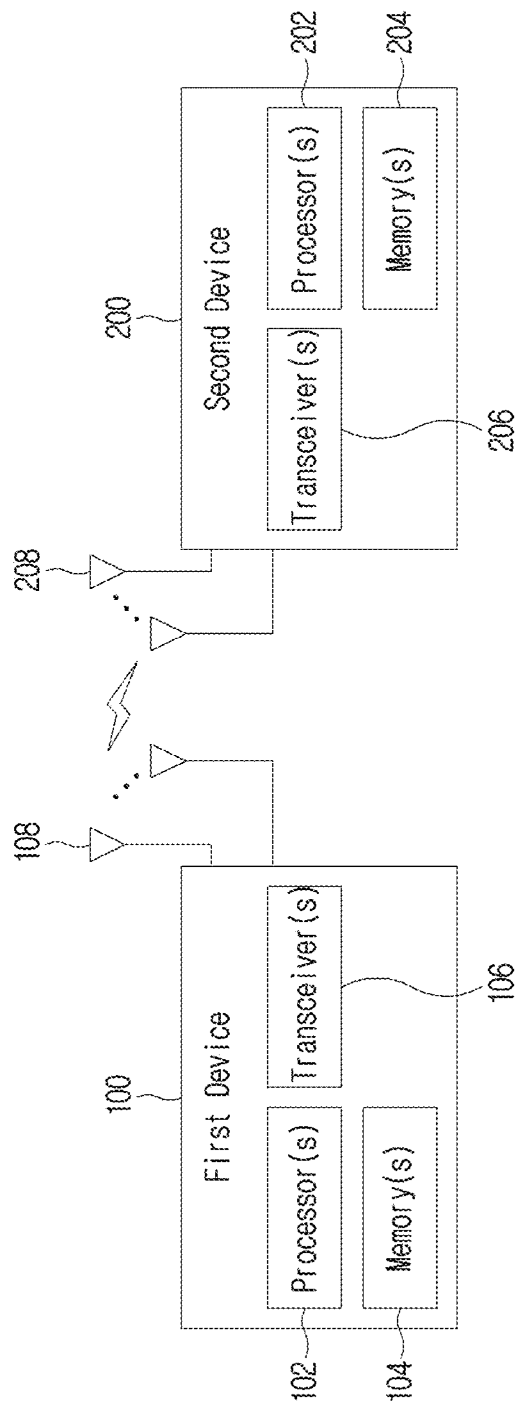
FIG. 1 illustrates a block configuration diagram of a wireless communication device according to an embodiment of the present disclosure.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

Examples of the present disclosure may be applied to various wireless communication systems. For example, examples of the present disclosure may be applied to a wireless LAN system. For example, examples of the present disclosure may be applied to an IEEE 802.11a/g/n/ac/ax standards-based wireless LAN. Furthermore, examples of the present disclosure may be applied to a wireless LAN based on the newly proposed IEEE 802.11be (or EHT) standard. Examples of the present disclosure may be applied to an IEEE 802.11be Release-2 standard-based wireless LAN corresponding to an additional enhancement technology of the IEEE 802.11be Release-1 standard. Additionally, examples of the present disclosure may be applied to a next-generation standards-based wireless LAN after IEEE 802.11be. Further, examples of this disclosure may be applied to a cellular wireless communication system. For example, it may be applied to a cellular wireless communication system based on Long Term Evolution (LTE)-based technology and 5G New Radio (NR)-based technology of the 3rd Generation Partnership Project (3GPP) standard.

Hereinafter, technical features to which examples of the present disclosure may be applied will be described.

FIG. 1 illustrates a block diagram of a wireless communication device according to an embodiment of the present disclosure.

The first device 100 and the second device 200 illustrated in FIG. 1 may be replaced with various terms such as a terminal, a wireless device, a Wireless Transmit Receive Unit (WTRU), an User Equipment (UE), a Mobile Station (MS), an user terminal (UT), a Mobile Subscriber Station (MSS), a Mobile Subscriber Unit (MSU), a subscriber station (SS), an advanced mobile station (AMS), a wireless terminal (WT), or simply user, etc. In addition, the first device 100 and the second device 200 include an access point (AP), a base station (BS), a fixed station, a Node B, a base transceiver system (BTS), a network, It may be replaced with various terms such as an Artificial Intelligence (AI) system, a road side unit (RSU), a repeater, a router, a relay, and a gateway.

The devices 100 and 200 illustrated in FIG. 1 may be referred to as stations (STAs). For example, the devices 100 and 200 illustrated in FIG. 1 may be referred to by various terms such as a transmitting device, a receiving device, a transmitting STA, and a receiving STA. For example, the STAs 110 and 200 may perform an access point (AP) role or a non-AP role. That is, in the present disclosure, the STAs 110 and 200 may perform functions of an AP and/or a non-AP. When the STAs 110 and 200 perform an AP function, they may be simply referred to as APs, and when the STAs 110 and 200 perform non-AP functions, they may be simply referred to as STAs. In addition, in the present disclosure, an AP may also be indicated as an AP STA.

Referring to FIG. 1, the first device 100 and the second device 200 may transmit and receive radio signals through various wireless LAN technologies (e.g., IEEE 802.11 series). The first device 100 and the second device 200 may include an interface for a medium access control (MAC) layer and a physical layer (PHY) conforming to the IEEE 802.11 standard.

In addition, the first device 100 and the second device 200 may additionally support various communication standards (e.g., 3GPP LTE series, 5G NR series standards, etc.) technologies other than wireless LAN technology. In addition, the device of the present disclosure may be implemented in various devices such as a mobile phone, a vehicle, a personal computer, augmented reality (AR) equipment, and virtual reality (VR) equipment, etc. In addition, the STA of the present specification may support various communication services such as a voice call, a video call, data communication, autonomous-driving, machine-type communication (MTC), machine-to-machine (M2M), device-to-device (D2D), IoT (Internet-of-Things), etc.

A first device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including instructions for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless LAN technology (e.g., IEEE 802.11 series). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a device may mean a communication modem/circuit/chip.

A second device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including instructions for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless LAN technology (e.g., IEEE 802.11 series). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a device may mean a communication modem/circuit/chip.

Hereinafter, a hardware element of a device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC). One or more processors 102, 202 may generate one or more PDUs (Protocol Data Unit) and/or one or more SDUs (Service Data Unit) according to description, functions, procedures, proposals, methods and/or operation flow charts disclosed in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, an instruction and/or a set of instructions.

One or more memories 104, 204 may be connected to one or more processors 102, 202 and may store data, a signal, a message, information, a program, a code, an indication and/or an instruction in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

For example, one of the STAs 100 and 200 may perform an intended operation of an AP, and the other of the STAs 100 and 200 may perform an intended operation of a non-AP STA. For example, the transceivers 106 and 206 of FIG. 1 may perform a transmission and reception operation of a signal (e.g., a packet or a physical layer protocol data unit (PPDU) conforming to IEEE 802.11a/b/g/n/ac/ax/be). In addition, in the present disclosure, an operation in which various STAs generate transmission/reception signals or perform data processing or calculation in advance for transmission/reception signals may be performed by the processors 102 and 202 of FIG. 1. For example, an example of an operation of generating a transmission/reception signal or performing data processing or calculation in advance for the transmission/reception signal may include 1) determining/acquiring/configuring/calculating/decoding/encoding bit information of fields (signal (SIG), short training field (STF), long training field (LTF), Data, etc.) included in the PPDU, 2) determining/configuring/acquiring time resources or frequency resources (e.g., subcarrier resources) used for fields (SIG, STF, LTF, Data, etc.) included in the PPDU; 3) determining/configuring/acquiring a specific sequence (e.g., pilot sequence, STF/LTF sequence, extra sequence applied to SIG) used for fields (SIG, STF, LTF, Data, etc.) included in the PPDU action, 4) power control operation and/or power saving operation applied to the STA, 5) Operations related to ACK signal determination/acquisition/configuration/calculation/decoding/encoding, etc. In addition, in the following example, various information (e.g., information related to fields/subfields/control fields/parameters/power, etc.) used by various STAs to determine/acquire/configure/calculate/decode/encode transmission and reception signals may be stored in the memories 104 and 204 of FIG. 1.

Hereinafter, downlink (DL) may mean a link for communication from an AP STA to a non-AP STA, and a DL PPDU/packet/signal may be transmitted and received through the DL. In DL communication, a transmitter may be part of an AP STA, and a receiver may be part of a non-AP STA. Uplink (UL) may mean a link for communication from non-AP STAs to AP STAs, and a UL PPDU/packet/signal may be transmitted and received through the UL. In UL communication, a transmitter may be part of a non-AP STA, and a receiver may be part of an AP STA.

Figure 2:
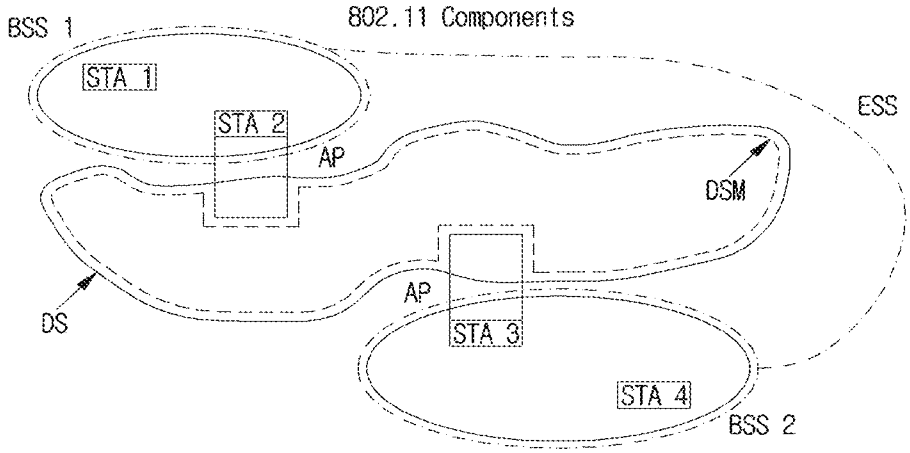
FIG. 2 is a diagram illustrating an exemplary structure of a WLAN system to which the present disclosure may be applied.

FIG. 2 is a diagram illustrating an exemplary structure of a wireless LAN system to which the present disclosure may be applied.

The structure of the wireless LAN system may consist of be composed of a plurality of components. A wireless LAN supporting STA mobility transparent to an upper layer may be provided by interaction of a plurality of components. A Basic Service Set (BSS) corresponds to a basic construction block of a wireless LAN. FIG. 2 exemplarily shows that two BSSs (BSS1 and BSS2) exist and two STAs are included as members of each BSS (STA1 and STA2 are included in BSS1, and STA3 and STA4 are included in BSS2). An ellipse representing a BSS in FIG. 2 may also be understood as representing a coverage area in which STAs included in the corresponding BSS maintain communication. This area may be referred to as a Basic Service Area (BSA). When an STA moves out of the BSA, it may not directly communicate with other STAs within the BSA.

If the DS shown in FIG. 2 is not considered, the most basic type of BSS in a wireless LAN is an independent BSS (IBSS). For example, IBSS may have a minimal form containing only two STAs. For example, assuming that other components are omitted, BSS1 containing only STA1 and STA2 or BSS2 containing only STA3 and STA4 may respectively correspond to representative examples of IBSS. This configuration is possible when STAs may communicate directly without an AP. In addition, in this type of wireless LAN, it is not configured in advance, but may be configured when a LAN is required, and this may be referred to as an ad-hoc network. Since the IBSS does not include an AP, there is no centralized management entity. That is, in IBSS, STAs are managed in a distributed manner. In IBSS, all STAs may be made up of mobile STAs, and access to the distributed system (DS) is not allowed, forming a self-contained network.

Membership of an STA in the BSS may be dynamically changed by turning on or off the STA, entering or exiting the BSS area, and the like. To become a member of the BSS, the STA may join the BSS using a synchronization process. In order to access all services of the BSS infrastructure, the STA shall be associated with the BSS. This association may be dynamically established and may include the use of a Distribution System Service (DSS).

A direct STA-to-STA distance in a wireless LAN may be limited by PHY performance. In some cases, this distance limit may be sufficient, but in some cases, communication between STAs at a longer distance may be required. A distributed system (DS) may be configured to support extended coverage.

DS means a structure in which BSSs are interconnected. Specifically, as shown in FIG. 2, a BSS may exist as an extended form of a network composed of a plurality of BSSs. DS is a logical concept and may be specified by the characteristics of Distributed System Media (DSM). In this regard, a wireless medium (WM) and a DSM may be logically separated. Each logical medium is used for a different purpose and is used by different components. These medium are not limited to being the same, nor are they limited to being different. In this way, the flexibility of the wireless LAN structure (DS structure or other network structure) may be explained in that a plurality of media are logically different. That is, the wireless LAN structure may be implemented in various ways, and the corresponding wireless LAN structure may be independently specified by the physical characteristics of each embodiment.

A DS may support a mobile device by providing seamless integration of a plurality of BSSs and providing logical services necessary to address an address to a destination. In addition, the DS may further include a component called a portal that serves as a bridge for connection between the wireless LAN and other networks (e.g., IEEE 802.X).

The AP enables access to the DS through the WM for the associated non-AP STAs, and means an entity that also has the functionality of an STA. Data movement between the BSS and the DS may be performed through the AP. For example, STA2 and STA3 shown in FIG. 2 have the functionality of STAs, and provide a function allowing the associated non-AP STAs (STA1 and STA4) to access the DS. In addition, since all APs basically correspond to STAs, all APs are addressable entities. The address used by the AP for communication on the WM and the address used by the AP for communication on the DSM are not necessarily the same. A BSS composed of an AP and one or more STAs may be referred to as an infrastructure BSS.

Data transmitted from one of the STA(s) associated with an AP to a STA address of the corresponding AP may be always received on an uncontrolled port and may be processed by an IEEE 802.1X port access entity. In addition, when a controlled port is authenticated, transmission data (or frames) may be delivered to the DS.

In addition to the structure of the DS described above, an extended service set (ESS) may be configured to provide wide coverage.

An ESS means a network in which a network having an arbitrary size and complexity is composed of DSs and BSSs. The ESS may correspond to a set of BSSs connected to one DS. However, the ESS does not include the DS. An ESS network is characterized by being seen as an IBSS in the Logical Link Control (LLC) layer. STAs included in the ESS may communicate with each other, and mobile STAs may move from one BSS to another BSS (within the same ESS) transparently to the LLC. APs included in one ESS may have the same service set identification (SSID). The SSID is distinguished from the BSSID, which is an identifier of the BSS.

The wireless LAN system does not assume anything about the relative physical locations of BSSs, and all of the following forms are possible. BSSs may partially overlap, which is a form commonly used to provide continuous coverage. In addition, BSSs may not be physically connected, and logically there is no limit on the distance between BSSs. In addition, the BSSs may be physically located in the same location, which may be used to provide redundancy. In addition, one (or more than one) IBSS or ESS networks may physically exist in the same space as one (or more than one) ESS network. When an ad-hoc network operates in a location where an ESS network exists, when physically overlapping wireless networks are configured by different organizations, or when two or more different access and security policies are required in the same location, this may correspond to the form of an ESS network in the like.

Figure 3:
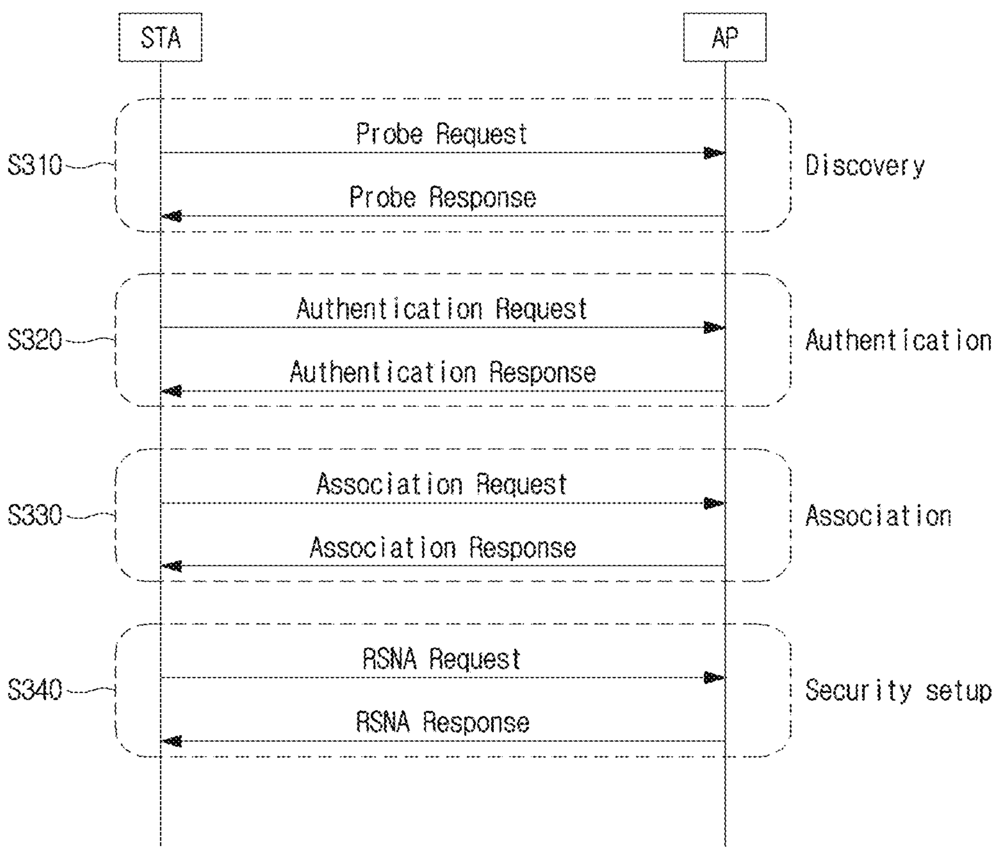
FIG. 3 is a diagram for describing a link setup process to which the present disclosure may be applied.

FIG. 3 is a diagram for explaining a link setup process to which the present disclosure may be applied.

In order for an STA to set up a link with respect to a network and transmit/receive data, it first discovers a network, performs authentication, establishes an association, and need to perform the authentication process for security. The link setup process may also be referred to as a session initiation process or a session setup process. In addition, the processes of discovery, authentication, association, and security setting of the link setup process may be collectively referred to as an association process.

In step S310, the STA may perform a network discovery operation. The network discovery operation may include a scanning operation of the STA. That is, in order for the STA to access the network, it needs to find a network in which it can participate. The STA shall identify a compatible network before participating in a wireless network, and the process of identifying a network existing in a specific area is called scanning.

Scanning schemes include active scanning and passive scanning. FIG. 3 exemplarily illustrates a network discovery operation including an active scanning process. In active scanning, an STA performing scanning transmits a probe request frame to discover which APs exist around it while moving channels and waits for a response thereto. A responder transmits a probe response frame as a response to the probe request frame to the STA that has transmitted the probe request frame. Here, the responder may be an STA that last transmitted a beacon frame in the BSS of the channel being scanned. In the BSS, since the AP transmits the beacon frame, the AP becomes a responder, and in the IBSS, the STAs in the IBSS rotate to transmit the beacon frame, so the responder is not constant. For example, a STA that transmits a probe request frame on channel 1 and receives a probe response frame on channel 1, may store BSS-related information included in the received probe response frame and may move to the next channel (e.g., channel 2) and perform scanning (i.e., transmission/reception of a probe request/response on channel 2) in the same manner.

Although not shown in FIG. 3, the scanning operation may be performed in a passive scanning manner. In passive scanning, a STA performing scanning waits for a beacon frame while moving channels. The beacon frame is one of the management frames defined in IEEE 802.11, and is periodically transmitted to notify the existence of a wireless network and to allow the STA performing scanning to find a wireless network and participate in the wireless network. In the BSS, the AP serves to transmit beacon frames periodically, and in the IBSS, STAs within the IBSS rotate to transmit beacon frames. When the STA performing scanning receives a beacon frame, the STA stores information for the BSS included in the beacon frame and records beacon frame information in each channel while moving to another channel. The STA receiving the beacon frame may store BSS-related information included in the received beacon frame, move to the next channel, and perform scanning in the next channel in the same way. Comparing active scanning and passive scanning, active scanning has an advantage of having less delay and less power consumption than passive scanning.

After the STA discovers the network, an authentication process may be performed in step S320. This authentication process may be referred to as a first authentication process in order to be clearly distinguished from the security setup operation of step S340 to be described later.

The authentication process includes a process in which the STA transmits an authentication request frame to the AP, and in response to this, the AP transmits an authentication response frame to the STA. An authentication frame used for authentication request/response corresponds to a management frame.

The authentication frame includes an authentication algorithm number, an authentication transaction sequence number, a status code, a challenge text, a robust security network (RSN), and a Finite Cyclic Group, etc. This corresponds to some examples of information that may be included in the authentication request/response frame, and may be replaced with other information or additional information may be further included.

The STA may transmit an authentication request frame to the AP. The AP may determine whether to allow authentication of the corresponding STA based on information included in the received authentication request frame. The AP may provide the result of the authentication process to the STA through an authentication response frame.

After the STA is successfully authenticated, an association process may be performed in step S330. The association process includes a process in which the STA transmits an association request frame to the AP, and in response, the AP transmits an association response frame to the STA.

For example, the association request frame may include information related to various capabilities, a beacon listen interval, a service set identifier (SSID), supported rates, supported channels, RSN, mobility domain, supported operating classes, Traffic Indication Map Broadcast request (TIM broadcast request), interworking service capability, etc. For example, the association response frame may include information related to various capabilities, status code, association ID (AID), supported rates, enhanced distributed channel access (EDCA) parameter set, received channel power indicator (RCPI), received signal to noise indicator (RSNI), mobility domain, timeout interval (e.g., association comeback time), overlapping BSS scan parameters, TIM broadcast response, Quality of Service (QOS) map, etc. This corresponds to some examples of information that may be included in the association request/response frame, and may be replaced with other information or additional information may be further included.

After the STA is successfully associated with the network, a security setup process may be performed in step S340. The security setup process of step S340 may be referred to as an authentication process through Robust Security Network Association (RSNA) request/response, and the authentication process of step S320 is referred to as a first authentication process, and the security setup process of step S340 may also simply be referred to as an authentication process.

The security setup process of step S340 may include, for example, a process of setting up a private key through 4-way handshaking through an Extensible Authentication Protocol over LAN (EAPOL) frame. In addition, the security setup process may be performed according to a security scheme not defined in the IEEE 802.11 standard.

Figure 4:
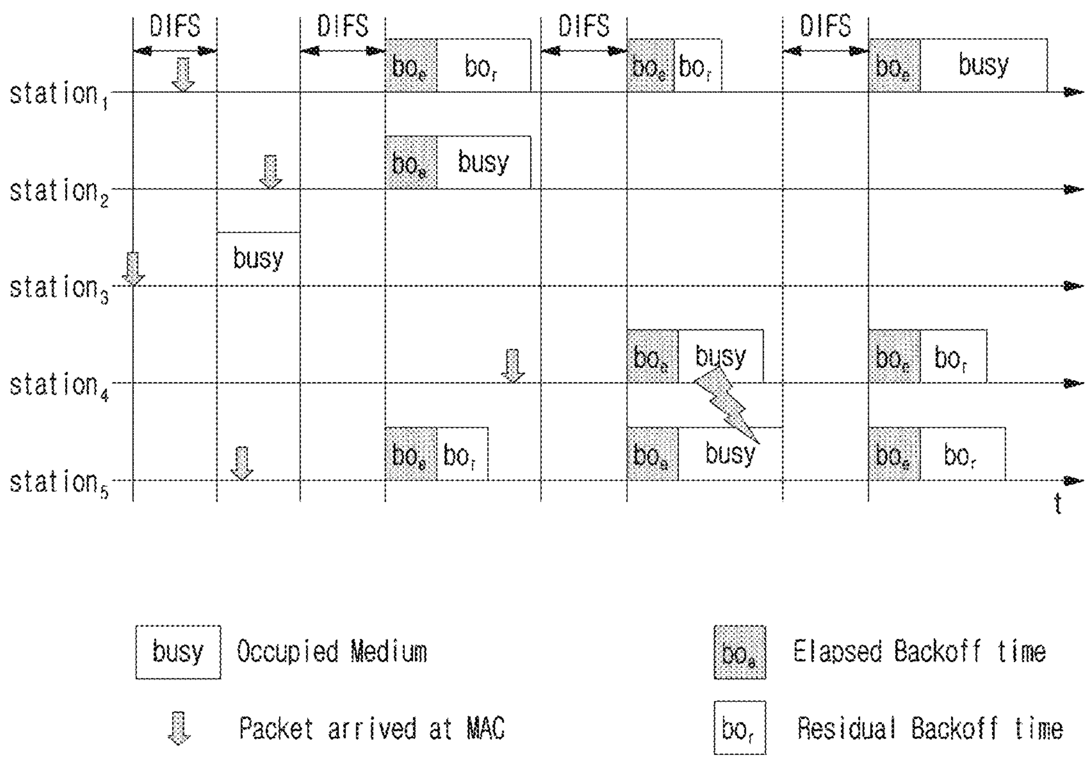
FIG. 4 is a diagram for describing a backoff process to which the present disclosure may be applied.

FIG. 4 is a diagram for explaining a backoff process to which the present disclosure may be applied.

In the wireless LAN system, a basic access mechanism of medium access control (MAC) is a carrier sense multiple access with collision avoidance (CSMA/CA) mechanism. The CSMA/CA mechanism is also called Distributed Coordination Function (DCF) of IEEE 802.11 MAC, and basically adopts a "listen before talk" access mechanism. According to this type of access mechanism, the AP and/or STA may perform Clear Channel Assessment (CCA) sensing a radio channel or medium during a predetermined time interval (e.g., DCF Inter-Frame Space (DIFS)), prior to starting transmission. As a result of the sensing, if it is determined that the medium is in an idle state, frame transmission is started through the corresponding medium. On the other hand, if it is detected that the medium is occupied or busy, the corresponding AP and/or STA does not start its own transmission and may set a delay period for medium access (e.g., a random backoff period) and attempt frame transmission after waiting. By applying the random backoff period, since it is expected that several STAs attempt frame transmission after waiting for different periods of time, collision may be minimized.

In addition, the IEEE 802.11 MAC protocol provides a Hybrid Coordination Function (HCF). HCF is based on the DCF and Point Coordination Function (PCF). PCF is a polling-based synchronous access method and refers to a method in which all receiving APs and/or STAs periodically poll to receive data frames. In addition, HCF has Enhanced Distributed Channel Access (EDCA) and HCF Controlled Channel Access (HCCA). EDCA is a contention-based access method for a provider to provide data frames to multiple users, and HCCA uses a non-contention-based channel access method using a polling mechanism. In addition, the HCF includes a medium access mechanism for improving QoS (Quality of Service) of the wireless LAN, and may transmit QoS data in both a Contention Period (CP) and a Contention Free Period (CFP).

Referring to FIG. 4, an operation based on a random backoff period will be described. When the occupied/busy medium changes to an idle state, several STAs may attempt to transmit data (or frames). As a method for minimizing collisions, each of STAs may respectively select a random backoff count and attempt transmission after waiting for a corresponding slot time. The random backoff count has a pseudo-random integer value and may be determined as one of values ranging from 0 to CW. Here, CW is a contention window parameter value. The CW parameter is given CWmin as an initial value, but may take a value twice as large in case of transmission failure (e.g., when an ACK for the transmitted frame is not received). When the CW parameter value reaches CWmax, data transmission may be attempted while maintaining the CWmax value until data transmission is successful, and when data transmission is successful, the CWmin value is reset. The values of CW, CWmin and CWmax are preferably set to $2n-1$ ($n=0, 1, 2, \ldots$).

When the random backoff process starts, the STA continuously monitors the medium while counting down the backoff slots according to the determined backoff count value. When the medium is monitored for occupancy, it stops counting down and waits, and resumes the rest of the countdown when the medium becomes idle.

In the example of FIG. 4, when a packet to be transmitted arrives at the MAC of STA3, STA3 may transmit the frame immediately after confirming that the medium is idle as much as DIFS. The remaining STAs monitor and wait for the medium to be occupied/busy. In the meantime, data to be transmitted may also occur in each of STA1, STA2, and STA5, and each STA waits as long as DIFS when the medium is monitored as idle, and then may perform a countdown of the backoff slot according to the random backoff count value selected by each STA. Assume that STA2 selects the smallest backoff count value and STA1 selects the largest backoff count value. That is, the case where the remaining back-off time of STA5 is shorter than the remaining back-off time of STA1 at the time when STA2 completes the back-off count and starts frame transmission is exemplified. STA1 and STA5 temporarily stop counting down and wait while STA2 occupies the medium. When the occupation of STA2 ends and the medium becomes idle again, STA1 and STA5 wait for DIFS and resume the stopped backoff count. That is, frame transmission may be started after counting down the remaining backoff slots for the remaining backoff time. Since the remaining backoff time of STA5 is shorter than that of STA1, STA5 starts frame transmission. While STA2 occupies the medium, data to be transmitted may also occur in STA4. From the standpoint of STA4, when the medium becomes idle, STA4 may wait for DIFS, and then may perform a countdown according to the random backoff count value selected by the STA4 and start transmitting frames. The example of FIG. 4 shows a case where the remaining backoff time of STA5 coincides with the random backoff count value of STA4 by chance. In this case, a collision may occur between STA4 and STA5. When a collision occurs, both STA4 and STA5 do not receive an ACK, so data transmission fails. In this case, STA4 and STA5 may double the CW value, select a random backoff count value, and perform a countdown. STA1 waits while the medium is occupied due to transmission of STA4 and STA5, waits for DIFS when the medium becomes idle, and then starts frame transmission after the remaining backoff time has elapsed.

As in the example of FIG. 4, the data frame is a frame used for transmission of data forwarded to a higher layer, and may be transmitted after a backoff performed after DIFS elapses from when the medium becomes idle. Additionally, the management frame is a frame used for exchange of management information that is not forwarded to a higher layer, and is transmitted after a backoff performed after an IFS such as DIFS or Point Coordination Function IFS (PIFS). As a subtype frames of management frame, there are a Beacon, an association request/response, a re-association request/response, a probe request/response, an authentication request/response, etc. A control frame is a frame used to control access to a medium. As a subtype frames of control frame, there are Request-To-Send (RTS), Clear-To-Send (CTS), Acknowledgement (ACK), Power Save-Poll (PS-Poll), block ACK (BlockAck), block ACK request (Block-ACKReq), null data packet announcement (NDP announcement), and trigger, etc. If the control frame is not a response frame of the previous frame, it is transmitted after backoff performed after DIFS elapses, and if it is a response frame of the previous frame, it is transmitted without performing backoff after short IFS (SIFS) elapses. The type and subtype of the frame may be identified by a type field and a subtype field in a frame control (FC) field.

A Quality of Service (QOS) STA may perform the backoff that is performed after an arbitration IFS (AIFS) for an access category (AC) to which the frame belongs, that is, AIFS[i] (where i is a value determined by AC), and then may transmit the frame. Here, the frame in which AIFS[i] can be used may be a data frame, a management frame, or a control frame other than a response frame.

Figure 5:
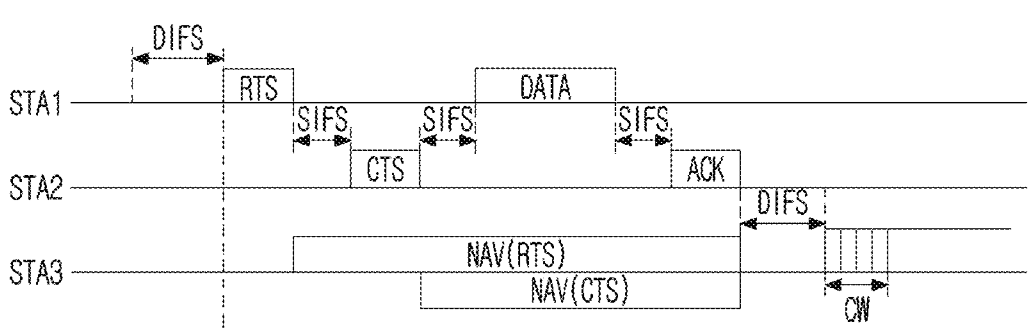
FIG. 5 is a diagram for describing a frame transmission operation based on CSMA/CA to which the present disclosure may be applied.

FIG. 5 is a diagram for explaining a frame transmission operation based on CSMA/CA to which the present disclosure may be applied.

As described above, the CSMA/CA mechanism includes virtual carrier sensing in addition to physical carrier sensing in which a STA directly senses a medium. Virtual carrier sensing is intended to compensate for problems that may occur in medium access, such as a hidden node problem. For virtual carrier sensing, the MAC of the STA may use a Network Allocation Vector (NAV). The NAV is a value indicating, to other STAs, the remaining time until the medium is available for use by an STA currently using or having the right to use the medium. Therefore, the value set as NAV corresponds to a period in which the medium is scheduled to be used by the STA transmitting the frame, and the STA receiving the NAV value is prohibited from accessing the medium during the corresponding period. For example, the NAV may be configured based on the value of the "duration" field of the MAC header of the frame.

In the example of FIG. 5, it is assumed that a STA1 intends to transmit data to a STA2, and a STA3 is in a position capable of overhearing some or all of frames transmitted and received between the STA1 and the STA2.

In order to reduce the possibility of collision of transmissions of multiple STAs in CSMA/CA based frame transmission operation, a mechanism using RTS/CTS frames may be applied. In the example of FIG. 5, while transmission of the STA1 is being performed, as a result of carrier sensing of the STA3, it may be determined that the medium is in an idle state. That is, the STA1 may correspond to a hidden node to the STA3. Alternatively, in the example of FIG. 5, it may be determined that the carrier sensing result medium of the STA3 is in an idle state while transmission of the STA2 is being performed. That is, the STA2 may correspond to a hidden node to the STA3. Through the exchange of RTS/CTS frames before performing data transmission and reception between the STA1 and the STA2, a STA outside the transmission range of one of the STA1 or the STA2, or a STA outside the carrier sensing range for transmission from the STA1 or the STA3 may not attempt to occupy the channel during data transmission and reception between the STA1 and the STA2.

Specifically, the STA1 may determine whether a channel is being used through carrier sensing. In terms of physical carrier sensing, the STA1 may determine a channel occupation idle state based on an energy level or signal correlation detected in a channel. In addition, in terms of virtual carrier sensing, the STA1 may determine a channel occupancy state using a network allocation vector (NAV) timer.

The STA1 may transmit an RTS frame to the STA2 after performing a backoff when the channel is in an idle state during DIFS. When the STA2 receives the RTS frame, the STA2 may transmit a CTS frame as a response to the RTS frame to the STA1 after SIFS.

If the STA3 cannot overhear the CTS frame from the STA2 but can overhear the RTS frame from the STA1, the STA3 may set a NAV timer for a frame transmission period (e.g., SIFS+CTS frame+SIFS+data frame+SIFS+ACK frame) that is continuously transmitted thereafter, using the duration information included in the RTS frame. Alternatively, if the STA3 can overhear a CTS frame from the STA2 although the STA3 cannot overhear an RTS frame from the STA1, the STA3 may set a NAV timer for a frame transmission period (e.g., SIFS+data frame+SIFS+ACK frame) that is continuously transmitted thereafter, using the duration information included in the CTS frame. That is, if the STA3 can overhear one or more of the RTS or CTS frames from one or more of the STA1 or the STA2, the STA3 may set the NAV accordingly. When the STA3 receives a new frame before the NAV timer expires, the STA3 may update the NAV timer using duration information included in the new frame. The STA3 does not attempt channel access until the NAV timer expires.

When the STA1 receives the CTS frame from the STA2, the STA1 may transmit the data frame to the STA2 after SIFS from the time point when the reception of the CTS frame is completed. When the STA2 successfully receives the data frame, the STA2 may transmit an ACK frame as a response to the data frame to the STA1 after SIFS. The STA3 may determine whether the channel is being used through carrier sensing when the NAV timer expires. When the STA3 determines that the channel is not used by other terminals during DIFS after expiration of the NAV timer, the STA3 may attempt channel access after a contention window (CW) according to a random backoff has passed.

Figure 6:
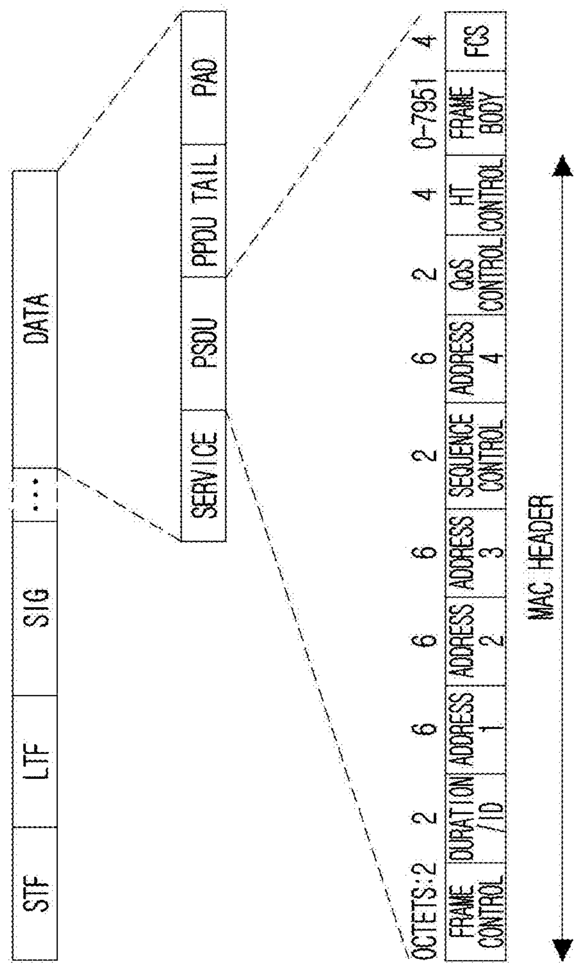
FIG. 6 is a diagram for describing an example of a frame structure used in a WLAN system to which the present disclosure may be applied.

FIG. 6 is a diagram for explaining an example of a frame structure used in a WLAN system to which the present disclosure may be applied.

By means of an instruction or primitive (meaning a set of instructions or parameters) from the MAC layer, the PHY layer may prepare a MAC PDU (MPDU) to be transmitted. For example, when a command requesting transmission start of the PHY layer is received from the MAC layer, the PHY layer switches to the transmission mode and configures information (e.g., data) provided from the MAC layer in the form of a frame and transmits it. In addition, when the PHY layer detects a valid preamble of the received frame, the PHY layer monitors the header of the preamble and sends a command notifying the start of reception of the PHY layer to the MAC layer.

In this way, information transmission/reception in a wireless LAN system is performed in the form of a frame, and for this purpose, a PHY layer protocol data unit (PPDU) frame format is defined.

A basic PPDU may include a Short Training Field (STF), Long Training Field (LTF), SIGNAL (SIG) field, and Data (Data) field. The most basic PPDU format (e.g., non-HT (High Throughput) shown in FIG. 7) may consist of only the Legacy-STF (L-STF), Legacy-LTF (L-LTF), Legacy-SIG (L-SIG) fields, and data fields. Additionally, depending on the type of PPDU format (e.g., HT-mixed format PPDU, HT-greenfield format PPDU, VHT (Very High Throughput) PPDU, etc.), additional (or different types) of RL-SIG, U-SIG, non-legacy SIG fields, non-legacy STF, non-legacy LTF (i.e., xx-SIG, xx-STF, xx-LTF (e.g. xx is HT, VHT, HE, EHT, etc.)), etc. may be included between the L-SIG field and the data field.

The STF is a signal for signal detection, automatic gain control (AGC), diversity selection, precise time synchronization, and the like, and the LTF is a signal for channel estimation and frequency error estimation. The STF and LTF may be referred to as signals for synchronization and channel estimation of the OFDM physical layer.

The SIG field may include various information related to PPDU transmission and reception. For example, the L-SIG field consists of 24 bits and the L-SIG field may include 4-bit Rate field, 1-bit Reserved bit, 12-bit Length field, 1-bit Parity field, and 6-bit Tail field. The RATE field may include information about the modulation and coding rate of data. For example, the 12-bit Length field may include information about the length or time duration of the PPDU. For example, the value of the 12-bit Length field may be determined based on the type of PPDU. For example, for non-HT, HT, VHT, or EHT PPDU, the value of the Length field may be determined to be a multiple of 3. For example, for a HE PPDU, the value of the Length field may be determined as a multiple of 3+1 or a multiple of 3+2.

The data field may include a SERVICE field, a physical layer service data unit (PSDU), and a PPDU TAIL bit, and may also include padding bits if necessary. Some bits of the SERVICE field may be used for synchronization of the descrambler at the receiving end. The PSDU corresponds to the MAC PDU defined in the MAC layer, and may include data generated/used in the upper layer. The PPDU TAIL bit may be used to return the encoder to a 0 state. Padding bits may be used to adjust the length of a data field in a predetermined unit.

A MAC PDU is defined according to various MAC frame formats, and a basic MAC frame consists of a MAC header, a frame body, and a Frame Check Sequence (FCS). The MAC frame may consist of MAC PDUs and be transmitted/received through the PSDU of the data part of the PPDU frame format.

The MAC header includes a Frame Control field, a Duration/ID field, an Address field, and the like. The frame control field may include control information required for frame transmission/reception. The duration/ID field may be set to a time for transmitting a corresponding frame or the like. For details of the Sequence Control, QoS Control, and HT Control subfields of the MAC header, refer to the IEEE 802.11 standard document.

The null-data PPDU (NDP) format refers to a PPDU format that does not include a data field. In other words, NDP refers to a frame format that includes the PPDU preamble in a general PPDU format (i.e., L-STF, L-LTF, L-SIG fields, and additionally non-legacy SIG, non-legacy STF, non-legacy LTF if present) and does not include the remaining part (i.e., data field).

Figure 7:
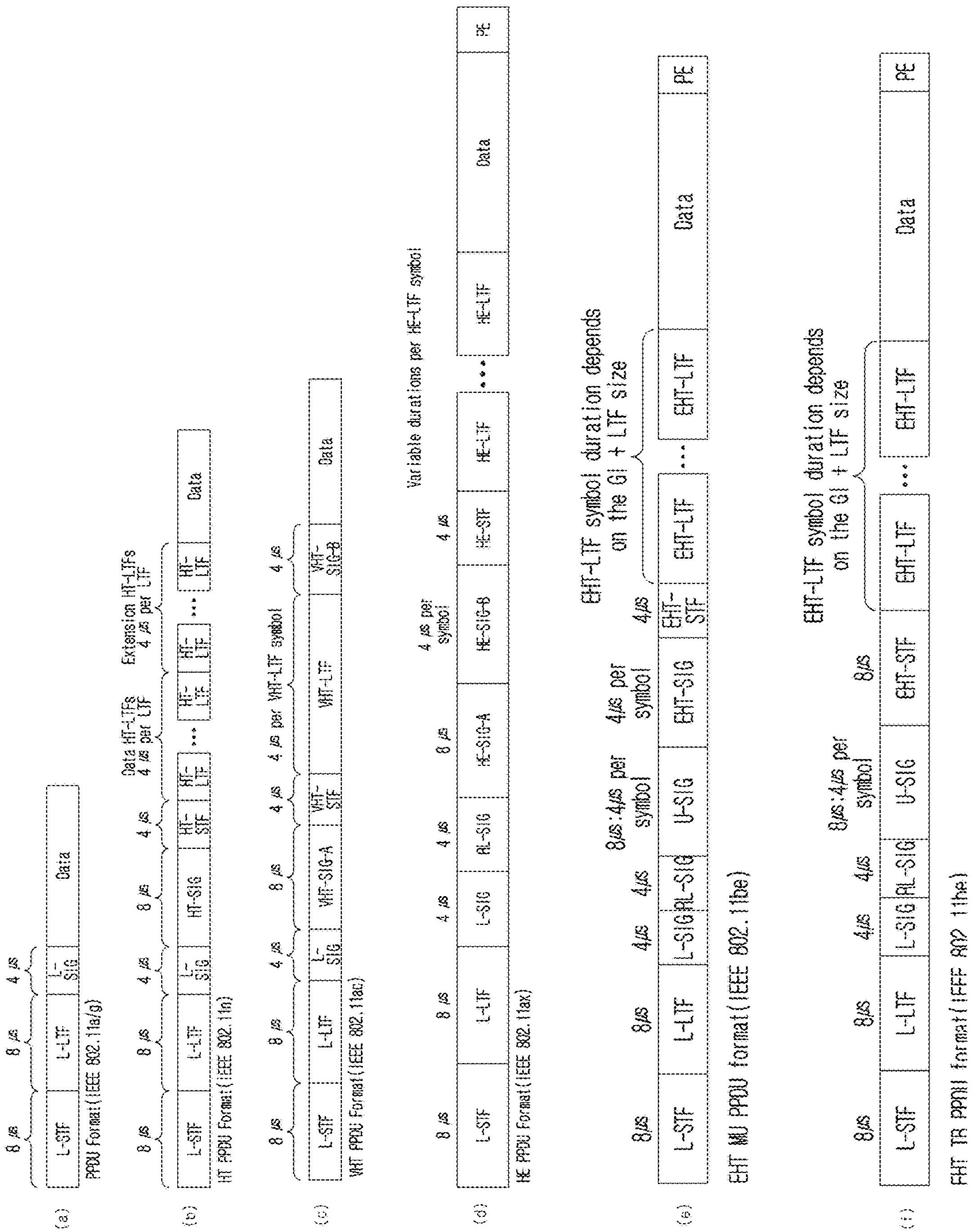
FIG. 7 is a diagram illustrating examples of PPDUs defined in the IEEE 802.11 standard to which the present disclosure may be applied.

FIG. 7 is a diagram illustrating examples of PPDUs defined in the IEEE 802.11 standard to which the present disclosure may be applied.

In standards such as IEEE 802.11a/g/n/ac/ax, various types of PPDUs have been used. The basic PPDU format (IEEE 802.11a/g) includes L-LTF, L-STF, L-SIG and Data fields. The basic PPDU format may also be referred to as a non-HT PPDU format (as shown in FIG. 7(*a*)).

The HT PPDU format (IEEE 802.11n) additionally includes HT-SIG, HT-STF, and HT-LFT(s) fields to the basic PPDU format. The HT PPDU format shown in FIG. 7(*b*) may be referred to as an HT-mixed format. In addition, an HT-greenfield format PPDU may be defined, and this corresponds to a format consisting of HT-GF-STF, HT-LTF1, HT-SIG, one or more HT-LTF, and Data field, not including L-STF, L-LTF, and L-SIG (not shown).

An example of the VHT PPDU format (IEEE 802.11ac) additionally includes VHT SIG-A, VHT-STF, VHT-LTF, and VHT-SIG-B fields to the basic PPDU format (as shown in FIG. 7(*c*)).

An example of the HE PPDU format (IEEE 802.11ax) additionally includes Repeated L-SIG (RL-SIG), HE-SIG-A, HE-SIG-B, HE-STF, HE-LTF(s), Packet Extension (PE) field to the basic PPDU format (as shown in FIG. 7(*d*)). Some fields may be excluded or their length may vary according to detailed examples of the HE PPDU format. For example, the HE-SIG-B field is included in the HE PPDU format for multi-user (MU), and the HE-SIG-B is not included in the HE PPDU format for single user (SU). In addition, the HE trigger-based (TB) PPDU format does not include the HE-SIG-B, and the length of the HE-STF field may vary to 8 us. The Extended Range (HE ER) SU PPDU format does not include the HE-SIG-B field, and the length of the HE-SIG-A field may vary to 16 us. For example, RL-SIG may be configured the same as L-SIG. The receiving STA can know that the received PPDU is a HE PPDU or an EHT PPDU, which will be described later, based on the presence of the RL-SIG.

The EHT PPDU format may include the EHT MU (multi-user) in FIG. 7(*c*) and the EHT TB (trigger-based) PPDU in FIG. 7(*f*). The EHT PPDU format is similar to the HE PPDU format in that it includes RL-SIG followed by L-SIG, but may include U (universal)-SIG, EHT-SIG, EHT-STF, and EHT-LTF following RL-SIG.

The EHT MU PPDU in FIG. 7(*c*) corresponds to a PPDU carrying one or more data (or PSDU) for one or more users. That is, the EHT MU PPDU may be used for both SU transmission and MU transmission. For example, the EHT MU PPDU may correspond to a PPDU for one receiving STA or multiple receiving STAs.

The EHT TB PPDU in FIG. 7(*f*) omits the EHT-SIG compared to the EHT MU PPDU. An STA that receives a trigger (e.g., trigger frame or triggered response scheduling (TRS)) for UL MU transmission may perform UL transmission based on the EHT TB PPDU format.

L-STF, L-LTF, L-SIG, RL-SIG, U-SIG (Universal SIGNAL), EHT-SIG fields may be encoded and modulated so that even legacy STAs may attempt demodulation and decoding, and may be mapped based on a determined subcarrier frequency interval (e.g., 312.5 kHz). These may be referred to as pre-EHT modulated fields. Next, the EHT-STF, EHT-LTF, Data, PE fields may be encoded and modulated to be demodulated and decoded by an STA that successfully decodes the non-legacy SIG (e.g., U-SIG and/or EHT-SIG) and obtains the information included in the field, and may be mapped based on a determined subcarrier frequency interval (e.g., 78.125 kHz). These may be referred to as EHT modulated fields.

Similarly, in the HE PPDU format, the L-STF, L-LTF, L-SIG, RL-SIG, HE-SIG-A, and HE-SIG-B fields may be referred to as pre-HE modulation fields, and the HE-STF, HE-LTF, Data, and PE fields may be referred to as HE modulation fields. Additionally, in the VHT PPDU format, the L-STF, L-LTF, L-SIG, and VHT-SIG-A fields may be referred to as free VHT modulation fields, and VHT STF, VHT-LTF, VHT-SIG-B, and Data fields may be referred to as VHT modulation fields.

The U-SIG included in the EHT PPDU format of FIG. 7 may be configured based on, for example, two symbols (e.g., two consecutive OFDM symbols). Each symbol (e.g., OFDM symbol) for U-SIG may have a duration of 4 us, and U-SIG may have a total duration of 8 us. Each symbol of U-SIG may be used to transmit 26 bits of information. For example, each symbol of U-SIG can be transmitted and received based on 52 data tones and 4 pilot tones.

U-SIG may be constructed in units of 20 MHz. For example, if an 80 MHz PPDU is constructed, the U-SIG may be duplicated. That is, the same 4 U-SIGs may be included in the 80 MHz PPDU. PPDUs exceeding 80 MHz bandwidth may include different U-SIGs.

For example, A number of uncoded bits may be transmitted through U-SIG, the first symbol of U-SIG (e.g., U-SIG-1 symbol) may transmit the first X bits of information out of the total A bits of information, and the second symbol of U-SIG (e.g., U-SIG-2 symbol) may transmit the remaining Y bit information of the total A bit information. A-bit information (e.g., 52 uncoded bits) may include a CRC field (e.g., a 4-bit long field) and a tail field (e.g., a 6-bit long field). For example, the tail field may be used to terminate the trellis of the convolutional decoder and may be set to 0.

A bit information transmitted by U-SIG may be divided into version-independent bits and version-dependent bits. For example, U-SIG may be included in a new PPDU format not shown in FIG. 7 (e.g., UHR PPDU format), and in the format of the U-SIG field included in the EHT PPDU format and the format of the U-SIG field included in the UHR PPDU format, version-independent bits may be the same, and some or all of the version-dependent bits may be different.

For example, the size of the version-independent bits of U-SIG may be fixed or variable. Version-independent bits may be assigned only to the U-SIG-1 symbol, or to both the U-SIG-1 symbol and the U-SIG-2 symbol. Version-independent bits and version-dependent bits may be called various names, such as first control bit and second control bit.

For example, the version-independent bits of U-SIG may include a 3-bit physical layer version identifier (PHY version identifier), and this information may indicate the PHY version (e.g., EHT, UHR, etc.) of the transmitted/received PPDU. The version-independent bits of U-SIG may include a 1-bit UL/DL flag field. The first value of the 1-bit UL/DL flag field is related to UL communication, and the second value of the UL/DL flag field is related to DL communication. The version-independent bits of U-SIG may include information about the length of transmission opportunity (TXOP) and information about the BSS color ID.

For example, the version-dependent bits of U-SIG may include information directly or indirectly indicating the type of PPDU (e.g., SU PPDU, MU PPDU, TB PPDU, etc.).

Information necessary for PPDU transmission and reception may be included in U-SIG. For example, U-SIG may further include information about whether information on bandwidth, information on the MCS technique applied to the non-legacy SIG (e.g., EHT-SIG or UHR-SIG, etc.), information indicating whether the DCM (dual carrier modulation) technique (e.g., a technique to achieve an effect similar to frequency diversity by reusing the same signal on two subcarriers) is applied to the non-legacy SIG, information on the number of symbols used for the non-legacy SIG, non-legacy SIG is generated across the entire band.

Some of the information required for PPDU transmission and reception may be included in U-SIG and/or non-legacy SIG (e.g., EHT-SIG or UHR-SIG, etc.). For example, information on the type of non-legacy LTF/STF (e.g., EHT-LTF/EHT-STF or UHR-LTF/UHR-STF, etc.), information on the length of the non-legacy LTF and CP (cyclic prefix) length, information on GI (guard interval) applicable to non-legacy LTF, information on preamble puncturing applicable to PPDU, information on RU (resource unit) allocation, etc. may be included only in the U-SIG, only in the non-legacy SIG, or may be indicated by a combination of information included in the U-SIG and information included in the non-legacy SIG.

Preamble puncturing may mean transmission of a PPDU in which a signal does not exist in one or more frequency units among the bandwidth of the PPDU. For example, the size of the frequency unit (or resolution of preamble puncturing) may be defined as 20 MHz, 40 MHz, etc. For example, preamble puncturing may be applied to a PPDU bandwidth of a predetermined size or more.

In the example of FIG. 7, non-legacy SIGs such as HE-SIG-B and EHT-SIG may include control information for the receiving STA. A non-legacy SIG may be transmitted over at least one symbol, and one symbol may have a length of 4 us. Information about the number of symbols used for the EHT-SIG may be included in previous SIGs (e.g., HE-SIG-A, U-SIG, etc.).

Non-legacy SIGs such as HE-SIG-B and EHT-SIG may include common fields and user-specific fields. Common fields and user-specific fields may be coded separately.

In some cases, common fields may be omitted. For example, in a compression mode where non-OFDMA (orthogonal frequency multiple access) is applied, the common field may be omitted, and multiple STAs may receive a PPDU (e.g., a data field of the PPDU) through the same frequency band. In a non-compressed mode where OFDMA is applied, multiple users may receive a PPDU (e.g., a data field of the PPDU) through different frequency bands.

The number of user-specific fields may be determined based on the number of users. One user block field may include up to two user fields. Each user field may be associated with a MU-MIMO allocation or may be associated with a non-MU-MIMO allocation.

The common field may include a CRC bit and a Tail bit, and the length of the CRC bit may be determined to be 4 bits, and the length of the Tail bit may be determined to be 6 bits and set to 000000. The common field may include RU allocation information. RU allocation information may include information about the location of the RU to which multiple users (i.e., multiple receiving STAs) are assigned.

RU may include multiple subcarriers (or tones). RU may be used when transmitting signals to multiple STAs based on OFDMA technique. Additionally, RU may be defined even when transmitting a signal to one STA. Resources may be allocated in RU units for non-legacy STF, non-legacy LTF, and Data fields.

An RU of applicable size may be defined according to the PPDU bandwidth. RU may be defined identically or differently for the applied PPDU format (e.g., HE PPDU, EHT PPDU, UHR PPDU, etc.). For example, in the case of 80 MHz PPDU, the RU placement of HE PPDU and EHT PPDU may be different. applicable RU size, number of RU, and RU location for each PPDU bandwidth, DC (direct current) subcarrier location and number, null subcarrier location and number, guard subcarrier location and number, etc. may be referred to as a tone-plan. For example, a tone-plan for high bandwidth may be defined in the form of multiple iterations of a low-bandwidth tone-plan.

RUs of various sizes may be defined as 26-tone RU, 52-tone RU, 106-tone RU, 242-tone RU, 484-tone RU, 996-tone RU, 2X996-tone RU, 3X996-tone RU, etc. MRU (multiple RU) is distinguished from a plurality of individual RUs and corresponds to a group of subcarriers composed of a plurality of RUs. For example, one MRU may be defined as 52+26-tone, 106+26-tone, 484+242-tone, 996+484-tone, 996+484+242-tone, 2X996+484-tone, 3X996-tone, or 3X996+484-tone. Additionally, a plurality of RUs constituting one MRU may or may not be continuous in the frequency domain.

The specific size of the RU may be reduced or expanded. Accordingly, the specific size of each RU (i.e., the number of corresponding tones) in the present disclosure is not limiting and is illustrative. Additionally, in the present disclosure, within a predetermined bandwidth (e.g., 20, 40, 80, 160, 320 MHz, . . . ), the number of RUs may vary depending on the RU size.

The names of each field in the PPDU formats of FIG. 7 are exemplary, and the scope of the present disclosure is not limited by the names. In addition, examples of the present disclosure may be applied to the PPDU format illustrated in FIG. 7 as well as to a new PPDU format in which some fields are excluded and/or some fields are added based on the PPDU formats of FIG. 7.

Resource Unit

Figure 8:
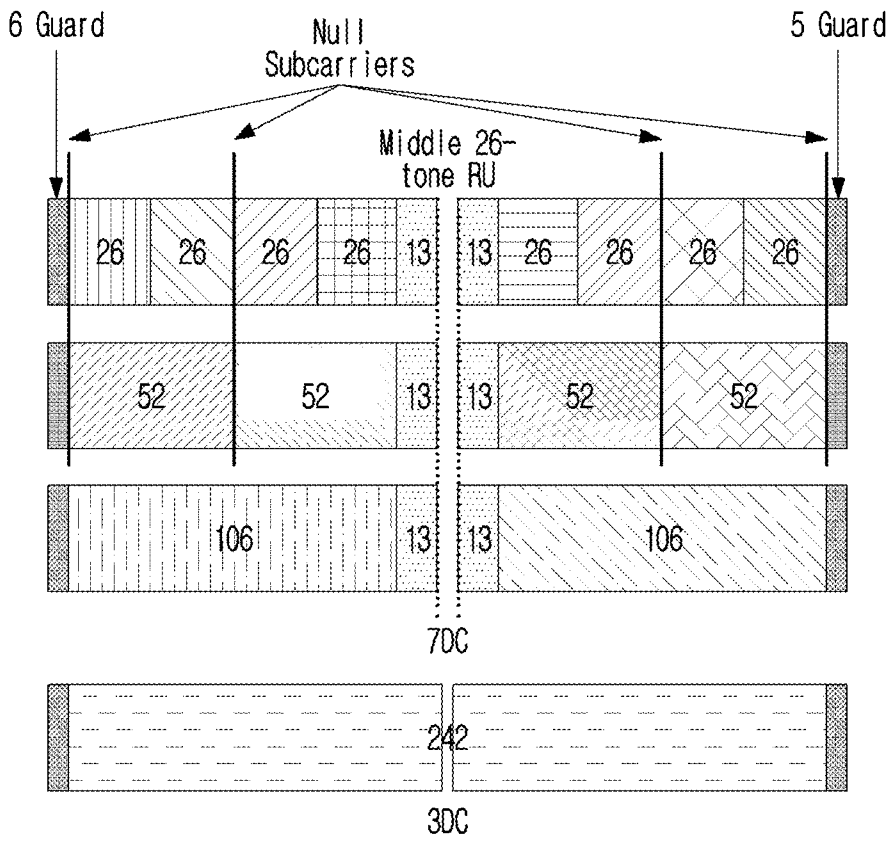
FIGS. 8 to 10 are diagrams for explaining examples of resource units of a WLAN system to which the present disclosure may be applied.
Figure 9:
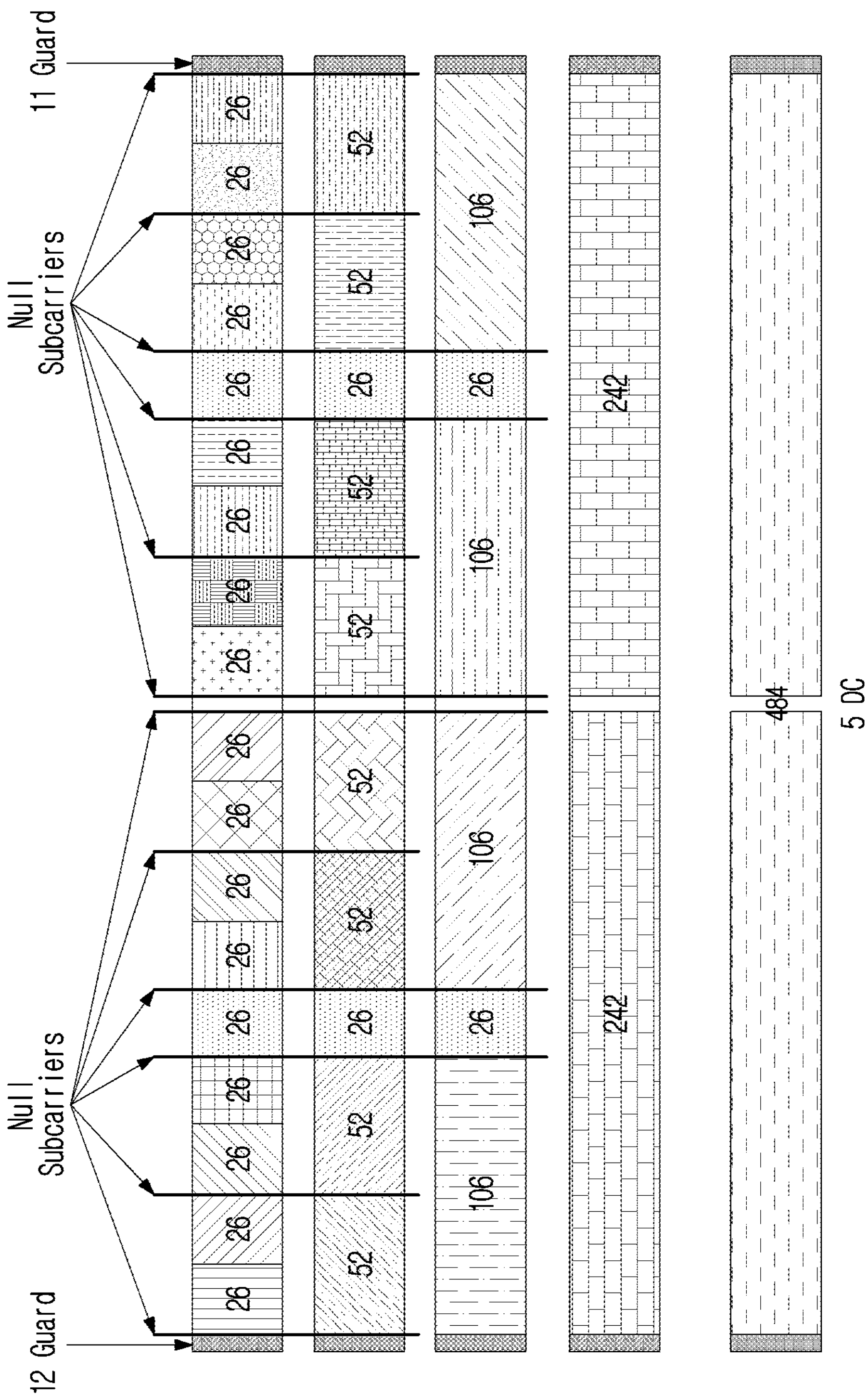
Figure 10:
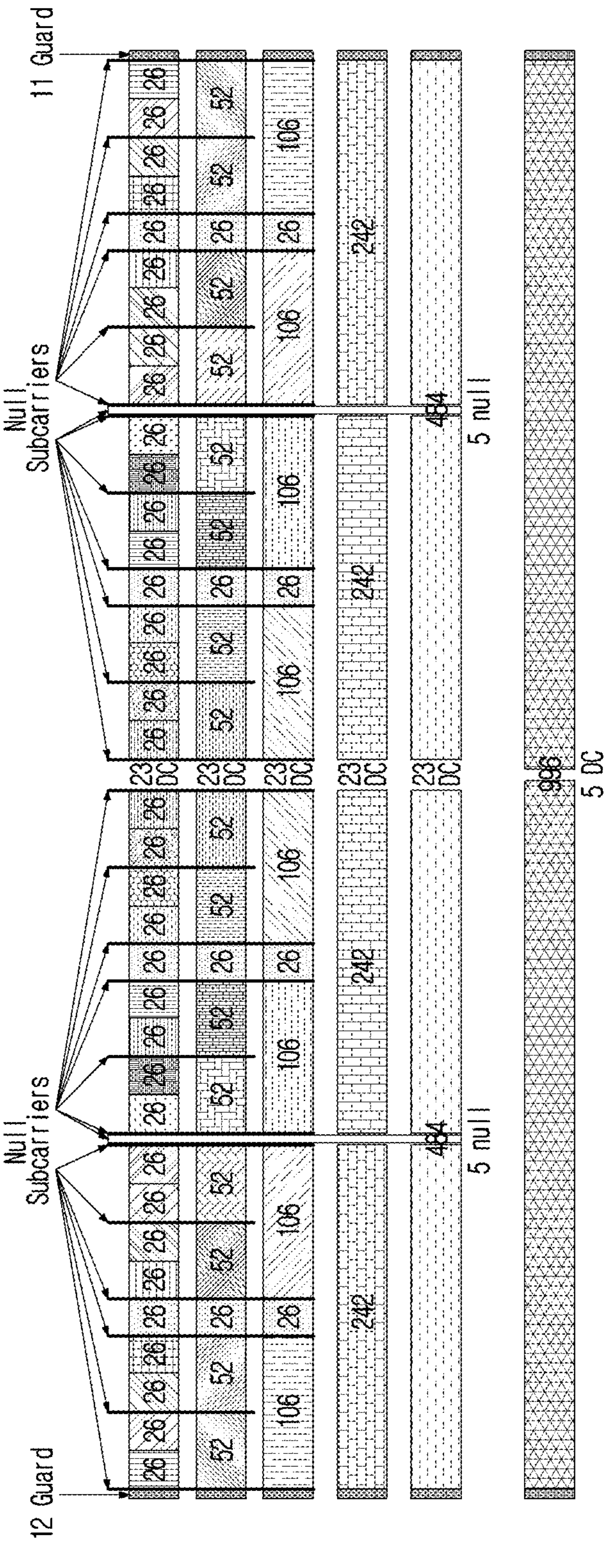

FIGS. 8 to 10 are diagrams for explaining examples of resource units of a WLAN system to which the present disclosure may be applied.

Referring to FIGS. 8 to 10, a resource unit (RU) defined in a wireless LAN system will be described. the RU may include a plurality of subcarriers (or tones). The RU may be used when transmitting signals to multiple STAs based on the OFDMA scheme. In addition, the RU may be defined even when a signal is transmitted to one STA. The RU may be used for STF, LTF, data field of the PPDU, etc.

As shown in FIGS. 8 to 10, RUs corresponding to different numbers of tones (i.e., subcarriers) are used to construct some fields of 20 MHz, 40 MHz, or 80 MHz X-PPDUs (X is HE, EHT, etc.). For example, resources may be allocated in RU units shown for the X-STF, X-LTF, and Data field.

FIG. 8 is a diagram illustrating an exemplary allocation of resource units (RUs) used on a 20 MHz band.

As shown at the top of FIG. 8, 26-units (i.e., units corresponding to 26 tones) may be allocated. 6 tones may be used as a guard band in the leftmost band of the 20 MHz band, and 5 tones may be used as a guard band in the rightmost band of the 20 MHz band. In addition, 7 DC tones are inserted in the center band, that is, the DC band, and 26-units corresponding to each of the 13 tones may exist on the left and right sides of the DC band. In addition, 26-unit, 52-unit, and 106-unit may be allocated to other bands. Each unit may be allocated for STAs or users.

The RU allocation of FIG. 8 is utilized not only in a situation for multiple users (MU) but also in a situation for a single user (SU), and in this case, it is possible to use one 242-unit as shown at the bottom of FIG. 8. In this case, three DC tones may be inserted.

In the example of FIG. 8, RUs of various sizes, that is, 26-RU, 52-RU, 106-RU, 242-RU, etc. are exemplified, but the specific size of these RUs may be reduced or expanded. Therefore, in the present disclosure, the specific size of each RU (i.e., the number of corresponding tones) is exemplary and not restrictive. In addition, within a predetermined bandwidth (e.g., 20, 40, 80, 160, 320 MHZ, . . . ) in the present disclosure, the number of RUs may vary according to the size of the RU. In the examples of FIG. 9 and/or FIG. 10 to be described below, the fact that the size and/or number of RUs may be varied is the same as the example of FIG. 8.

FIG. 9 is a diagram illustrating an exemplary allocation of resource units (RUs) used on a 40 MHz band.

Just as RUs of various sizes are used in the example of FIG. 8, 26-RU, 52-RU, 106-RU, 242-RU, 484-RU, and the like may be used in the example of FIG. 9 as well. In addition, 5 DC tones may be inserted at the center frequency, 12 tones may be used as a guard band in the leftmost band of the 40 MHz band, and 11 tones may be used as a guard band in the rightmost band of the 40 MHz band.

In addition, as shown, when used for a single user, a 484-RU may be used.

FIG. 10 is a diagram illustrating an exemplary allocation of resource units (RUs) used on an 80 MHz band.

Just as RUs of various sizes are used in the example of FIG. 8 and FIG. 9, 26-RU, 52-RU, 106-RU, 242-RU, 484-RU, 996-RU and the like may be used in the example of FIG. 10 as well. In addition, in the case of an 80 MHz PPDU, RU allocation of HE PPDUs and EHT PPDUs may be different, and the example of FIG. 10 shows an example of RU allocation for 80 MHz EHT PPDUs. The scheme that 12 tones are used as a guard band in the leftmost band of the 80 MHZ band and 11 tones are used as a guard band in the rightmost band of the 80 MHz band in the example of FIG. 10 is the same in HE PPDU and EHT PPDU. Unlike HE PPDU, where 7 DC tones are inserted in the DC band and there is one 26-RU corresponding to each of the 13 tones on the left and right sides of the DC band, in the EHT PPDU, 23 DC tones are inserted into the DC band, and one 26-RU exists on the left and right sides of the DC band. Unlike the HE PPDU, where one null subcarrier exists between 242-RUs rather than the center band, there are five null subcarriers in the EHT PPDU. In the HE PPDU, one 484-RU does not include null subcarriers, but in the EHT PPDU, one 484-RU includes 5 null subcarriers.

In addition, as shown, when used for a single user, 996-RU may be used, and in this case, 5 DC tones are inserted in common with HE PPDU and EHT PPDU.

EHT PPDUs over 160 MHz may be configured with a plurality of 80 MHz subblocks in FIG. 10. The RU allocation for each 80 MHz subblock may be the same as that of the 80 MHZ EHT PPDU of FIG. 10. If the 80 MHz subblock of the 160 MHz or 320 MHZ EHT PPDU is not punctured and the entire 80 MHz subblock is used as part of RU or multiple RU (MRU), the 80 MHz subblock may use 996-RU of FIG. 10.

Here, the MRU corresponds to a group of subcarriers (or tones) composed of a plurality of RUs, and the plurality of RUs constituting the MRU may be RUs having the same size or RUs having different sizes. For example, a single MRU may be defined as 52+26-tone, 106+26-tone, 484+242-tone, 996+484-tone, 996+484+242-tone, 2X996+484-tone, 3X996-tone, or 3X996+484-tone. Here, the plurality of RUs constituting one MRU may correspond to small size (e.g., 26, 52, or 106) RUs or large size (e.g., 242, 484, or 996) RUs. That is, one MRU including a small size RU and a large size RU may not be configured/defined. In addition, a plurality of RUs constituting one MRU may or may not be consecutive in the frequency domain.

When an 80 MHz subblock includes RUs smaller than 996 tones, or parts of the 80 MHZ subblock are punctured, the 80 MHz subblock may use RU allocation other than the 996-tone RU.

The RU of the present disclosure may be used for uplink (UL) and/or downlink (DL) communication. For example, when trigger-based UL-MU communication is performed, the STA transmitting the trigger (e.g., AP) may allocate a first RU (e.g., 26/52/106/242-RU, etc.) to a first STA and allocate a second RU (e.g., 26/52/106/242-RU, etc.) to a second STA, through trigger information (e.g., trigger frame or triggered response scheduling (TRS)). Thereafter, the first STA may transmit a first trigger-based (TB) PPDU based on the first RU, and the second STA may transmit a second TB PPDU based on the second RU. The first/second TB PPDUs may be transmitted to the AP in the same time period.

For example, when a DL MU PPDU is configured, the STA transmitting the DL MU PPDU (e.g., AP) may allocate a first RU (e.g., 26/52/106/242-RU, etc.) to a first STA and allocate a second RU (e.g., 26/52/106/242-RU, etc.) to a second STA. In other words, a transmitting STA (e.g., an AP) may transmit X-STF (e.g., X is HE, EHT, etc.), X-LTF or a data field for a first STA through a first RU within one MU PPDU and may transmit X-STF, X-LTF or a data field for a second STA through a second RU. Information about the arrangement of RUs may be signaled through the X-SIG (e.g., X is HE, EHT or U) field of a X-PPDU format.

Distributed Resource Unit

Due to regulations in various regions, limitations on power spectral density (PSD) in a sub-7 GHz (e.g., 6 GHZ) band may be applied. For a non-AP STA in a low power indoor (LPI) band, PSD limitations may be −1 dBm/MHz. For example, for the existing 52-tone RU, the maximum transmit (Tx) power may be approximately 6 dBm.

In addition, different limitations may be applied in 2.4 GHz and 5 GHz bands. For example, in EU/China/Japan/Korea, PSD limitations of 10 dBm/MHz may be applied in a 2.4 GHz band. For the existing 52-tone RU, the maximum Tx power may be approximately 17 dBm. If PSD limitations may be avoided in a 5 GHz band, the transmission power may be increased. For example, for the existing 52-tone RU, the maximum transmission power is 24 dBm, which is still lower than the maximum allowable effective isotropic radiated power (EIRP) of 30 dBm by 6 dBm.

When PSD limitations are overcome, the transmission power may be increased, thereby enhancing spectrum efficiency or extending a range.

Considering that PSD limitations are defined per MHz for each STA, when the tones of small RUs are distributed on a wide bandwidth, tones for each STA are non-contiguous, so each tone may be transmitted at high power. A RU including such distributed tones is called a distributed RU (DRU), and in order to distinguish from this, a RU including contiguous tones defined in an existing WLAN system (e.g., a system according to IEEE 802.11ax, 11be, etc.) may be called a regular RU (RRU).

Compared to a STA transmitting an existing RRU, a STA transmitting a DRU may use higher power. For example, a 52-tone DRU across 80 MHz has only one tone per MHz, while a 52-tone RRU has about 13 tones per MHz. When PSD limitations of −1 dBm/MHz are assumed in a 6 GHz LPI band, for a 52-tone RU, transmission power may be increased by 11 dB when a DRU is used. When transmission power is increased in this way, a higher MCS may be applied and a longer range may be supported.

Figure 11:
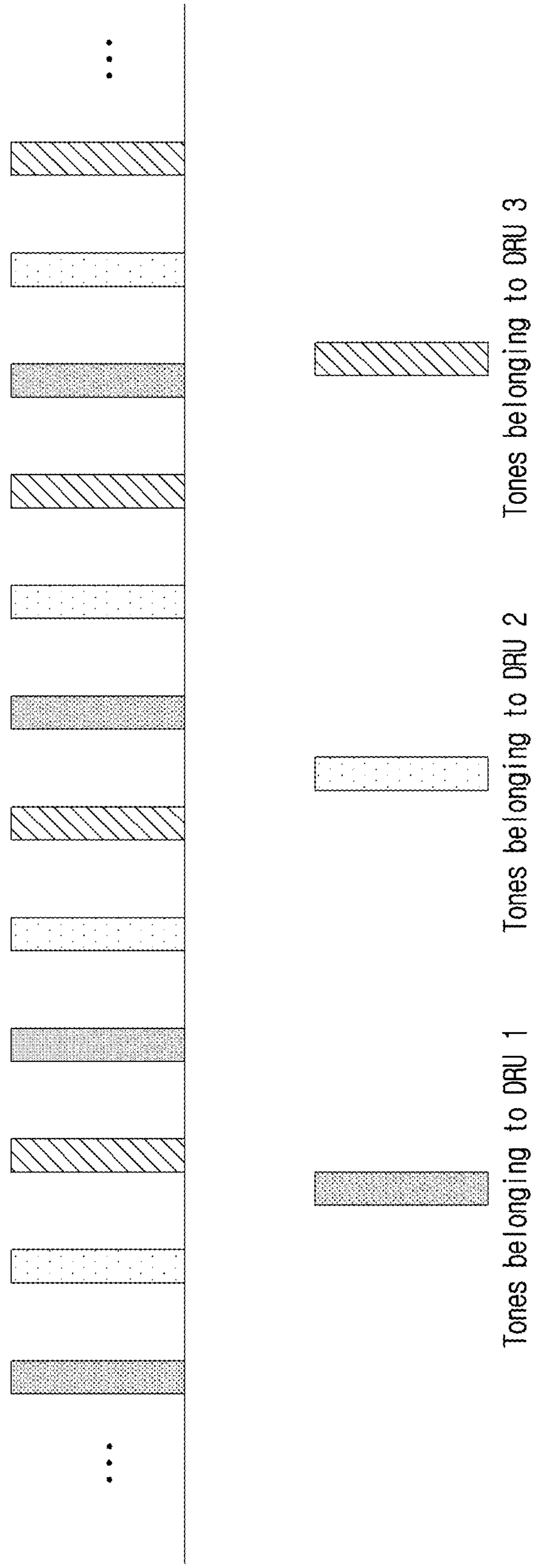
FIG. 11 is a diagram for describing examples of a DRU to which the present disclosure may be applied.

FIG. 11 is a diagram for describing examples of a DRU to which the present disclosure may be applied.

The example of FIG. 11 illustratively shows that STA1 performs transmission on DRU1, STA2 performs transmission on DRU2 and STA3 performs transmission on DRU3. Each STA may use a DRU to apply a transmission power boost. Compared to a case of using a RRU in the same size, higher transmission power may be applied to all tones in a DRU, and accordingly, spectral efficiency may be greatly improved. In this way, a DRU may be usefully applied particularly in UL-OFDMA.

A DRU may also be utilized for an AP. In some cases, a AP may perform DL-OFDMA transmission to STA(s) by using only some of DRU1, DRU2 and DRU3, and in this case, a transmission power boost due to the use of a DRU may be applied.

In order to maximize a power boost, tones within one DRU may be distributed as far as possible. For example, a DRU including one tone per MHz may be considered as an optimal example. The size of a DRU (or the number of available tones included in one DRU (i.e., the number of tones excluding unavailable tones such as null tones, guard tones, DC tones, etc.) may be defined to be the same as the size of a RRU (or the number of available tones included in one RRU). Accordingly, impact on various technologies defined based on an existing RRU may be minimized. A table below shows an example of an achievable power boost (in a unit of dB) for a variety of DRUs distributed on a different bandwidth. Examples in a table below assume a 6 GHz LPI band and a power boost may also be obtained in 2.4 GHz and 5 GHz bands in other regions. For example, in 80 MHz UL-OFDMA transmission by 8 users, when each user uses a 106-tone DRU, the general performance may be improved by approximately 8.13 dB compared to a case when each user uses a 106-tone RRU. In this way, a DRU may be used to overcome PSD limitations and gain significant profits.

TABLE 1

| | 20 MHz Bandwidth | 40 MHz Bandwidth | 80 MHz Bandwidth |
|---|---|---|---|
| 26-tone RU | 8.13 | 11.14 | 11.14 |
| 52-tone RU | 6.37 | 8.13 | 11.14 |

TABLE 1-continued

| | 20 MHz Bandwidth | 40 MHz Bandwidth | 80 MHz Bandwidth |
|---|---|---|---|
| 106-tone RU | 3.36 | 6.37 | 8.13 |
| 242-tone RU | Not Applied | 2.69 | 5.12 |
| 484-tone RU | Not Applied | Not Applied | 2.69 |

Trigger Frame

Figure 12:
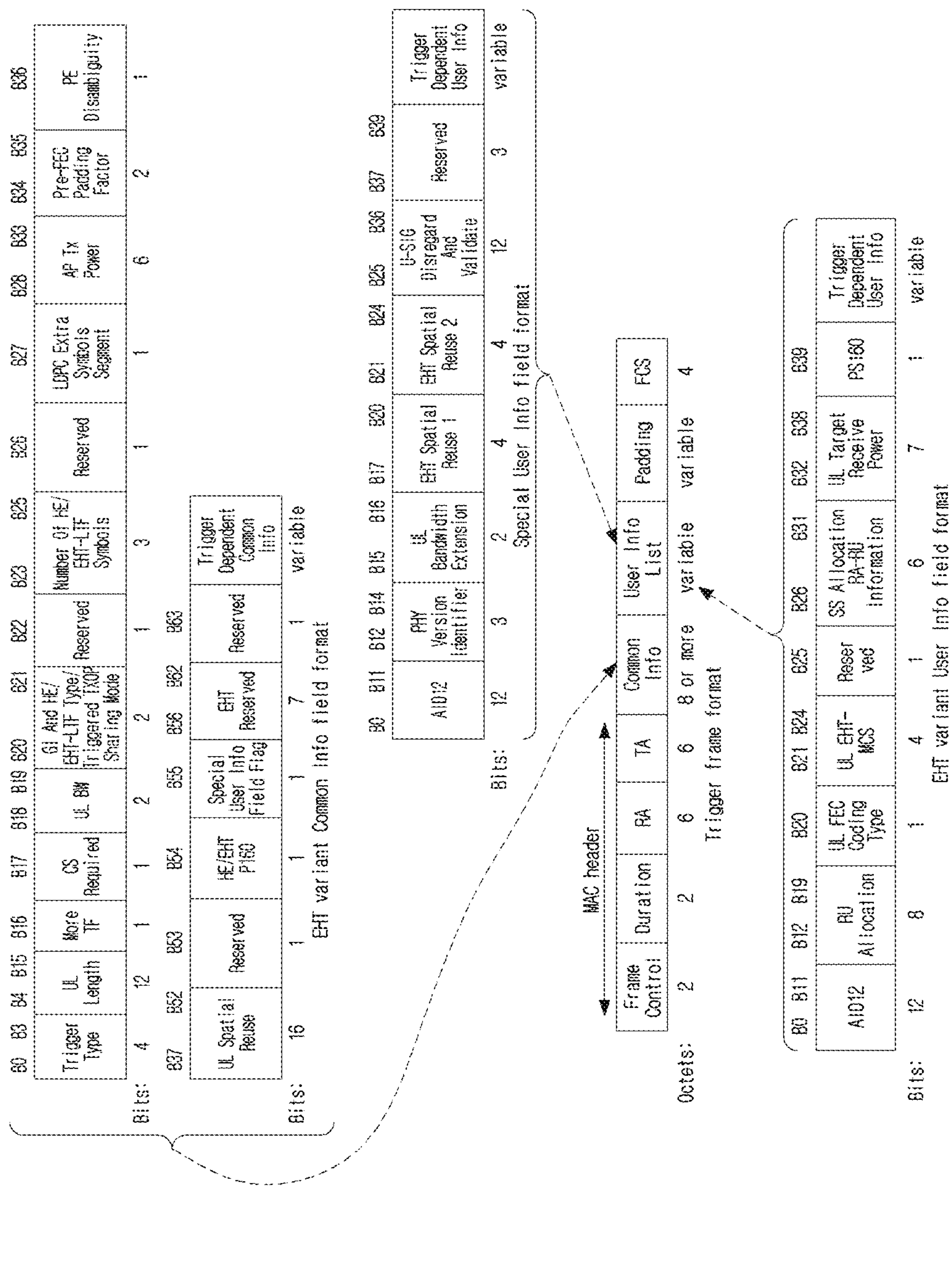
FIG. 12 is a diagram representing an illustrative format of a trigger frame to which the present disclosure may be applied.

FIG. 12 is a diagram representing an illustrative format of a trigger frame to which the present disclosure may be applied.

A trigger frame may allocate a resource for at least one TB PPDU transmission and request TB PPDU transmission. A trigger frame may also include other information required by a STA which transmits a TB PPDU in response thereto. A trigger frame may include common information and a user information list field in a frame body.

Figure 14:
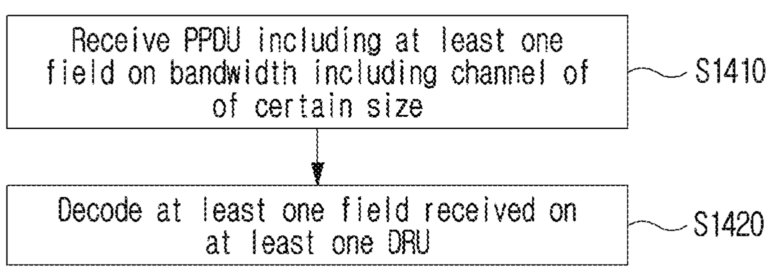
FIG. 14 is a diagram for describing an example of a DRU tone plan-based PPDU reception method of a second STA according to the present disclosure.

A common information field may include information commonly applied to at least one TB PPDU transmission requested by a trigger frame, e.g., a trigger type, a UL length, whether a subsequent trigger frame exists (e.g., More TF), whether channel sensing (CS) is required, a UL bandwidth (BW), etc. FIG. 14 illustratively shows a EHT variant common information field format.

A trigger type subfield in a 4-bit size may have a value from 0 to 15. Among them, a value of a trigger type subfield, 0, 1, 2, 3, 4, 5, 6 and 7, is defined as corresponding to basic, Beamforming Report Poll (BFRP), multi user-block acknowledgment request (MU-BAR), multi user-request to send (MU-RTS), Buffer Status Report Poll (BSRP), groupcast with retries (GCR) MU-BAR, Bandwidth Query Report Poll (BQRP) and NDP Feedback Report Poll (NFRP) and a value of 8-15 is defined as being reserved.

Among common information, a trigger dependent common information subfield may include information that is selectively included based on a trigger type.

A special user information field may be included in a trigger frame. A special user information field does not include user-specific information, but includes extended common information which is not provided in a common information field.

A user information list includes at least 0 user information field. FIG. 14 illustratively represents an EHT variant user information field format.

It represents that a AID12 subfield is basically a user information field for a STA having a corresponding AID. In addition, when a AID12 field has a predetermined specific value, it may be utilized for other purpose including allocating a random access (RA)-RU or being configured in a form of a special user information field. A special user information field is a user information field which does not include user-specific information but includes extended common information not provided in a common information field. For example, a special user information field may be identified by an AID12 value of 2007 and a special user information field flag subfield in a common information field may represent whether a special user information field is included.

A RU allocation subfield may represent a size and a position of a RU/a MRU. To this end, a RU allocation subfield may be interpreted with a PS160 (primary/secondary 160 MHz) subfield of a user information field, a UL BW subfield of a common information field, etc.

For example, as in Table 2 below, the mapping of B7-B1 of a RU allocation subfield may be defined together with the setting of B0 and PS160 subfields of a RU allocation subfield. Table 2 shows an example of encoding of a PS160 subfield and a RU allocation subfield of a EHT variant user information field.

TABLE 2

| PS160 subfield | B0 of the RU Allocation subfield | B7-B1 of the RU Allocation subfield | Bandwidth (MHz) | RU/MRU size | RU/MRU index | PHY RU/MRU index |
|---|---|---|---|---|---|---|
| 0-3: 80 MHz segment where the RU is located | | 0-8 | 20, 40, 80, 160, or 320 | 26 | RU1 to RU9, respectively | 37 × N + RU index |
| | | 9-17 | 40, 80, 160, or 320 | | RU10 to RU18, respectively | |
| | | 18 | 80, 160, or 320 | | Reserved | |
| | | 19-36 | 80, 160, or 320 | | RU20 to RU37, respectively | |
| | | 37-40 | 20, 40, 80, 160, or 320 | 52 | RU1 to RU4, respectively | 16 × N + RU index |
| | | 41-44 | 40, 80, 160, or 320 | | RU5 to RU8, respectively | |
| | | 45-52 | 80, 160, or 320 | | RU9 to RU16, respectively | |
| | | 53, 54 | 20, 40, 80, 160, or 320 | 106 | RU1 and RU2, respectively | 8 × N + RU index |
| | | 55,56 | 40, 80, 160, or 320 | | RU3 and RU4, respectively | |
| | | 57-60 | 80, 160, or 320 | | RU5 to RU8, respectively | |
| | | 61 | 20, 40, 80, 160, or 320 | 242 | RU1 | 4 × N + RU index |
| | | 62 | 40, 80, 160, or 320 | | RU2 | |
| | | 63, 64 | 80, 160, or 320 | | RU3 and RU4, respectively | |
| | | 65 | 40, 80, 160, or 320 | 484 | RU1 | 2 × N + RU index |
| | | 66 | 80, 160, or 320 | | RU2 | |

TABLE 2-continued

| PS160 subfield | B0 of the RU Allocation subfield | B7-B1 of the RU Allocation subfield | Bandwidth (MHz) | RU/ MRU size | RU/ MRU index | PHY RU/ MRU index |
|---|---|---|---|---|---|---|
| | | 67 | 80, 160, or 320 | 996 | RU1 | N + RU index |
| 0-1: 160 MHz segment where the RU is located | 0 | 68 | | Reserved | | Reserved |
| | 1 | | 160 or 320 | 2 × 996 | RU1 | X1 + RU index |
| 0 | 0 | 69 | | Reserved | | Reserved |
| 0 | 1 | | | | | |
| 1 | 0 | | | | | |
| 1 | 1 | | 320 | 4 × 996 | RU1 | RU1 |
| 0-3: 80 MHz segment where the RU is located | | 70-72 | 20, 40, 80, 160, or 320 | 52 + 26 | MRU1 to MRU3, respectively | 12 × N + MRU index |
| | | 73-75 | 40, 80, 160, or 320 | 52 + 26 | MRU4 to MRU6, respectively | |
| | | 76-81 | 80, 160, or 320 | 52 + 26 | MRU7 to MRU12, respectively | |
| | | 82, 83 | 20, 40, 80, 160, or 320 | 106 + 26 | MRU1 and MRU2, respectively | 8 × N + MRU index |
| | | 84, 85 | 40, 80, 160, or 320 | 106 + 26 | MRU3 and MRU4, respectively | |
| | | 86-89 | 80, 160, or 320 | 106 + 26 | MRU5 to MRU8, respectively | |
| | | 90-93 | 80, 160, or 320 | 484 + 242 | MRU1 to MRU4, respectively | 4 × N + MRU index |
| 0-1: 160 MHz segment where the MRU is located | 0 | 94, 95 | 160 or 320 | 996 + 484 | MRU1 and MRU2, respectively | 4 × X1 + MRU index |
| | 1 | | | | MRU1 and MRU2, respectively | |
| 0-1 160 MHz segment where the MRU is located | 0 | 96-99 | 160 or 320 | 996 + 484 + 242 | MRU1 to MRU4, respectively | 8 × X1 + MRU index |
| | 1 | | | | MRU5 to MRU8, respectively | |
| 0 | 0 | 100-103 | 320 | 2 × 996 + 484 | MRU1 to MRU4, respectively | MRU index |
| 0 | 1 | | | | MRU5 and MRU6, respectively | |
| 1 | 0 | | | | MRU7 and MRU8, respectively | |
| 1 | 1 | | | | MRU9 to MRU12, respectively | |
| 0 | 0 | 104 | 320 | 3 × 996 | MRU1 | MRU index |
| 0 | 1 | | | | MRU2 | |
| 1 | 0 | | | | MRU3 | |
| 1 | 1 | | | | MRU4 | |
| 0 | 0 | 105, 106 | 320 | 3 × 996 + 484 | MRU1 and MRU2, respectively | MRU index |
| 0 | 1 | | | | MRU3 and MRU4, respectively | |
| 1 | 0 | | | | MRU5 and MRU6, respectively | |
| 1 | 1 | | | | MRU7 and MRU8, respectively | |
| Any | Any | 107-127 | Any | Reserved | Reserved | Reserved |

When B0 of a RU allocation subfield is set as 0, it may represent that RU/MRU allocation is applied to a primary 80 MHz channel and when its value is set as 1, it may represent that RU allocation is applied to the secondary 80 MHz channel of a primary 160 MHz. When B0 of a RU allocation subfield is set as 0, it may represent that RU/MRU allocation is applied to the lower 80 MHz of a secondary 160 MHz and when its value is set as 1, it may represent that RU allocation is applied to the upper 80 MHz of a secondary 160 MHz.

In the trigger frame RU allocation table of Table 2, parameter N may be calculated based on the formula of N=2*X1+X0. For the bandwidth of 80 MHz or less, PS160, B0, X0 and X1 values may be set as 0. For the bandwidth of 160 MHz and 320 MHz, PS160, B0, X0 and X1 values may be set as in Table 3. This configuration represents absolute frequency order for primary and secondary 80 MHz and 160 MHz channels. The order from left to right represents the order from low frequency to high frequency. A primary 80 MHz channel is represented as P80, a secondary 80 MHz channel is represented as S80 and a secondary 160 MHz channel is represented as S160.

TABLE 3

| Bandwidth | Inputs | | | Outputs | | |
|---|---|---|---|---|---|---|
| (MHz) | Configuration | PS160 | B0 | X0 | X1 | N |
| 20/40/80 | [P80] | 0 | 0 | 0 | 0 | 0 |
| 160 | [P80 S80] | 0 | 0 | 0 | 0 | 0 |
| | | 0 | 1 | 1 | 0 | 1 |
| | [S80 P80] | 0 | 0 | 1 | 0 | 1 |
| | | 0 | 1 | 0 | 0 | 0 |
| 320 | [P80 S80 S160] | 0 | 0 | 0 | 0 | 0 |
| | | 0 | 1 | 1 | 0 | 1 |
| | | 1 | 0 | 0 | 1 | 2 |
| | | 1 | 1 | 1 | 1 | 3 |
| | [S80 P80 S160] | 0 | 0 | 1 | 0 | 1 |
| | | 0 | 1 | 0 | 0 | 0 |
| | | 1 | 0 | 0 | 1 | 2 |
| | | 1 | 1 | 1 | 1 | 3 |
| | [S160 P80 S80] | 0 | 0 | 0 | 1 | 2 |
| | | 0 | 1 | 1 | 1 | 3 |
| | | 1 | 0 | 0 | 0 | 0 |
| | | 1 | 1 | 1 | 0 | 1 |
| | [S160 S80 P80] | 0 | 0 | 1 | 1 | 3 |
| | | 0 | 1 | 0 | 1 | 2 |
| | | 1 | 0 | 0 | 0 | 0 |
| | | 1 | 1 | 1 | 0 | 1 |

DRU Tone Plan based Transmission and Reception

As described above, in order to overcome PSD limitations and improve power gains, a DRU using distributed tones/subcarriers, not a RRU using contiguous tones/subcarriers, may be applied.

In the present disclosure, various DRU tone plans for a 20 MHz bandwidth/channel (hereinafter, Embodiment 1) and various RU tone plans for a 40 MHz bandwidth/channel (hereinafter, Embodiment 2) are proposed.

In embodiments described below, a DRU index (i.e., DRU n) or the n-th DRU may correspond to a position in a frequency domain or may be assigned regardless of a position in a frequency domain. In embodiments described below, for the clarity of a description, it is described by assuming that a relatively low DRU index includes a relatively low tone/subcarrier, but the scope of the present disclosure is not limited thereto, and a DRU index may be assigned in various ways to distinguish a different DRU.

In addition, in the following description, a subcarrier index may assume that the index of a DC subcarrier is 0 and corresponds to a position in a frequency domain, and a term of subcarrier may be replaced with a tone. For example, '−a' means a tone having a −a index, and a corresponding tone may be positioned on the left based on the center of a bandwidth/a channel (e.g., a low frequency domain based on the corresponding center). In addition, '+a' means a tone having a +a index, and a corresponding tone may be positioned on the right based on the center of a bandwidth/a channel (e.g., a high frequency domain based on the corresponding center).

In the present disclosure, 'a:b:c' means tones at a position corresponding to b tone units from a tone having an a index to a tone having a c index, and means that corresponding tones may be allocated/designated to each DRU.

Embodiment 1

This embodiment relates to a method for defining a tone plan for a 26-tone DRU, a 52-tone DRU and a 106-tone DRU with respect to a DRU tone plan in a 20 MHz bandwidth/channel.

Embodiment 1-1

This embodiment relates to various methods for defining a tone plan for a 26-tone DRU for a 20 MHz bandwidth/channel. Regarding a DRU tone plan for a 20 MHz bandwidth/channel, at least one of the methods described below may be applied.

Basically, it is described below on the premise that the same size and the same number of DRUs as the existing 20 MHz RRU tone plan are defined (but, excluding a 242-tone DRU). In the description of methods below, the same number of guard tones, null tones and DC tones at the same position as before may be based on a 20 MHz tone plan in FIG. 8 described above.

(Method 1-1)

A tone plan for a 26-tone DRU may be defined by assuming the same number of guard tones, null tones and DC tones at the same position as before.

For example, each tone may be allocated to each of the nine 26-tone DRUs in order from the lowest available tone to the highest available tone. In this case, it is assumed that the existing guard tones, null tones and DC tones are maintained.

A specific tone plan for nine 26-tone DRUs based on this method may be as follows.

26-tone DRU 1: Tone Index [−121:9:−76, −66:9:−12, 4:9:67, 77:9:113]

26-tone DRU 2: Tone Index [−120:9:−75, −65:9:−11, 5:9:68, 78:9:114]

26-tone DRU 3: Tone Index [−119:9:−74, −64:9:−10, 6:9:60, 70:9:115]

26-tone DRU 4: Tone Index [−118:9:−73, −63:9:−9, 7:9:61, 71:9:116]

26-tone DRU 5: Tone Index [−117:9:−72, −62:9:−8, 8:9:62, 72:9:117]

26-tone DRU 6: Tone Index [−116:9:−71, −61:9:−7, 9:9:63, 73:9:118]

26-tone DRU 7: Tone Index [−115:9:−70, −60:9:−6, 10:9:64, 74:9:119]

26-tone DRU 8: Tone Index [−114:9:−78, −68:9:−5, 11:9:65, 75:9:120]

26-tone DRU 9: Tone Index [−113:9:−77, −67:9:−4, 12:9:66, 76:9:121]

This method may be efficient in implementation in that it uses the same null tone as the existing 20 MHz tone plan (e.g., refer to FIG. 8).

(Method 1-2)

A tone plan for a 26-tone DRU may be defined by assuming the same number of guard tones and DC tones at the same position as before and four additional DC tones or null tones (e.g., [−5, −4, +4, +5]).

For example, each tone may be allocated to each of the nine 26-tone DRUs in order from the lowest available tone to the highest available tone. In this case, it is assumed that the existing guard tones and DC tones are maintained and four additional DC tones or null tones are considered.

A specific tone plan for nine 26-tone DRUs based on this method may be as follows.

26-tone DRU 1: Tone Index [−122:9:−14, 6:9:114]
26-tone DRU 2: Tone Index [−121:9:−13, 7:9:115]
26-tone DRU 3: Tone Index [−120:9:−12, 8:9:116]
26-tone DRU 4: Tone Index [−119:9:−11, 9:9:117]
26-tone DRU 5: Tone Index [−118:9:−10, 10:9:118]
26-tone DRU 6: Tone Index [−117:9:−9, 11:9:119]
26-tone DRU 7: Tone Index [−116:9:−8, 12:9:120]
26-tone DRU 8: Tone Index [−115:9:−7, 13:9:121]
26-tone DRU 9: Tone Index [−114:9:−6, 14:9:122]

This method may be efficient in smoothing gain, etc. in that it may obtain a relatively even tone plan. In addition, this method may be efficient in terms of a DC offset, etc.

(Method 1-3)

A tone plan for a 26-tone DRU may be defined by assuming the same number of guard tones and DC tones at the same position as before and each of two additional guard tones and DC tones or four null tones (e.g., [−122, −4, +4, +122] or [−4, −3, +3, +4]).

For example, each tone may be allocated to each of the nine 26-tone DRUs in order from the lowest available tone to the highest available tone. In this case, it is assumed that the existing guard tones and DC tones are maintained and each of two additional guard tones and DC tones or four additional null tones are considered.

A specific tone plan for nine 26-tone DRUs based on this method may be as follows.

26-tone DRU 1: Tone Index [−121:9:−13, 5:9:113]
26-tone DRU 2: Tone Index [−120:9:−12, 6:9:114]
26-tone DRU 3: Tone Index [−119:9:−11, 7:9:115]
26-tone DRU 4: Tone Index [−118:9:−10, 8:9:116]
26-tone DRU 5: Tone Index [−117:9:−9, 9:9:117]
26-tone DRU 6: Tone Index [−116:9:−8, 10:9:118]
26-tone DRU 7: Tone Index [−115:9:−7, 11:9:119]
26-tone DRU 8: Tone Index [−114:9:−6, 12:9:120]
26-tone DRU 9: Tone Index [−113:9:−5, 13:9:121]

This method may be efficient in smoothing gain, etc. in that it may obtain a relatively even tone plan. In addition, this method may be suitable for trade-off when considering interference from an adjacent channel, a DC offset, etc.

(Method 1-4)

A tone plan for a 26-tone DRU may be defined by assuming the same number of guard tones and DC tones at the same position as before and four additional guard tones or null tones (e.g., [−122, −121, +121, +122] or [−3, −2, +2, +3]).

For example, each tone may be allocated to each of the nine 26-tone DRUs in order from the lowest available tone to the highest available tone. In this case, it is assumed that the existing guard tones and DC tones are maintained and four additional guard tones or null tones are considered.

A specific tone plan for nine 26-tone DRUs based on this method may be as follows.

26-tone DRU 1: Tone Index [−120:9:−12, 4:9:112]
26-tone DRU 2: Tone Index [−119:9:−11, 5:9:113]
26-tone DRU 3: Tone Index [−118:9:−10, 6:9:114]
26-tone DRU 4: Tone Index [−117:9:−9, 7:9:115]
26-tone DRU 5: Tone Index [−116:9:−8, 8:9:116]
26-tone DRU 6: Tone Index [−115:9:−7, 9:9:117]
26-tone DRU 7: Tone Index [−114:9:−6, 10:9:118]
26-tone DRU 8: Tone Index [−113:9:−5, 11:9:119]
26-tone DRU 9: Tone Index [−112:9:−4, 12:9:120]

This method may be efficient in smoothing gain, etc. in that it may obtain a relatively even tone plan. In addition, this method may be efficient when considering interference from an adjacent channel, etc.

(Method 1-5)

A tone plan for a 26-tone DRU may be defined by assuming the same number of guard tones and DC tones at the same position as before and 8 additional guard tones or null tones (e.g., [−122, −121, −120, −119, +119, +120, +121, +122]). In this regard, for the same number of DC tones at the same position as before, DC of non-OFDMA may be considered.

For example, each tone may be allocated to each of the nine 26-tone DRUs in order from the lowest available tone to the highest available tone. In addition, it is assumed that the existing guard tones and DC tones (e.g., DC of non-OFDMA) are maintained and 8 additional guard tones or null tones are considered.

A specific tone plan for nine 26-tone DRUs based on this method may be as follows.

26-tone DRU 1: Tone Index [−118:9:−10, 2:9:110]
26-tone DRU 2: Tone Index [−117:9:−9, 3:9:111]
26-tone DRU 3: Tone Index [−116:9:−8, 4:9:112]
26-tone DRU 4: Tone Index [−115:9:−7, 5:9:113]
26-tone DRU 5: Tone Index [−114:9:−6, 6:9:114]
26-tone DRU 6: Tone Index [−113:9:−5, 7:9:115]
26-tone DRU 7: Tone Index [−112:9:−4, 8:9:116]
26-tone DRU 8: Tone Index [−111:9:−3, 9:9:117]
26-tone DRU 9: Tone Index [−110:9:−2, 10:9:118]

This method may be efficient in smoothing gain, etc. in that it may obtain a relatively even tone plan. In addition, this method may be efficient when considering interference from an adjacent channel, etc.

In addition, in terms of performance improvement, there is a technical effect of reducing the number of overlapping 26-tone DRUs and guard tones of a 40 MHz bandwidth/channel when a tone plan in this method is applied as it is in a specific 20 MHz channel within a bandwidth/a channel of 40 MHz or more.

(Method 1-6)

A tone plan for a 26-tone DRU may be defined by assuming the same number of guard tones and DC tones at the same position as before and 8 additional guard tones or null tones (e.g., [−122, −121, −120, −2, +2, +120, +121, +122]). In this regard, for the same number of DC tones at the same position as before, DC of non-OFDMA may be considered.

For example, each tone may be allocated to each of the nine 26-tone DRUs in order from the lowest available tone to the highest available tone. In addition, it is assumed that the existing guard tones and DC tones (e.g., DC of non-OFDMA) are maintained and 8 additional guard tones or null tones are considered.

A specific tone plan for nine 26-tone DRUs based on this method may be as follows.

26-tone DRU 1: Tone Index [−119:9:−11, 3:9:111]
26-tone DRU 2: Tone Index [−118:9:−10, 4:9:112]
26-tone DRU 3: Tone Index [−117:9:−9, 5:9:113]
26-tone DRU 4: Tone Index [−116:9:−8, 6:9:114]
26-tone DRU 5: Tone Index [−115:9:−7, 7:9:115]
26-tone DRU 6: Tone Index [−114:9:−6, 8:9:116]

26-tone DRU 7: Tone Index [−113:9:−5, 9:9:117]
26-tone DRU 8: Tone Index [−112:9:−4, 10:9:118]
26-tone DRU 9: Tone Index [−111:9:−3, 11:9:119]

This method may be efficient in smoothing gain, etc. in that it may obtain a relatively even tone plan. In addition, this method may be efficient when considering interference from an adjacent channel, etc.

In addition, in terms of performance improvement, there is a technical effect of reducing the number of overlapping 26-tone DRUs and guard tones of a 40 MHz bandwidth/channel and reducing a DC offset effect when a tone plan in this method is applied as it is in a specific 20 MHz channel within a bandwidth/a channel of 40 MHz or more.

Embodiment 1-2

This embodiment relates to a method for defining a tone plan for a 52-tone DRU for a 20 MHz bandwidth/channel.

A 52-tone DRU may be configured as a combination of two 26-tone DRUs (e.g., refer to Embodiment 1-1) and may be defined as follows to distribute a tone as much as possible.

52-tone DRU 1: A combination of 26-tone DRU 1 and 26-tone DRU 6
52-tone DRU 2: A combination of 26-tone DRU 2 and 26-tone DRU 7
52-tone DRU 3: A combination of 26-tone DRU 3 and 26-tone DRU 8
52-tone DRU 4: A combination of 26-tone DRU 4 and 26-tone DRU 9

Embodiment 1-3

This embodiment relates to a method for defining a tone plan for a 106-tone DRU for a 20 MHz bandwidth/channel. Regarding a DRU tone plan for a 20 MHz bandwidth/channel, at least one of the methods described below may be applied.

(Method 1-A)

A method for configuring a 106-tone DRU as a combination of two 52-tone DRUs and two of four null tones [−122, −69, +69, +122] may be considered. However, in this case, power boosting gain may not be maximized, and in particular, when allocating null tones of −69 and +69, power boosting gain may not be obtained.

Accordingly, in the present disclosure, a method for using a tone having an index of −3 or −2 instead of −69 as a null tone and using a tone having an index of +3 or +2 instead of +69 may be applied. These tones may correspond to tones used as a DC tone in an OFDMA tone plan or used as a data tone in a non-OFDMA tone plan.

Two 106-tone DRUs may be defined as follows to distribute a tone as much as possible.

106-tone DRU 1: A combination of 52-tone DRU 1, 52-tone DRU 3, null tone −3 or −2 and null tone +122
106-tone DRU 2: A combination of 52-tone DRU 2, 52-tone DRU 4, null tone −122 and null tone +3 or +2

In this regard, in terms of implementation, it may be efficient to allocate null tone +3 to 106-tone DRU 2 when null tone −3 is allocated to 106-tone DRU 1. Similarly, it may be efficient to allocate null tone +2 to 106-tone DRU 2 when null tone −2 is allocated to 106-tone DRU 1.

(Method 1-B)

A 106-tone DRU may be configured as a combination of two 52-tone DRUs and a DC tone or two of four null tones [−5, −4, +4, +5].

Two 106-tone DRUs may be defined as follows to distribute a tone as much as possible.

106-tone DRU 1: A combination of 52-tone DRU 1, 52-tone DRU 3 and null tone [−5, +4]
106-tone DRU 2: A combination of 52-tone DRU 2, 52-tone DRU 4 and null tone [−4, +5]

(Method 1-C)

A 106-tone DRU may be configured as a combination of two 52-tone DRUs and a guard tone/a DC tone or two of four null tones [−122, −4, +4, +122] or [−4, −3, +3, +4].

Two 106-tone DRUs may be defined as follows to distribute a tone as much as possible.

106-tone DRU 1: A combination of 52-tone DRU 1, 52-tone DRU 3, null tone [−4, +122] or [−4, +3]
106-tone DRU 2: A combination of 52-tone DRU 2, 52-tone DRU 4, null tone [−122, +4] or [−3, +4]

(Method 1-D)

A 106-tone DRU may be configured as a combination of two 52-tone DRUs and a guard tone or two of four null tones [−122, −121, +121, +122] or [−3, −2, +2, +3] or [−121, −3, +3, +121].

Two 106-tone DRUs may be defined as follows to distribute a tone as much as possible.

106-tone DRU 1: A combination of 52-tone DRU 1, 52-tone DRU 3, null tone [−122, +121] or [−3, +2] or [−3, +121]
106-tone DRU 2: A combination of 52-tone DRU 2, 52-tone DRU 4, null tone [−121, +122] or [−2, +3] or [−121, +3]

(Method 1-E)

A 106-tone DRU may be configured as a combination of two 52-tone DRUs and a guard tone or two of four null tones [−120, −119, +119, +120].

Two 106-tone DRUs may be defined as follows to distribute a tone as much as possible.

106-tone DRU 1: A combination of 52-tone DRU 1, 52-tone DRU 3 and null tone [−120, +119]
106-tone DRU 2: A combination of 52-tone DRU 2, 52-tone DRU 4 and null tone [−119, +120]

(Method 1-F)

A 106-tone DRU may be configured as a combination of two 52-tone DRUs and a guard tone or two of four null tones [−120, −2, +2, +120] or [−121, −120, +120, +121].

Two 106-tone DRUs may be defined as follows to distribute a tone as much as possible.

106-tone DRU 1: A combination of 52-tone DRU 1, 52-tone DRU 3, null tone [−2, +120] or [−121, +120]
106-tone DRU 2: A combination of 52-tone DRU 2, 52-tone DRU 4, null tone [−120, +2] or [−120, +121]

Embodiment 1-4

A method for generating various 52-tone DRUs by combining two random 26-ton DRUs instead of a fixed combination may be applied for a 52-tone DRU in Embodiment 1-2 described above. In addition, a method for generating various 106-tone DRUs by combining four random 26-tone DRUs instead of a fixed combination may be applied for a 106-tone DRU in Embodiment 1-3 described above. This method may be applied equally to the tone index of a 26-tone DRU defined in Embodiment 1-1 as well as the tone index of a 26-tone DRU formed in a different way. In addition, the additional tone combination of a 106-tone DRU may be configured in the same way as described in Embodiment 1-3.

A method for generating a DRU in this way may be usefully applied when a DRU shifted by symbol is applied to obtain diversity gain (e.g., when a tone index included in a specific DRU index in a first symbol is different from a tone index included in the same specific DRU index in a second symbol).

When a DRU index allocated to a STA is signaled/allocated by using the SIG field (e.g., a U-SIG and/or a UHR-SIG) of the existing RU allocation information (e.g., for a DL OFDMA PPDU), a predefined mapping rule between a 26-tone RRU index and a 26-tone DRU index may be applied. For example, a mapping rule may map DRU index-1 including the lowest tone on a frequency domain to RRU-1 including the lowest tone and then map a DRU including the next lowest tone in ascending order of RRU indexes. When a RRU-to-DRU mapping rule is defined, a 52-tone DRU or a 106-tone DRU may give an indication to a STA by allocating multiple 26-tone RRU indexes based on a corresponding mapping rule. Accordingly, a STA may determine whether a 52-tone DRU or a 106-tone DRU allocated to it includes tones included in which 26-tone DRUs.

For example, 2/4 26-tone RRU indexes corresponding to 2/4 26-tone DRUs corresponding to a 52-tone DRU/a 106-tone DRU may be indicated to one STA through RU allocation information, and STA ID values included in a user information (e.g., the user field of a U-SIG/UHR-SIG field of a DL OFDMA PPDU (e.g., a MU PPDU) or the UHR variant user information field of a trigger frame) corresponding to these 2/4 26-tone RRUs may be configured as the same value as the ID of a corresponding STA. In addition, information indicating that a DRU is allocated and/or information indicating whether it is the last of a plurality of 26-tone RRU indexes corresponding to a DRU allocated to a corresponding STA may be defined within user information (e.g., the user field of a U-SIG/UHR-SIG field of a DL OFDMA PPDU (e.g., a MU PPDU) or the UHR variant user information field of a trigger frame).

Embodiment 1-5

As in Embodiment 1-2 described above, it may be predefined that a 52-tone DRU includes tones of two 26-tone DRUs of a fixed combination and as in Embodiment 3 described above, it may be predefined that a 106-tone DRU includes tones of two 52-tone DRUs of a fixed combination (or four 26-tone DRUs of a fixed combination), but a DRU index may be generalized and mapped to each RRU index to flexibly configure a 26-tone DRU/a 52-tone DRU corresponding to a specific 52-tone DRU/a 106-tone DRU.

For example, 26-tone DRU-a/b/c/d/e/f/g/h/i may be defined as corresponding to 26-tone DRU-1/2/3/4/5/6/7/8/9 in an arbitrary manner (e.g., indexes a to i and indexes 1 to 9 correspond one-to-one, but a numeric index corresponding to each alphabetical index is determined in ascending order or in arbitrary order). Here, for the position of a tone included in a 26-tone DRU, examples in Embodiment 1-1 or another method may be applied. Based thereon, 52-tone DRU-a/b/c/d and 106-tone DRU-a/b may be defined as corresponding to a combination of lower-sized DRU indexes as in an example below.

52-tone DRU-a: 26-tone DRU-a, and 26-tone DRU-f
52-tone DRU-b: 26-tone DRU-b, and 26-tone DRU-g
52-tone DRU-c: 26-tone DRU-c, and 26-tone DRU-h
52-tone DRU-d=26-tone DRU-d, and 26-tone DRU-i
106-tone DRU-a: 52-tone DRU-a, 52-tone DRU-c, and 2 additional tones
106-tone DRU-b: 52-tone DRU-b, 52-tone DRU-d, and 2 additional tones Here, two additional tones for a 106-tone DRU may be defined based on a description in Embodiment 1-3.

Additionally or alternatively, a gap between a plurality of lower-sized DRU indexes corresponding to one upper sized-DRU index may be used. The value of this gap may be explicitly signaled to a STA or may be implicitly signaled based on another information (e.g., bandwidth information, BSS color information, etc.) without separate signaling. For example, a 52-tone DRU and a 106-tone DRU may include tones of a lower-sized DRU as follows.

52-tone DRU-a: 26-tone DRU-a, 26-tone DRU-(a+Gap)
52-tone DRU-b: 26-tone DRU-b, 26-tone DRU-(b+Gap)
52-tone DRU-c: 26-tone DRU-c, 26-tone DRU-(c+Gap)
52-tone DRU-d: 26-tone DRU-d, 26-tone DRU-(d+Gap)
106-tone DRU-a: 52-tone DRU-a, 52-tone DRU-(a+Gap), and 2 additional tones
106-tone DRU-b: 52-tone DRU-b, 52-tone DRU-(b+Gap), and 2 additional tones Here, two additional tones for a 106-tone DRU may be defined based on a description in Embodiment 3.

In examples described above, the order of alphabetical indexes of a DRU and the order of positions on a frequency domain may be unrelated. In addition, even when the alphabetical indexes of a DRU in a different size are the same, it does not mean that order within DRU indexes in the same size is the same.

In examples described above, the value of a gap may have the same/different value per DRU size. For example, the value of a gap may have an independent value or may have an associated value per DRU size.

Embodiment 1-6

This embodiment relates to a method for defining a pilot tone to be used in each DRU within the above-described 20 MHz bandwidth/channel.

In relation to the description of this embodiment, instead of a numeric index for each DRU index, an alphabetical index may be used/applied to consider a generalized combination.

First, a pilot tone for a 26-tone DRU may be defined as follows.

First, an extension method based on the position of a pilot tone in the existing RRU tone plan may be considered. For a pilot tone in the existing RRU tone plan, a tone at the [7th, 20th], [6th, 20th] or [7th, 21st] position within each RU was used as a pilot tone. Based on a corresponding position, a shift value may be applied to ensure that all pilot tones are evenly distributed not only in a bandwidth, but also in a large DRU. In other words, the shift value of p1, p2, p3, p4, p5, p6, p7, p8 and p9 may be applied to the pilot tone position of each 26-tone DRU. As an example, when tones at the 7th and 20th positions in a 26-tone DRU are considered as a pilot tone, the 7+p1-th and 20+p1-th tones may be used as a pilot tone when the shift value of p1 is applied.

In this regard, a shift value may not be applied to a 26-tone DRU that is not used to configure a 52-tone DRU (e.g., 26-tone DRU 5 or 26-tone DRU-c). For example, since a corresponding DRU does not configure a 52-tone DRU, it may be unrelated to the definition of a sufficiently distributed pilot tone in a large DRU. In addition, since a corresponding DRU is positioned in the middle position among all 26-tone DRUs based on the first tone which is the lowest tone of a 26-tone DRU in terms of a position on a frequency domain, it may be efficient not to apply a shift value when considering a pilot tone distributed in the entire bandwidth. In addition, when a tone at the [7th, 20th] position is considered as a pilot tone for a 26-tone DRU, a mirror symmetric pilot tone is formed based on DC within 26-tone DRU 5 (or 26-tone DRU-e), so it may be efficient in terms of implementation.

In addition, when a shift value is applied to each 26-tone DRU, applying a bilaterally symmetric shift value based on 26-tone DRU 5 (or 26-tone DRU-e) may be efficient in terms of implementation because it forms a mirror symmetric pilot tone in the entire bandwidth. For example, for 26-tone DRU 1 (or 26-tone DRU-a) to 26-tone DRU 9 (or 26-tone DRU-f), a mirror symmetric shift value such as −z, −y, −x, −w, 0, w, x, y, z may be applied.

Additionally or alternatively, it may be considered to apply a −x shift value to 26-tone DRU 1 (or 26-tone DRU-a) to 26-tone DRU 4 (or 26-tone DRU-d) in the same manner, avoid applying a shift to 26-tone DRU 5 (or 26-tone DRU-e) and apply a x shift value to 26-tone DRU 6 (or 26-tone DRU-f) to 26-tone DRU 9 (or 26-tone DRU-i) in the same manner. In this case, a mirror symmetric pilot tone may be configured and an evenly distributed pilot tone may be defined within all DRUs including a large DRU, but a pilot tone may not be evenly distributed in terms of the entire bandwidth. In other words, a pilot tone position may be similar between each DRU. In this case, performance such as CFO tracking, etc. may be degraded in all DRUs.

Accordingly, it may be efficient in terms of performance to design a pilot tone to be appropriately distributed between each DRU. To this end, a mirror symmetric shift value such as −z, −y, −x, −w, 0, w, x, y, z is applied to 26-tone DRU 1 (or 26-tone DRU-a) to 26-tone DRU 9 (or 26-tone DRU-f) and in this case, it may be efficient to set/define w, x, y and z as a different value.

In addition, a pilot tone for a 52-tone DRU may be configured with pilot tones of 26-tone DRUs configuring a corresponding 52-tone DRU.

In addition, a pilot tone for a 106-tone DRU may be configured with pilot tones of 52-tone DRUs configuring a corresponding 106-tone DRU. In this regard, it may be efficient in terms of implementation to make a selection to ensure that a pilot tone used within a 106-tone DRU is appropriately distributed and pilot tones used when considering all 106-tone DRUs become mirror symmetric.

Hereinafter, a pilot tone for each DRU in various DRU tone plan methods for a 20 MHz bandwidth/channel described above in the present disclosure is described through specific examples. In examples below, it is assumed that a tone at the [7th, 20th] position in each 26-tone DRU is used as a pilot tone.

Example 1. When the Same Shift is Applied to Some DURS

Based on a 26-tone DRU tone plan in the above-described Method 1-1, when a −3 shift value is applied to the pilot tone of 26-tone DRU 1 to 26-tone DRU 4, a shift is not applied to the pilot tone of 26-tone DRU 5 and a +3 shift value is applied to the pilot tone of 26-tone DRU 6 to 26-tone DRU 9, the tone index of a pilot tone for each 26-tone DRU may be as follows.

Pilot tone of 26-tone DRU 1: Tone index [−94, +31]
Pilot tone of 26-tone DRU 2: Tone index [−93, +32]
Pilot tone of 26-tone DRU 3: Tone index [−92, +33]
Pilot tone of 26-tone DRU 4: Tone index [−91, +34]
Pilot tone of 26-tone DRU 5: Tone index [−62, +62]
Pilot tone of 26-tone DRU 6: Tone index [−34, +91]
Pilot tone of 26-tone DRU 7: Tone index [−33, +92]
Pilot tone of 26-tone DRU 8: Tone index [−32, +93]
Pilot tone of 26-tone DRU 9: Tone index [−31, +94]

In other words, for a corresponding 20 MHz DRU tone plan, all DRUs may be based on pilot tone +−[31, 32, 33, 34, 62, 91, 92, 93, 94].

In addition, the tone index of a pilot tone for each 52-tone DRU may be as follows.

Pilot tone of 52-tone DRU 1: Tone index [−94, −34, +31, +91]
Pilot tone of 52-tone DRU 2: Tone index [−93, −33, +32, +92]
Pilot tone of 52-tone DRU 3: Tone index [−92, −32, +33, +93]
Pilot tone of 52-tone DRU 4: Tone index [−91, −31, +34, +94]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be a null tone or a DC tone in a 26-tone DRU/a 52-tone DRU. Here, two additional tones may be two of null tone +−[69, 122] or two of DC tone +−[2, 3].

Pilot tone of 106-tone DRU 1: Tone index [−94 or −92, −34 or −32, +31 or +33, +91 or +93]
Pilot tone of 106-tone DRU 2: Tone index [−93 or −91, −33 or −31, +32 or +34, +92 or +94]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −3 (or −2) and +122, and two additional tones for 106-tone DRU 2 may be −122 and +3 (or +2).

As an example, the pilot tone of 106-tone DRU 1 may be [−94, −34, +33, +93] and the pilot tone of 106-tone DRU 2 may be [−93, −33, +34, +94]. As another example, in terms of further distributing a pilot tone between DRUs, the pilot tone of 106-tone DRU 1 may be [−94, −34, +31, +91] and the pilot tone of 106-tone DRU 2 may be [−91, −31, +34, +94]. An evenly distributed pilot tone may be formed within a DRU, but a similar pilot tone may be configured between DRUs.

Through this, a 106-tone DRU may be configured with evenly distributed tones and sufficiently distributed tones.

Example 2. When a Different Shift Value is Applied to all DRUs

Based on a 26-tone DRU tone plan in the above-described Method 1-1, when the shift value of −4, −3, −2, −1, 0, +1, +2, +3, +4 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−103, +22]
Pilot tone of 26-tone DRU 2: Tone index [−93, +32]
Pilot tone of 26-tone DRU 3: Tone index [−83, +42]
Pilot tone of 26-tone DRU 4: Tone index [−73, +52]
Pilot tone of 26-tone DRU 5: Tone index [−62, +62]
Pilot tone of 26-tone DRU 6: Tone index [−52, +73]
Pilot tone of 26-tone DRU 7: Tone index [−42, +83]
Pilot tone of 26-tone DRU 8: Tone index [−32, +93]
Pilot tone of 26-tone DRU 9: Tone index [−22, +103]

In other words, for a corresponding 20 MHz DRU tone plan, all DRUs may be based on pilot tone +−[22, 32, 43, 52, 62, 73, 83, 93, 103].

In addition, the tone index of a pilot tone for each 52-tone DRU may be as follows.

Pilot tone of 52-tone DRU 1: Tone index [−103, −52, +22, +73]

Pilot tone of 52-tone DRU 2: Tone index [−93, −42, +32, +83]

Pilot tone of 52-tone DRU 3: Tone index [−83, −32, +42, +93]

Pilot tone of 52-tone DRU 4: Tone index [−73, −22, +52, +103]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be a null tone or a DC tone in a 26-tone DRU/a 52-tone DRU. Here, two additional tones may be two of null tone +−[69, 122] or two of DC tone +−[2, 3].

Pilot tone of 106-tone DRU 1: Tone index [−103 or −83, −52 or −32, +22 or +42, +73 or +93]

Pilot tone of 106-tone DRU 2: Tone index [−93 or −73, −42 or −22, +32 or +52, +83 or +103]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −3 (or −2) and +122, and two additional tones for 106-tone DRU 2 may be −122 and +3 (or +2).

As an example, the pilot tone of 106-tone DRU 1 may be [−103, −32, +22, +93] and the pilot tone of 106-tone DRU 2 may be [−93, −22, +32, +103]. As another example, in terms of further distributing a pilot tone between DRUs, the pilot tone of 106-tone DRU 1 may be [−103, −52, +22, +73] and the pilot tone of 106-tone DRU 2 may be [−73, −22, +52, +103].

Through this, a 106-tone DRU may be configured with evenly distributed tones and sufficiently distributed tones.

Example 3. When a Different Shift Value is Applied to all DRUs

Based on a 26-tone DRU tone plan in the above-described Method 1-1, when the shift value of −5, −4, −3, −2, 0, +2, +3, +4, +5 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−112, +13]

Pilot tone of 26-tone DRU 2: Tone index [−102, +23]

Pilot tone of 26-tone DRU 3: Tone index [−92, +33]

Pilot tone of 26-tone DRU 4: Tone index [−82, +43]

Pilot tone of 26-tone DRU 5: Tone index [−62, +62]

Pilot tone of 26-tone DRU 6: Tone index [−43, +82]

Pilot tone of 26-tone DRU 7: Tone index [−33, +92]

Pilot tone of 26-tone DRU 8: Tone index [−23, +102]

Pilot tone of 26-tone DRU 9: Tone index [−13, +112]

In other words, for a corresponding 20 MHz DRU tone plan, all DRUs may be based on pilot tone +−[13, 23, 33, 43, 62, 82, 92, 102, 112].

In addition, the tone index of a pilot tone for each 52-tone DRU may be as follows.

Pilot tone of 52-tone DRU 1: Tone index [−112, −43, +13, +82]

Pilot tone of 52-tone DRU 2: Tone index [−102, −33, +23, +92]

Pilot tone of 52-tone DRU 3: Tone index [−92, −23, +33, +102]

Pilot tone of 52-tone DRU 4: Tone index [−82, −13, +43, +112]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be a null tone or a DC tone in a 26-tone DRU/a 52-tone DRU. Here, two additional tones may be two of null tone +−[69, 122] or two of DC tone +−[2, 3].

Pilot tone of 106-tone DRU 1: Tone index [−112 or −92, −43 or −23, +13 or +33, +82 or +102]

Pilot tone of 106-tone DRU 2: Tone index [−102 or −82, −33 or −13, +23 or +43, +92 or +112]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −3 (or −2) and +122, and two additional tones for 106-tone DRU 2 may be −122 and +3 (or +2).

As an example, the pilot tone of 106-tone DRU 1 may be [−112, −43, +33, +102] and the pilot tone of 106-tone DRU 2 may be [−102, −33, +43, +112]. As another example, in terms of further distributing a pilot tone between DRUs, the pilot tone of 106-tone DRU 1 may be [−112, −43, +13, +82] and the pilot tone of 106-tone DRU 2 may be [−82, −13, +43, +112].

Through this, a 106-tone DRU may be configured with evenly distributed tones and sufficiently distributed tones.

Example 3-1. When a Different Shift Value is Applied to all DRUs

Based on a 26-tone DRU tone plan in the above-described Method 1-1, when the shift value of −5, −4, −2, −1, 0, +1, +2, +4, +5 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−112, +13]

Pilot tone of 26-tone DRU 2: Tone index [−102, +23]

Pilot tone of 26-tone DRU 3: Tone index [−83, +42]

Pilot tone of 26-tone DRU 4: Tone index [−73, +52]

Pilot tone of 26-tone DRU 5: Tone index [−62, +62]

Pilot tone of 26-tone DRU 6: Tone index [−52, +73]

Pilot tone of 26-tone DRU 7: Tone index [−42, +83]

Pilot tone of 26-tone DRU 8: Tone index [−23, +102]

Pilot tone of 26-tone DRU 9: Tone index [−13, +112]

In other words, for a corresponding 20 MHz DRU tone plan, all DRUs may be based on pilot tone +−[13, 23, 42, 52, 62, 73, 83, 102, 112].

In addition, the tone index of a pilot tone for each 52-tone DRU may be as follows.

Pilot tone of 52-tone DRU 1: Tone index [−112, −52, +13, +73]

Pilot tone of 52-tone DRU 2: Tone index [−102, −42, +23, +83]

Pilot tone of 52-tone DRU 3: Tone index [−83, −23, +42, +102]

Pilot tone of 52-tone DRU 4: Tone index [−73, −13, +52, +112]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be a null tone or a DC tone in a 26-tone DRU/a 52-tone DRU. Here, two additional tones may be two of null tone +−[69, 122] or two of DC tone +−[2, 3].

Pilot tone of 106-tone DRU 1: Tone index [−112 or −83, −52 or −23, +13 or +42, +73 or +102]

Pilot tone of 106-tone DRU 2: Tone index [−102 or −73, −42 or −13, +23 or +52, +83 or +112]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −3 (or −2) and +122, and two additional tones for 106-tone DRU 2 may be −122 and +3 (or +2).

As an example, the pilot tone of 106-tone DRU 1 may be [−112, −52, +13, +73] and the pilot tone of 106-tone DRU 2 may be [−73, −13, +52, +112].

Through this, a 106-tone DRU may be configured with evenly distributed tones and sufficiently distributed tones.

Example 3-2. When a Different Shift Value is Applied to all DRUs

Based on a 26-tone DRU tone plan in the above-described Method 1-1, when the shift value of −6, −5, −2, −1, 0, +1, +2, +5, +6 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−121, +4]
Pilot tone of 26-tone DRU 2: Tone index [−111, +14]
Pilot tone of 26-tone DRU 3: Tone index [−83, +42]
Pilot tone of 26-tone DRU 4: Tone index [−73, +52]
Pilot tone of 26-tone DRU 5: Tone index [−62, +62]
Pilot tone of 26-tone DRU 6: Tone index [−52, +73]
Pilot tone of 26-tone DRU 7: Tone index [−42, +83]
Pilot tone of 26-tone DRU 8: Tone index [−14, +111]
Pilot tone of 26-tone DRU 9: Tone index [−4, +121]

In other words, for a corresponding 20 MHz DRU tone plan, all DRUs may be based on pilot tone +−[4, 14, 42, 52, 62, 73, 83, 111, 121].

In addition, the tone index of a pilot tone for each 52-tone DRU may be as follows.

Pilot tone of 52-tone DRU 1: Tone index [−121, −52, +4, +73]

Pilot tone of 52-tone DRU 2: Tone index [−111, −42, +14, +83]

Pilot tone of 52-tone DRU 3: Tone index [−83, −14, +42, +111]

Pilot tone of 52-tone DRU 4: Tone index [−73, −4, +52, +121]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be a null tone or a DC tone in a 26-tone DRU/a 52-tone DRU. Here, two additional tones may be two of null tone +−[69, 122] or two of DC tone +−[2, 3].

Pilot tone of 106-tone DRU 1: Tone index [−121 or −83, −52 or −14, +4 or +42, +73 or +111]

Pilot tone of 106-tone DRU 2: Tone index [−111 or −73, −42 or −4, +14 or +52, +83 or +121]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −3 (or −2) and +122, and two additional tones for 106-tone DRU 2 may be −122 and +3 (or +2).

As an example, the pilot tone of 106-tone DRU 1 may be [−121, −52, +4, +73] and the pilot tone of 106-tone DRU 2 may be [−73, −4, +52, +121].

Through this, a 106-tone DRU may be configured with evenly distributed tones and sufficiently distributed tones.

Example 3-3. When a Different Shift Value is Applied to all DRUs

Based on a 26-tone DRU tone plan in the above-described Method 1-1, when the shift value of −6, −4, −3, −1, 0, +1, +3, +4, +6 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−121, +4]
Pilot tone of 26-tone DRU 2: Tone index [−102, +23]
Pilot tone of 26-tone DRU 3: Tone index [−92, +33]
Pilot tone of 26-tone DRU 4: Tone index [−73, +52]
Pilot tone of 26-tone DRU 5: Tone index [−62, +62]
Pilot tone of 26-tone DRU 6: Tone index [−52, +73]
Pilot tone of 26-tone DRU 7: Tone index [−33, +92]
Pilot tone of 26-tone DRU 8: Tone index [−23, +102]
Pilot tone of 26-tone DRU 9: Tone index [−4, +121]

In other words, for a corresponding 20 MHz DRU tone plan, all DRUs may be based on pilot tone +−[4, 23, 33, 52, 62, 73, 92, 102, 121].

In addition, the tone index of a pilot tone for each 52-tone DRU may be as follows.

Pilot tone of 52-tone DRU 1: Tone index [−121, −52, +4, +73]

Pilot tone of 52-tone DRU 2: Tone index [−102, −33, +23, +92]

Pilot tone of 52-tone DRU 3: Tone index [−92, −23, +33, +102]

Pilot tone of 52-tone DRU 4: Tone index [−73, −4, +52, +121]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be a null tone or a DC tone in a 26-tone DRU/a 52-tone DRU. Here, two additional tones may be two of null tone +−[69, 122] or two of DC tone +−[2, 3].

Pilot tone of 106-tone DRU 1: Tone index [−121 or −92, −52 or −23, +4 or +33, +73 or +102]

Pilot tone of 106-tone DRU 2: Tone index [−102 or −73, −33 or −4, +23 or +52, +92 or +121]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −3 (or −2) and +122, and two additional tones for 106-tone DRU 2 may be −122 and +3 (or +2).

As an example, the pilot tone of 106-tone DRU 1 may be [−121, −52, +4, +73] and the pilot tone of 106-tone DRU 2 may be [−73, −4, +52, +121].

Through this, a 106-tone DRU may be configured with evenly distributed tones and sufficiently distributed tones.

Example 4. When a Different Shift Value is Applied to all DRUs

Based on a 26-tone DRU tone plan in the above-described Method 1-1, when the shift value of −6, −5, −3, −2, 0, +2, +3, +5, +6 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−121, +4]

Pilot tone of 26-tone DRU 2: Tone index [−111, +14]

Pilot tone of 26-tone DRU 3: Tone index [−92, +33]

Pilot tone of 26-tone DRU 4: Tone index [−82, +43]

Pilot tone of 26-tone DRU 5: Tone index [−62, +62]

Pilot tone of 26-tone DRU 6: Tone index [−43, +82]

Pilot tone of 26-tone DRU 7: Tone index [−33, +92]

Pilot tone of 26-tone DRU 8: Tone index [−14, +111]

Pilot tone of 26-tone DRU 9: Tone index [−4, +121]

In other words, for a corresponding 20 MHz DRU tone plan, all DRUs may be based on pilot tone +−[4, 14, 33, 43, 62, 82, 92, 111, 121].

In addition, the tone index of a pilot tone for each 52-tone DRU may be as follows.

Pilot tone of 52-tone DRU 1: Tone index [−121, −43, +4, +82]

Pilot tone of 52-tone DRU 2: Tone index [−111, −33, +14, +92]

Pilot tone of 52-tone DRU 3: Tone index [−92, −14, +33, +111]

Pilot tone of 52-tone DRU 4: Tone index [−82, −4, +43, +121]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be a null tone or a DC tone in a 26-tone DRU/a 52-tone DRU. Here, two additional tones may be two of null tone +−[69, 122] or two of DC tone +−[2, 3].

Pilot tone of 106-tone DRU 1: Tone index [−121 or −92, −43 or −14, +4 or +33, +82 or +111]

Pilot tone of 106-tone DRU 2: Tone index [−111 or −82, −33 or −4, +14 or +43, +92 or +121]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −3 (or −2) and +122, and two additional tones for 106-tone DRU 2 may be −122 and +3 (or +2).

As an example, the pilot tone of 106-tone DRU 1 may be [−121, −43, +33, +111] and the pilot tone of 106-tone DRU 2 may be [−111, −33, +43, +121]. As another example, in terms of further distributing a pilot tone between DRUs, the pilot tone of 106-tone DRU 1 may be [−121, −43, +4, +82] and the pilot tone of 106-tone DRU 2 may be [−82, −4, +43, +121].

Through this, a 106-tone DRU may be configured with evenly distributed tones and sufficiently distributed tones.

Example 5. When a Different Shift Value is Applied to all DRUs

Based on a 26-tone DRU tone plan in the above-described Method 1-1, when the shift value of −6, −5, −4, −3, 0, +3, +4, +5, +6 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−121, +4]

Pilot tone of 26-tone DRU 2: Tone index [−111, +14]

Pilot tone of 26-tone DRU 3: Tone index [−101, +24]

Pilot tone of 26-tone DRU 4: Tone index [−91, +34]

Pilot tone of 26-tone DRU 5: Tone index [−62, +62]

Pilot tone of 26-tone DRU 6: Tone index [−34, +91]

Pilot tone of 26-tone DRU 7: Tone index [−24, +101]

Pilot tone of 26-tone DRU 8: Tone index [−14, +111]

Pilot tone of 26-tone DRU 9: Tone index [−4, +121]

In other words, for a corresponding 20 MHz DRU tone plan, all DRUs may be based on pilot tone +−[4, 14, 24, 34, 62, 91, 101, 111, 121].

In addition, the tone index of a pilot tone for each 52-tone DRU may be as follows.

Pilot tone of 52-tone DRU 1: Tone index [−121, −34, +4, +91]

Pilot tone of 52-tone DRU 2: Tone index [−111, −24, +14, +101]

Pilot tone of 52-tone DRU 3: Tone index [−101, −14, +24, +111]

Pilot tone of 52-tone DRU 4: Tone index [−91, −4, +34, +121]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be a null tone or a DC tone in a 26-tone DRU/a 52-tone DRU. Here, two additional tones may be two of null tone +−[69, 122] or two of DC tone +−[2, 3].

Pilot tone of 106-tone DRU 1: Tone index [−121 or −101, −34 or −14, +4 or +24, +91 or +111]

Pilot tone of 106-tone DRU 2: Tone index [−111 or −91, −24 or −4, +14 or +34, +101 or +121]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −3 (or −2) and +122, and two additional tones for 106-tone DRU 2 may be −122 and +3 (or +2).

As an example, the pilot tone of 106-tone DRU 1 may be [−101, −34, +24, +91] and the pilot tone of 106-tone DRU 2 may be [−91, −24, +34, +101]. As another example, in terms of further distributing a pilot tone between DRUs, the pilot tone of 106-tone DRU 1 may be [−121, −34, +4, +91] and the pilot tone of 106-tone DRU 2 may be [−91, −4, +34, +121].

Through this, a 106-tone DRU may be configured with evenly distributed tones and sufficiently distributed tones.

In addition, in a corresponding example, the additional tone of 106-tone DRU 1 may be [−69, +122] and the additional tone of 106-tone DRU 2 may be [−122, +69]. Alternatively, the additional tone of 106-tone DRU 1 may be [−122, +69] and the additional tone of 106-tone DRU 2 may be [−69, +122].

Example 6. When the Same Shift is Applied to Some DURS

Based on a 26-tone DRU tone plan in the above-described Method 1-2, when a −3 shift value is applied to the pilot tone of 26-tone DRU 1 to 26-tone DRU 4, a shift is not applied to the pilot tone of 26-tone DRU 5 and a +3 shift value is applied to the pilot tone of 26-tone DRU 6 to 26-tone DRU 9, the tone index of a pilot tone for each 26-tone DRU may be as follows.

Pilot tone of 26-tone DRU 1: Tone index [−95, +33]

Pilot tone of 26-tone DRU 2: Tone index [−94, +34]

Pilot tone of 26-tone DRU 3: Tone index [−93, +35]

Pilot tone of 26-tone DRU 4: Tone index [−92, +36]

Pilot tone of 26-tone DRU 5: Tone index [−64, +64]

Pilot tone of 26-tone DRU 6: Tone index [−36, +92]

Pilot tone of 26-tone DRU 7: Tone index [−35, +93]

Pilot tone of 26-tone DRU 8: Tone index [−34, +94]

Pilot tone of 26-tone DRU 9: Tone index [−33, +95]

In other words, for a corresponding 20 MHz DRU tone plan, all DRUs may be based on pilot tone +−[33, 34, 35, 36, 64, 92, 93, 94, 95].

In addition, the tone index of a pilot tone for each 52-tone DRU may be as follows.

Pilot tone of 52-tone DRU 1: Tone index [−95, −36, +33, +92]

Pilot tone of 52-tone DRU 2: Tone index [−94, −35, +34, +93]

Pilot tone of 52-tone DRU 3: Tone index [−93, −34, +35, +94]

Pilot tone of 52-tone DRU 4: Tone index [−92, −33, +36, +95]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be a DC tone in a 26-tone DRU/a 52-tone DRU. Here, two additional tones may be two of DC tone +−[4, 5].

Pilot tone of 106-tone DRU 1: Tone index [−95 or −93, −36 or −34, +33 or +35, +92 or +94]

Pilot tone of 106-tone DRU 2: Tone index [−94 or −92, −35 or −33, +34 or +36, +93 or +95]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −5 and +4 and two additional tones for 106-tone DRU 2 may be −4 and +5.

As an example, the pilot tone of 106-tone DRU 1 may be [−95, −36, +35, +94] and the pilot tone of 106-tone DRU 2 may be [−94, −35, +36, +95]. As another example, in terms of further distributing a pilot tone between DRUs, the pilot tone of 106-tone DRU 1 may be [−95, −36, +33, +92] and the pilot tone of 106-tone DRU 2 may be [−92, −33, +36, +95]. An evenly distributed pilot tone may be formed within a DRU, but a similar pilot tone may be configured between DRUs.

Through this, a 106-tone DRU may be configured with evenly distributed tones and sufficiently distributed tones.

Example 7. When a Different Shift Value is Applied to all DRUs

Based on a 26-tone DRU tone plan in the above-described Method 1-2, when the shift value of −4, −3, −2, −1, 0, +1, +2, +3, +4 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−104, +24]

Pilot tone of 26-tone DRU 2: Tone index [−94, +34]

Pilot tone of 26-tone DRU 3: Tone index [−84, +44]

Pilot tone of 26-tone DRU 4: Tone index [−74, +54]

Pilot tone of 26-tone DRU 5: Tone index [−64, +64]

Pilot tone of 26-tone DRU 6: Tone index [−54, +74]

Pilot tone of 26-tone DRU 7: Tone index [−44, +84]

Pilot tone of 26-tone DRU 8: Tone index [−34, +94]

Pilot tone of 26-tone DRU 9: Tone index [−24, +104]

In other words, for a corresponding 20 MHz DRU tone plan, all DRUs may be based on pilot tone +−[24, 34, 44, 54, 64, 74, 84, 94, 104].

In addition, the tone index of a pilot tone for each 52-tone DRU may be as follows.

Pilot tone of 52-tone DRU 1: Tone index [−104, −54, +24, +74]

Pilot tone of 52-tone DRU 2: Tone index [−94, −44, +34, +84]

Pilot tone of 52-tone DRU 3: Tone index [−84, −34, +44, +94]

Pilot tone of 52-tone DRU 4: Tone index [−74, −24, +54, +104]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be a null tone or a DC tone in a 26-tone DRU/a 52-tone DRU. Here, two additional tones may be two of DC tone +−[4, 5].

Pilot tone of 106-tone DRU 1: Tone index [−104 or −84, −54 or −34, +24 or +44, +74 or +94]

Pilot tone of 106-tone DRU 2: Tone index [−94 or −74, −44 or −24, +34 or +54, +84 or +104]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −5 and +4 and two additional tones for 106-tone DRU 2 may be −4 and +5.

As an example, the pilot tone of 106-tone DRU 1 may be [−104, −34, +24, +94] and the pilot tone of 106-tone DRU 2 may be [−94, −24, +34, +104]. As another example, in terms of further distributing a pilot tone between DRUs, the pilot tone of 106-tone DRU 1 may be [−104, −54, +24, +74] and the pilot tone of 106-tone DRU 2 may be [−74, −24, +54, +104].

Through this, a 106-tone DRU may be configured with evenly distributed tones and sufficiently distributed tones.

Example 8. When a Different Shift Value is Applied to all DRUs

Based on a 26-tone DRU tone plan in the above-described Method 1-2, when the shift value of −5, −4, −3, −2, 0, +2, +3, +4, +5 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−113, +15]

Pilot tone of 26-tone DRU 2: Tone index [−103, +23]

Pilot tone of 26-tone DRU 3: Tone index [−93, +33]

Pilot tone of 26-tone DRU 4: Tone index [−83, +45]

Pilot tone of 26-tone DRU 5: Tone index [−64, +64]

Pilot tone of 26-tone DRU 6: Tone index [−45, +83]

Pilot tone of 26-tone DRU 7: Tone index [−35, +93]

Pilot tone of 26-tone DRU 8: Tone index [−25, +103]

Pilot tone of 26-tone DRU 9: Tone index [−15, +113]

In other words, for a corresponding 20 MHz DRU tone plan, all DRUs may be based on pilot tone +−[15, 25, 35, 45, 64, 83, 93, 103, 113].

In addition, the tone index of a pilot tone for each 52-tone DRU may be as follows.

Pilot tone of 52-tone DRU 1: Tone index [−113, −45, +15, +83]

Pilot tone of 52-tone DRU 2: Tone index [−103, −35, +25, +93]

Pilot tone of 52-tone DRU 3: Tone index [−93, −25, +35, +103]

Pilot tone of 52-tone DRU 4: Tone index [−83, −15, +45, +113]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be a null tone or a DC tone in a 26-tone DRU/a 52-tone DRU. Here, two additional tones may be two of DC tone +−[4, 5].

Pilot tone of 106-tone DRU 1: Tone index [−113 or −93, −45 or −25, +15 or +35, +83 or +103]

Pilot tone of 106-tone DRU 2: Tone index [−103 or −83, −35 or −15, +25 or +45, +93 or +113]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −5 and +4 and two additional tones for 106-tone DRU 2 may be −4 and +5.

As an example, the pilot tone of 106-tone DRU 1 may be [−113, −45, +35, +103] and the pilot tone of 106-tone DRU 2 may be [−103, −35, +45, +113]. As another example, in terms of further distributing a pilot tone between DRUs, the pilot tone of 106-tone DRU 1 may be [−113, −45, +15, +83] and the pilot tone of 106-tone DRU 2 may be [−83, −15, +45, +113].

Through this, a 106-tone DRU may be configured with evenly distributed tones and sufficiently distributed tones.

Example 8-1. When a Different Shift Value is Applied to all DRUs

Based on a 26-tone DRU tone plan in the above-described Method 1-2, when the shift value of −5, −4, −2, −1, 0, +1, +2, +4, +5 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−113, +15]
Pilot tone of 26-tone DRU 2: Tone index [−103, +25]
Pilot tone of 26-tone DRU 3: Tone index [−84, +44]
Pilot tone of 26-tone DRU 4: Tone index [−74, +54]
Pilot tone of 26-tone DRU 5: Tone index [−64, +64]
Pilot tone of 26-tone DRU 6: Tone index [−54, +74]
Pilot tone of 26-tone DRU 7: Tone index [−44, +84]
Pilot tone of 26-tone DRU 8: Tone index [−25, +103]
Pilot tone of 26-tone DRU 9: Tone index [−15, +113]

In other words, for a corresponding 20 MHz DRU tone plan, all DRUs may be based on pilot tone +−[15, 25, 44, 54, 64, 74, 84, 103, 113].

In addition, the tone index of a pilot tone for each 52-tone DRU may be as follows.

Pilot tone of 52-tone DRU 1: Tone index [−113, −54, +15, +74]

Pilot tone of 52-tone DRU 2: Tone index [−103, −44, +25, +84]

Pilot tone of 52-tone DRU 3: Tone index [−84, −25, +44, +103]

Pilot tone of 52-tone DRU 4: Tone index [−74, −15, +54, +113]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be a null tone or a DC tone in a 26-tone DRU/a 52-tone DRU. Here, two additional tones may be two of DC tone +−[4, 5].

Pilot tone of 106-tone DRU 1: Tone index [−113 or −84, −54 or −25, +15 or +44, +74 or +103]

Pilot tone of 106-tone DRU 2: Tone index [−103 or −74, −44 or −15, +25 or +54, +84 or +113]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −5 and +4 and two additional tones for 106-tone DRU 2 may be −4 and +5.

As an example, the pilot tone of 106-tone DRU 1 may be [−113, −54, +15, +74] and the pilot tone of 106-tone DRU 2 may be [−74, −15, +54, +113].

Through this, a 106-tone DRU may be configured with evenly distributed tones and sufficiently distributed tones.

Example 8-2. When a Different Shift Value is Applied to all DRUs

Based on a 26-tone DRU tone plan in the above-described Method 1-2, when the shift value of −6, −5, −2, −1, 0, +1, +2, +5, +6 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−122, +6]
Pilot tone of 26-tone DRU 2: Tone index [−112, +16]
Pilot tone of 26-tone DRU 3: Tone index [−84, +44]
Pilot tone of 26-tone DRU 4: Tone index [−74, +54]
Pilot tone of 26-tone DRU 5: Tone index [−64, +64]
Pilot tone of 26-tone DRU 6: Tone index [−54, +74]
Pilot tone of 26-tone DRU 7: Tone index [−44, +84]
Pilot tone of 26-tone DRU 8: Tone index [−16, +112]
Pilot tone of 26-tone DRU 9: Tone index [−6, +122]

In other words, for a corresponding 20 MHz DRU tone plan, all DRUs may be based on pilot tone +−[6, 16, 44, 54, 64, 74, 84, 112, 122].

In addition, the tone index of a pilot tone for each 52-tone DRU may be as follows.

Pilot tone of 52-tone DRU 1: Tone index [−122, −54, +6, +74]

Pilot tone of 52-tone DRU 2: Tone index [−112, −44, +16, +84]

Pilot tone of 52-tone DRU 3: Tone index [−84, −16, +44, +112]

Pilot tone of 52-tone DRU 4: Tone index [−74, −6, +54, +122]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be a null tone or a DC tone in a 26-tone DRU/a 52-tone DRU. Here, two additional tones may be two of DC tone +−[4, 5].

Pilot tone of 106-tone DRU 1: Tone index [−122 or −84, −54 or −16, +6 or +44, +74 or +112]

Pilot tone of 106-tone DRU 2: Tone index [−112 or −74, −44 or −6, +16 or +54, +84 or +122]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −5 and +4 and two additional tones for 106-tone DRU 2 may be −4 and +5.

As an example, the pilot tone of 106-tone DRU 1 may be [−122, −54, +6, +74] and the pilot tone of 106-tone DRU 2 may be [−74, −6, +54, +122].

Through this, a 106-tone DRU may be configured with evenly distributed tones and sufficiently distributed tones.

Example 8-3. When a Different Shift Value is Applied to all DRUs

Based on a 26-tone DRU tone plan in the above-described Method 1-2, when the shift value of −6, −4, −3, −1, 0, +1, +3, +4, +6 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−122, +6]

Pilot tone of 26-tone DRU 2: Tone index [−103, +25]

Pilot tone of 26-tone DRU 3: Tone index [−93, +35]

Pilot tone of 26-tone DRU 4: Tone index [−74, +54]

Pilot tone of 26-tone DRU 5: Tone index [−64, +64]

Pilot tone of 26-tone DRU 6: Tone index [−54, +74]

Pilot tone of 26-tone DRU 7: Tone index [−35, +93]

Pilot tone of 26-tone DRU 8: Tone index [−25, +103]

Pilot tone of 26-tone DRU 9: Tone index [−6, +122]

In other words, for a corresponding 20 MHz DRU tone plan, all DRUs may be based on pilot tone +−[6, 25, 35, 54, 64, 74, 93, 103, 122].

In addition, the tone index of a pilot tone for each 52-tone DRU may be as follows.

Pilot tone of 52-tone DRU 1: Tone index [−122, −54, +6, +74]

Pilot tone of 52-tone DRU 2: Tone index [−103, −35, +25, +93]

Pilot tone of 52-tone DRU 3: Tone index [−93, −25, +35, +103]

Pilot tone of 52-tone DRU 4: Tone index [−74, −6, +54, +122]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be a null tone or a DC tone in a 26-tone DRU/a 52-tone DRU. Here, two additional tones may be two of DC tone +−[4, 5].

Pilot tone of 106-tone DRU 1: Tone index [−122 or −93, −54 or −25, +6 or +35, +74 or +103]

Pilot tone of 106-tone DRU 2: Tone index [−103 or −74, −35 or −6, +25 or +54, +93 or +122]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −5 and +4 and two additional tones for 106-tone DRU 2 may be −4 and +5.

As an example, the pilot tone of 106-tone DRU 1 may be [−122, −54, +6, +74] and the pilot tone of 106-tone DRU 2 may be [−74, −6, +54, +122].

Through this, a 106-tone DRU may be configured with evenly distributed tones and sufficiently distributed tones.

Example 9. When a Different Shift Value is Applied to all DRUs

Based on a 26-tone DRU tone plan in the above-described Method 1-2, when the shift value of −6, −5, −3, −2, 0, +2, +3, +5, +6 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−122, +6]

Pilot tone of 26-tone DRU 2: Tone index [−112, +16]

Pilot tone of 26-tone DRU 3: Tone index [−93, +35]

Pilot tone of 26-tone DRU 4: Tone index [−83, +45]

Pilot tone of 26-tone DRU 5: Tone index [−64, +64]

Pilot tone of 26-tone DRU 6: Tone index [−45, +83]

Pilot tone of 26-tone DRU 7: Tone index [−35, +93]

Pilot tone of 26-tone DRU 8: Tone index [−16, +112]

Pilot tone of 26-tone DRU 9: Tone index [−6, +122]

In other words, for a corresponding 20 MHz DRU tone plan, all DRUs may be based on pilot tone +−[6, 16, 35, 45, 64, 83, 93, 112, 122].

In addition, the tone index of a pilot tone for each 52-tone DRU may be as follows.

Pilot tone of 52-tone DRU 1: Tone index [−122, −45, +6, +83]

Pilot tone of 52-tone DRU 2: Tone index [−112, −35, +16, +93]

Pilot tone of 52-tone DRU 3: Tone index [−93, −16, +35, +112]

Pilot tone of 52-tone DRU 4: Tone index [−83, −6, +45, +122]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be a null tone or a DC tone in a 26-tone DRU/a 52-tone DRU. Here, two additional tones may be two of DC tone +−[4, 5].

Pilot tone of 106-tone DRU 1: Tone index [−122 or −93, −45 or −16, +6 or +35, +83 or +112]

Pilot tone of 106-tone DRU 2: Tone index [−112 or −83, −35 or −6, +16 or +45, +93 or +122]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −5 and +4 and two additional tones for 106-tone DRU 2 may be −4 and +5.

As an example, the pilot tone of 106-tone DRU 1 may be [−122, −45, +35, +112] and the pilot tone of 106-tone DRU 2 may be [−112, −35, +45, +122]. As another example, in terms of further distributing a pilot tone between DRUs, the pilot tone of 106-tone DRU 1 may be [−122, −45, +6, +83] and the pilot tone of 106-tone DRU 2 may be [−83, −6, +45, +122].

Through this, a 106-tone DRU may be configured with evenly distributed tones and sufficiently distributed tones.

Example 10. When a Different Shift Value is Applied to all DRUs

Based on a 26-tone DRU tone plan in the above-described Method 1-2, when the shift value of −6, −5, −4, −3, 0, +3, +4, +5, +6 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−122, +6]

Pilot tone of 26-tone DRU 2: Tone index [−112, +16]

Pilot tone of 26-tone DRU 3: Tone index [−102, +26]

Pilot tone of 26-tone DRU 4: Tone index [−92, +36]

Pilot tone of 26-tone DRU 5: Tone index [−64, +64]

Pilot tone of 26-tone DRU 6: Tone index [−36, +92]

Pilot tone of 26-tone DRU 7: Tone index [−26, +102]

Pilot tone of 26-tone DRU 8: Tone index [−16, +112]

Pilot tone of 26-tone DRU 9: Tone index [−6, +122]

In other words, for a corresponding 20 MHz DRU tone plan, all DRUs may be based on pilot tone +−[6, 16, 26, 36, 64, 92, 102, 112, 122].

In addition, the tone index of a pilot tone for each 52-tone DRU may be as follows.

Pilot tone of 52-tone DRU 1: Tone index [−122, −36, +6, +92]

Pilot tone of 52-tone DRU 2: Tone index [−112, −26, +16, +102]

Pilot tone of 52-tone DRU 3: Tone index [−102, −16, +26, +112]

Pilot tone of 52-tone DRU 4: Tone index [−92, −6, +36, +122]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be a null tone or a DC tone in a 26-tone DRU/a 52-tone DRU. Here, two additional tones may be two of DC tone +−[4, 5].

Pilot tone of 106-tone DRU 1: Tone index [−122 or −102, −36 or −16, +6 or +26, +92 or +112]

Pilot tone of 106-tone DRU 2: Tone index [−112 or −92, −26 or −6, +16 or +36, +102 or +122]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −5 and +4 and two additional tones for 106-tone DRU 2 may be −4 and +5.

As an example, the pilot tone of 106-tone DRU 1 may be [−102, −36, +26, +92] and the pilot tone of 106-tone DRU 2 may be [−92, −26, +36, +102]. As another example, in terms of further distributing a pilot tone between DRUs, the pilot tone of 106-tone DRU 1 may be [−122, −36, +6, +92] and the pilot tone of 106-tone DRU 2 may be [−92, −6, +36, +122].

Through this, a 106-tone DRU may be configured with evenly distributed tones and sufficiently distributed tones.

In addition, in a corresponding example, the additional tone of 106-tone DRU 1 may be [−69, +122] and the additional tone of 106-tone DRU 2 may be [−122, +69]. Alternatively, the additional tone of 106-tone DRU 1 may be [−122, +69] and the additional tone of 106-tone DRU 2 may be [−69, +122].

Example 11. When the Same Shift is Applied to Some DURS

Based on a 26-tone DRU tone plan in the above-described Method 1-3, when a −3 shift value is applied to the pilot tone of 26-tone DRU 1 to 26-tone DRU 4, a shift is not applied to the pilot tone of 26-tone DRU 5 and a +3 shift value is applied to the pilot tone of 26-tone DRU 6 to 26-tone DRU 9, the tone index of a pilot tone for each 26-tone DRU may be as follows.

Pilot tone of 26-tone DRU 1: Tone index [−94, +32]

Pilot tone of 26-tone DRU 2: Tone index [−93, +33]

Pilot tone of 26-tone DRU 3: Tone index [−92, +34]

Pilot tone of 26-tone DRU 4: Tone index [−91, +35]

Pilot tone of 26-tone DRU 5: Tone index [−63, +63]

Pilot tone of 26-tone DRU 6: Tone index [−35, +91]

Pilot tone of 26-tone DRU 7: Tone index [−34, +92]

Pilot tone of 26-tone DRU 8: Tone index [−33, +93]

Pilot tone of 26-tone DRU 9: Tone index [−32, +94]

In other words, for a corresponding 20 MHz DRU tone plan, all DRUs may be based on pilot tone +−[32, 33, 34, 35, 63, 91, 92, 93, 94].

In addition, the tone index of a pilot tone for each 52-tone DRU may be as follows.

Pilot tone of 52-tone DRU 1: Tone index [−94, −35, +32, +91]

Pilot tone of 52-tone DRU 2: Tone index [−93, −34, +33, +92]

Pilot tone of 52-tone DRU 3: Tone index [−92, −33, +34, +93]

Pilot tone of 52-tone DRU 4: Tone index [−91, −32, +35, +94]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[4, 122].

Pilot tone of 106-tone DRU 1: Tone index [−94 or −92, −35 or −33, +32 or +34, +91 or +93]

Pilot tone of 106-tone DRU 2: Tone index [−93 or −91, −34 or −32, +33 or +35, +92 or +94]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −4 and +122 and two additional tones for 106-tone DRU 2 may be −122 and +4.

As an example, the pilot tone of 106-tone DRU 1 may be [−94, −35, +34, +93] and the pilot tone of 106-tone DRU 2 may be [−93, −34, +35, +94]. As another example, in terms of further distributing a pilot tone between DRUs, the pilot tone of 106-tone DRU 1 may be [−94, −35, +32, +91] and the pilot tone of 106-tone DRU 2 may be [−91, −32, +35, +94]. An evenly distributed pilot tone may be formed within a DRU, but a similar pilot tone may be configured between DRUs.

Through this, a 106-tone DRU may be configured with evenly distributed tones and sufficiently distributed tones.

Example 12. When a Different Shift Value is Applied to all DRUs

Based on a 26-tone DRU tone plan in the above-described Method 1-3, when the shift value of −4, −3, −2, −1, 0, +1, +2, +3, +4 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−103, +23]

Pilot tone of 26-tone DRU 2: Tone index [−93, +33]

Pilot tone of 26-tone DRU 3: Tone index [−83, +43]

Pilot tone of 26-tone DRU 4: Tone index [−73, +53]

Pilot tone of 26-tone DRU 5: Tone index [−63, +63]

Pilot tone of 26-tone DRU 6: Tone index [−53, +73]

Pilot tone of 26-tone DRU 7: Tone index [−43, +83]

Pilot tone of 26-tone DRU 8: Tone index [−33, +93]

Pilot tone of 26-tone DRU 9: Tone index [−23, +103]

In other words, for a corresponding 20 MHz DRU tone plan, all DRUs may be based on pilot tone +−[23, 33, 43, 53, 63, 73, 83, 93, 103].

In addition, the tone index of a pilot tone for each 52-tone DRU may be as follows.

Pilot tone of 52-tone DRU 1: Tone index [−103, −53, +23, +73]

Pilot tone of 52-tone DRU 2: Tone index [−93, −43, +33, +83]

Pilot tone of 52-tone DRU 3: Tone index [−83, −33, +43, +93]

Pilot tone of 52-tone DRU 4: Tone index [−73, −23, +53, +103]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[4, 122].

Pilot tone of 106-tone DRU 1: Tone index [−103 or −83, −53 or −33, +23 or +43, +73 or +93]

Pilot tone of 106-tone DRU 2: Tone index [−93 or −73, −43 or −23, +33 or +53, +83 or +103]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −4 and +122 and two additional tones for 106-tone DRU 2 may be −122 and +4.

As an example, the pilot tone of 106-tone DRU 1 may be [−103, −33, +23, +93] and the pilot tone of 106-tone DRU 2 may be [−93, −23, +33, +103]. As another example, in terms of further distributing a pilot tone between DRUs, the pilot tone of 106-tone DRU 1 may be [−103, −53, +23, +73] and the pilot tone of 106-tone DRU 2 may be [−73, −23, +53, +103].

Through this, a 106-tone DRU may be configured with evenly distributed tones and sufficiently distributed tones.

Example 13. When a Different Shift Value is Applied to all DRUs

Based on a 26-tone DRU tone plan in the above-described Method 1-3, when the shift value of −5, −4, −3, −2, 0, +2, +3, +4, +5 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−112, +14]
Pilot tone of 26-tone DRU 2: Tone index [−102, +24]
Pilot tone of 26-tone DRU 3: Tone index [−92, +34]
Pilot tone of 26-tone DRU 4: Tone index [−82, +44]
Pilot tone of 26-tone DRU 5: Tone index [−63, +63]
Pilot tone of 26-tone DRU 6: Tone index [−44, +82]
Pilot tone of 26-tone DRU 7: Tone index [−34, +92]
Pilot tone of 26-tone DRU 8: Tone index [−24, +102]
Pilot tone of 26-tone DRU 9: Tone index [−14, +112]

In other words, for a corresponding 20 MHz DRU tone plan, all DRUs may be based on pilot tone +−[14, 24, 34, 44, 63, 82, 92, 102, 112].

In addition, the tone index of a pilot tone for each 52-tone DRU may be as follows.

Pilot tone of 52-tone DRU 1: Tone index [−112, −44, +14, +82]

Pilot tone of 52-tone DRU 2: Tone index [−102, −34, +24, +92]

Pilot tone of 52-tone DRU 3: Tone index [−92, −24, +34, +102]

Pilot tone of 52-tone DRU 4: Tone index [−82, −14, +44, +112]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[4, 122].

Pilot tone of 106-tone DRU 1: Tone index [−112 or −92, −44 or −24, +14 or +34, +82 or +102]

Pilot tone of 106-tone DRU 2: Tone index [−102 or −82, −34 or −14, +24 or +44, +92 or +112]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −4 and +122 and two additional tones for 106-tone DRU 2 may be −122 and +4.

As an example, the pilot tone of 106-tone DRU 1 may be [−112, −44, +34, +102] and the pilot tone of 106-tone DRU 2 may be [−102, −34, +44, +112]. As another example, in terms of further distributing a pilot tone between DRUs, the pilot tone of 106-tone DRU 1 may be [−112, −44, +14, +82] and the pilot tone of 106-tone DRU 2 may be [−82, −14, +44, +112].

Through this, a 106-tone DRU may be configured with evenly distributed tones and sufficiently distributed tones.

Example 13-1. When a Different Shift Value is Applied to all DRUs

Based on a 26-tone DRU tone plan in the above-described Method 1-3, when the shift value of −5, −4, −2, −1, 0, +1, +2, +4, +5 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−112, +14]
Pilot tone of 26-tone DRU 2: Tone index [−102, +24]
Pilot tone of 26-tone DRU 3: Tone index [−83, +43]
Pilot tone of 26-tone DRU 4: Tone index [−73, +53]
Pilot tone of 26-tone DRU 5: Tone index [−63, +63]
Pilot tone of 26-tone DRU 6: Tone index [−53, +73]
Pilot tone of 26-tone DRU 7: Tone index [−43, +83]
Pilot tone of 26-tone DRU 8: Tone index [−24, +102]
Pilot tone of 26-tone DRU 9: Tone index [−14, +112]

In other words, for a corresponding 20 MHz DRU tone plan, all DRUs may be based on pilot tone +−[14, 24, 43, 53, 63, 73, 83, 102, 112].

In addition, the tone index of a pilot tone for each 52-tone DRU may be as follows.

Pilot tone of 52-tone DRU 1: Tone index [−112, −53, +14, +73]

Pilot tone of 52-tone DRU 2: Tone index [−102, −43, +24, +83]

Pilot tone of 52-tone DRU 3: Tone index [−83, −24, +43, +102]

Pilot tone of 52-tone DRU 4: Tone index [−73, −14, +53, +112]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[4, 122].

Pilot tone of 106-tone DRU 1: Tone index [−112 or −83, −53 or −24, +14 or +43, +73 or +102]

Pilot tone of 106-tone DRU 2: Tone index [−102 or −73, −43 or −14, +24 or +53, +83 or +112]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −4 and +122 and two additional tones for 106-tone DRU 2 may be −122 and +4.

As an example, the pilot tone of 106-tone DRU 1 may be [−112, −53, +14, +73] and the pilot tone of 106-tone DRU 2 may be [−73, −14, +53, +112].

Through this, a 106-tone DRU may be configured with evenly distributed tones and sufficiently distributed tones.

Example 13-2. When a Different Shift Value is Applied to all DRUs

Based on a 26-tone DRU tone plan in the above-described Method 1-3, when the shift value of −6, −5, −2, −1, 0, +1, +2, +5, +6 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−121, +5]
Pilot tone of 26-tone DRU 2: Tone index [−111, +15]
Pilot tone of 26-tone DRU 3: Tone index [−83, +43]
Pilot tone of 26-tone DRU 4: Tone index [−73, +53]
Pilot tone of 26-tone DRU 5: Tone index [−63, +63]
Pilot tone of 26-tone DRU 6: Tone index [−53, +73]
Pilot tone of 26-tone DRU 7: Tone index [−43, +83]
Pilot tone of 26-tone DRU 8: Tone index [−15, +111]
Pilot tone of 26-tone DRU 9: Tone index [−5, +121]

In other words, for a corresponding 20 MHz DRU tone plan, all DRUs may be based on pilot tone +−[5, 15, 43, 53, 63, 73, 83, 111, 121].

In addition, the tone index of a pilot tone for each 52-tone DRU may be as follows.

Pilot tone of 52-tone DRU 1: Tone index [−121, −53, +5, +73]
Pilot tone of 52-tone DRU 2: Tone index [−111, −43, +15, +83]
Pilot tone of 52-tone DRU 3: Tone index [−83, −15, +43, +111]
Pilot tone of 52-tone DRU 4: Tone index [−73, −5, +53, +121]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[4, 122].

Pilot tone of 106-tone DRU 1: Tone index [−121 or −83, −53 or −15, +5 or +43, +73 or +111]
Pilot tone of 106-tone DRU 2: Tone index [−111 or −73, −43 or −5, +15 or +53, +83 or +121]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −4 and +122 and two additional tones for 106-tone DRU 2 may be −122 and +4.

As an example, the pilot tone of 106-tone DRU 1 may be [−121, −53, +5, +73] and the pilot tone of 106-tone DRU 2 may be [−73, −5, +53, +121].

Through this, a 106-tone DRU may be configured with evenly distributed tones and sufficiently distributed tones.

Example 13-3. When a Different Shift Value is Applied to all DRUs

Based on a 26-tone DRU tone plan in the above-described Method 1-3, when the shift value of −6, −4, −3, −1, 0, +1, +3, +4, +6 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−121, +5]
Pilot tone of 26-tone DRU 2: Tone index [−102, +24]
Pilot tone of 26-tone DRU 3: Tone index [−92, +34]
Pilot tone of 26-tone DRU 4: Tone index [−73, +53]
Pilot tone of 26-tone DRU 5: Tone index [−63, +63]
Pilot tone of 26-tone DRU 6: Tone index [−53, +73]
Pilot tone of 26-tone DRU 7: Tone index [−34, +92]
Pilot tone of 26-tone DRU 8: Tone index [−24, +102]
Pilot tone of 26-tone DRU 9: Tone index [−5, +121]

In other words, for a corresponding 20 MHz DRU tone plan, all DRUs may be based on pilot tone +−[5, 24, 34, 53, 63, 73, 92, 102, 121].

In addition, the tone index of a pilot tone for each 52-tone DRU may be as follows.

Pilot tone of 52-tone DRU 1: Tone index [−121, −53, +5, +73]
Pilot tone of 52-tone DRU 2: Tone index [−102, −34, +24, +92]
Pilot tone of 52-tone DRU 3: Tone index [−92, −24, +34, +102]
Pilot tone of 52-tone DRU 4: Tone index [−73, −5, +53, +121]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[4, 122].

Pilot tone of 106-tone DRU 1: Tone index [−121 or −92, −53 or −24, +5 or +34, +73 or +102]
Pilot tone of 106-tone DRU 2: Tone index [−102 or −73, −34 or −5, +24 or +53, +92 or +121]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −4 and +122 and two additional tones for 106-tone DRU 2 may be −122 and +4.

As an example, the pilot tone of 106-tone DRU 1 may be [−121, −53, +5, +73] and the pilot tone of 106-tone DRU 2 may be [−73, −5, +53, +121].

Through this, a 106-tone DRU may be configured with evenly distributed tones and sufficiently distributed tones.

Example 14. When a Different Shift Value is Applied to all DRUs

Based on a 26-tone DRU tone plan in the above-described Method 1-3, when the shift value of −6, −5, −3, −2, 0, +2, +3, +5, +6 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−121, +5]
Pilot tone of 26-tone DRU 2: Tone index [−111, +15]
Pilot tone of 26-tone DRU 3: Tone index [−92, +34]
Pilot tone of 26-tone DRU 4: Tone index [−82, +44]
Pilot tone of 26-tone DRU 5: Tone index [−63, +63]
Pilot tone of 26-tone DRU 6: Tone index [−44, +82]
Pilot tone of 26-tone DRU 7: Tone index [−34, +92]
Pilot tone of 26-tone DRU 8: Tone index [−15, +111]
Pilot tone of 26-tone DRU 9: Tone index [−5, +121]

In other words, for a corresponding 20 MHz DRU tone plan, all DRUs may be based on pilot tone +−[5, 15, 34, 44, 63, 82, 92, 111, 121].

In addition, the tone index of a pilot tone for each 52-tone DRU may be as follows.

Pilot tone of 52-tone DRU 1: Tone index [−121, −44, +5, +82]
Pilot tone of 52-tone DRU 2: Tone index [−111, −34, +15, +92]
Pilot tone of 52-tone DRU 3: Tone index [−92, −15, +34, +111]
Pilot tone of 52-tone DRU 4: Tone index [−82, −5, +44, +121]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[4, 122].

Pilot tone of 106-tone DRU 1: Tone index [−121 or −92, −44 or −15, +5 or +34, +82 or +111]

Pilot tone of 106-tone DRU 2: Tone index [−111 or −82, −34 or −5, +15 or +44, +92 or +121]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −4 and +122 and two additional tones for 106-tone DRU 2 may be −122 and +4.

As an example, the pilot tone of 106-tone DRU 1 may be [−121, −44, +34, +111] and the pilot tone of 106-tone DRU 2 may be [−111, −34, +44, +121]. As another example, in terms of further distributing a pilot tone between DRUs, the pilot tone of 106-tone DRU 1 may be [−121, −44, +5, +82] and the pilot tone of 106-tone DRU 2 may be [−82, −5, +44, +121].

Through this, a 106-tone DRU may be configured with evenly distributed tones and sufficiently distributed tones.

Example 15. When a Different Shift Value is Applied to all DRUs

Based on a 26-tone DRU tone plan in the above-described Method 1-3, when the shift value of −6, −5, −4, −3, 0, +3, +4, +5, +6 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−121, +5]

Pilot tone of 26-tone DRU 2: Tone index [−111, +15]

Pilot tone of 26-tone DRU 3: Tone index [−101, +25]

Pilot tone of 26-tone DRU 4: Tone index [−91, +35]

Pilot tone of 26-tone DRU 5: Tone index [−63, +63]

Pilot tone of 26-tone DRU 6: Tone index [−35, +91]

Pilot tone of 26-tone DRU 7: Tone index [−25, +101]

Pilot tone of 26-tone DRU 8: Tone index [−15, +111]

Pilot tone of 26-tone DRU 9: Tone index [−5, +121]

In other words, for a corresponding 20 MHz DRU tone plan, all DRUs may be based on pilot tone +−[5, 15, 25, 35, 63, 91, 101, 111, 121].

In addition, the tone index of a pilot tone for each 52-tone DRU may be as follows.

Pilot tone of 52-tone DRU 1: Tone index [−121, −35, +5, +91]

Pilot tone of 52-tone DRU 2: Tone index [−111, −25, +15, +101]

Pilot tone of 52-tone DRU 3: Tone index [−101, −15, +25, +111]

Pilot tone of 52-tone DRU 4: Tone index [−91, −5, +35, +121]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[4, 122].

Pilot tone of 106-tone DRU 1: Tone index [−121 or −101, −35 or −15, +5 or +25, +91 or +111]

Pilot tone of 106-tone DRU 2: Tone index [−111 or −91, −25 or −5, +15 or +35, +101 or +121]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −4 and +122 and two additional tones for 106-tone DRU 2 may be −122 and +4.

As an example, the pilot tone of 106-tone DRU 1 may be [−101, −35, +25, +91] and the pilot tone of 106-tone DRU 2 may be [−91, −25, +35, +101]. As another example, in terms of further distributing a pilot tone between DRUs, the pilot tone of 106-tone DRU 1 may be [−121, −35, +5, +91] and the pilot tone of 106-tone DRU 2 may be [−91, −5, +35, +121].

Through this, a 106-tone DRU may be configured with evenly distributed tones and sufficiently distributed tones.

Example 16. When the Same Shift is Applied to Some DURS

Based on a 26-tone DRU tone plan in the above-described Method 1-4, when a −3 shift value is applied to the pilot tone of 26-tone DRU 1 to 26-tone DRU 4, a shift is not applied to the pilot tone of 26-tone DRU 5 and a +3 shift value is applied to the pilot tone of 26-tone DRU 6 to 26-tone DRU 9, the tone index of a pilot tone for each 26-tone DRU may be as follows.

Pilot tone of 26-tone DRU 1: Tone index [−93, +31]

Pilot tone of 26-tone DRU 2: Tone index [−92, +32]

Pilot tone of 26-tone DRU 3: Tone index [−91, +33]

Pilot tone of 26-tone DRU 4: Tone index [−90, +34]

Pilot tone of 26-tone DRU 5: Tone index [−62, +62]

Pilot tone of 26-tone DRU 6: Tone index [−34, +90]

Pilot tone of 26-tone DRU 7: Tone index [−33, +91]

Pilot tone of 26-tone DRU 8: Tone index [−32, +92]

Pilot tone of 26-tone DRU 9: Tone index [−31, +93]

In other words, for a corresponding 20 MHz DRU tone plan, all DRUs may be based on pilot tone +−[31, 32, 33, 34, 62, 90, 91, 92, 93].

In addition, the tone index of a pilot tone for each 52-tone DRU may be as follows.

Pilot tone of 52-tone DRU 1: Tone index [−93, −34, +31, +90]

Pilot tone of 52-tone DRU 2: Tone index [−92, −33, +32, +91]

Pilot tone of 52-tone DRU 3: Tone index [−91, −32, +33, +92]

Pilot tone of 52-tone DRU 4: Tone index [−90, −31, +34, +93]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[121, 122].

Pilot tone of 106-tone DRU 1: Tone index [−93 or −91, −34 or −32, +31 or +33, +90 or +92]

Pilot tone of 106-tone DRU 2: Tone index [−92 or −90, −33 or −31, +32 or +34, +91 or +93]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −122 and +121 and two additional tones for 106-tone DRU 2 may be −121 and +122.

As an example, the pilot tone of 106-tone DRU 1 may be [−93, −34, +33, +92] and the pilot tone of 106-tone DRU 2 may be [−92, −33, +34, +93]. As another example, in terms of further distributing a pilot tone between DRUs, the pilot tone of 106-tone DRU 1 may be [−93, −34, +31, +90] and the pilot tone of 106-tone DRU 2 may be [−90, −31, +34, +93]. An evenly distributed pilot tone may be formed within a DRU, but a similar pilot tone may be configured between DRUs.

Through this, a 106-tone DRU may be configured with evenly distributed tones and sufficiently distributed tones.

Example 17. When a Different Shift Value is Applied to all DRUs

Based on a 26-tone DRU tone plan in the above-described Method 1-4, when the shift value of −4, −3, −2, −1, 0, +1, +2, +3, +4 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−102, +22]
Pilot tone of 26-tone DRU 2: Tone index [−92, +32]
Pilot tone of 26-tone DRU 3: Tone index [−82, +42]
Pilot tone of 26-tone DRU 4: Tone index [−72, +52]
Pilot tone of 26-tone DRU 5: Tone index [−62, +62]
Pilot tone of 26-tone DRU 6: Tone index [−52, +72]
Pilot tone of 26-tone DRU 7: Tone index [−42, +82]
Pilot tone of 26-tone DRU 8: Tone index [−32, +92]
Pilot tone of 26-tone DRU 9: Tone index [−22, +102]

In other words, for a corresponding 20 MHz DRU tone plan, all DRUs may be based on pilot tone +−[22, 32, 42, 52, 62, 72, 82, 92, 102].

In addition, the tone index of a pilot tone for each 52-tone DRU may be as follows.

Pilot tone of 52-tone DRU 1: Tone index [−102, −52, +22, +72]
Pilot tone of 52-tone DRU 2: Tone index [−92, −42, +32, +82]
Pilot tone of 52-tone DRU 3: Tone index [−82, −32, +42, +92]
Pilot tone of 52-tone DRU 4: Tone index [−72, −22, +52, +102]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[121, 122].

Pilot tone of 106-tone DRU 1: Tone index [−102 or −82, −52 or −32, +22 or +42, +72 or +92]
Pilot tone of 106-tone DRU 2: Tone index [−92 or −72, −42 or −22, +32 or +52, +82 or +102]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −122 and +121 and two additional tones for 106-tone DRU 2 may be −121 and +122.

As an example, the pilot tone of 106-tone DRU 1 may be [−102, −32, +22, +92] and the pilot tone of 106-tone DRU 2 may be [−92, −22, +32, +102]. As another example, in terms of further distributing a pilot tone between DRUs, the pilot tone of 106-tone DRU 1 may be [−102, −52, +22, +72] and the pilot tone of 106-tone DRU 2 may be [−72, −22, +52, +102].

Through this, a 106-tone DRU may be configured with evenly distributed tones and sufficiently distributed tones.

Example 18. When a Different Shift Value is Applied to all DRUs

Based on a 26-tone DRU tone plan in the above-described Method 1-4, when the shift value of −5, −4, −3, −2, 0, +2, +3, +4, +5 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−111, +13]
Pilot tone of 26-tone DRU 2: Tone index [−101, +23]
Pilot tone of 26-tone DRU 3: Tone index [−91, +33]
Pilot tone of 26-tone DRU 4: Tone index [−81, +43]
Pilot tone of 26-tone DRU 5: Tone index [−62, +62]
Pilot tone of 26-tone DRU 6: Tone index [−43, +81]
Pilot tone of 26-tone DRU 7: Tone index [−33, +91]
Pilot tone of 26-tone DRU 8: Tone index [−23, +101]
Pilot tone of 26-tone DRU 9: Tone index [−13, +111]

In other words, for a corresponding 20 MHz DRU tone plan, all DRUs may be based on pilot tone +−[13, 23, 33, 43, 62, 81, 91, 101, 111].

In addition, the tone index of a pilot tone for each 52-tone DRU may be as follows.

Pilot tone of 52-tone DRU 1: Tone index [−111, −43, +13, +81]
Pilot tone of 52-tone DRU 2: Tone index [−101, −33, +23, +91]
Pilot tone of 52-tone DRU 3: Tone index [−91, −23, +33, +101]
Pilot tone of 52-tone DRU 4: Tone index [−81, −13, +43, +111]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[121, 122].

Pilot tone of 106-tone DRU 1: Tone index [−111 or −91, −43 or −23, +13 or +33, +81 or +101]
Pilot tone of 106-tone DRU 2: Tone index [−101 or −81, −33 or −13, +23 or +43, +91 or +111]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −122 and +121 and two additional tones for 106-tone DRU 2 may be −121 and +122.

As an example, the pilot tone of 106-tone DRU 1 may be [−111, −43, +33, +101] and the pilot tone of 106-tone DRU 2 may be [−101, −33, +43, +111]. As another example, in terms of further distributing a pilot tone between DRUs, the pilot tone of 106-tone DRU 1 may be [−111, −43, +13, +81] and the pilot tone of 106-tone DRU 2 may be [−81, −13, +43, +111].

Through this, a 106-tone DRU may be configured with evenly distributed tones and sufficiently distributed tones.

Example 18-1. When a Different Shift Value is Applied to all DRUs

Based on a 26-tone DRU tone plan in the above-described Method 1-4, when the shift value of −5, −4, −2, −1, 0, +1, +2, +4, +5 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−111, +13]
Pilot tone of 26-tone DRU 2: Tone index [−101, +23]
Pilot tone of 26-tone DRU 3: Tone index [−82, +42]
Pilot tone of 26-tone DRU 4: Tone index [−72, +52]
Pilot tone of 26-tone DRU 5: Tone index [−62, +62]
Pilot tone of 26-tone DRU 6: Tone index [−52, +72]
Pilot tone of 26-tone DRU 7: Tone index [−42, +82]
Pilot tone of 26-tone DRU 8: Tone index [−23, +101]

Pilot tone of 26-tone DRU 9: Tone index [−13, +111]

In other words, for a corresponding 20 MHz DRU tone plan, all DRUs may be based on pilot tone +−[13, 23, 42, 52, 62, 72, 82, 101, 111].

In addition, the tone index of a pilot tone for each 52-tone DRU may be as follows.

Pilot tone of 52-tone DRU 1: Tone index [−111, −52, +13, +72]

Pilot tone of 52-tone DRU 2: Tone index [−101, −42, +23, +82]

Pilot tone of 52-tone DRU 3: Tone index [−82, −23, +42, +101]

Pilot tone of 52-tone DRU 4: Tone index [−72, −13, +52, +111]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[121, 122].

Pilot tone of 106-tone DRU 1: Tone index [−111 or −82, −52 or −23, +13 or +42, +72 or +101]

Pilot tone of 106-tone DRU 2: Tone index [−101 or −72, −42 or −13, +23 or +52, +82 or +111]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −122 and +121 and two additional tones for 106-tone DRU 2 may be −121 and +122.

As an example, the pilot tone of 106-tone DRU 1 may be [−111, −52, +13, +72] and the pilot tone of 106-tone DRU 2 may be [−72, −13, +52, +111].

Through this, a 106-tone DRU may be configured with evenly distributed tones and sufficiently distributed tones.

Example 18-2. When a Different Shift Value is Applied to all DRUs

Based on a 26-tone DRU tone plan in the above-described Method 1-4, when the shift value of −6, −5, −2, −1, 0, +1, +2, +5, +6 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−120, +4]

Pilot tone of 26-tone DRU 2: Tone index [−110, +14]

Pilot tone of 26-tone DRU 3: Tone index [−82, +42]

Pilot tone of 26-tone DRU 4: Tone index [−72, +52]

Pilot tone of 26-tone DRU 5: Tone index [−62, +62]

Pilot tone of 26-tone DRU 6: Tone index [−52, +72]

Pilot tone of 26-tone DRU 7: Tone index [−42, +82]

Pilot tone of 26-tone DRU 8: Tone index [−14, +110]

Pilot tone of 26-tone DRU 9: Tone index [−4, +120]

In other words, for a corresponding 20 MHz DRU tone plan, all DRUs may be based on pilot tone +−[4, 14, 42, 52, 62, 72, 82, 110, 120].

In addition, the tone index of a pilot tone for each 52-tone DRU may be as follows.

Pilot tone of 52-tone DRU 1: Tone index [−120, −52, +4, +72]

Pilot tone of 52-tone DRU 2: Tone index [−110, −42, +14, +82]

Pilot tone of 52-tone DRU 3: Tone index [−82, −14, +42, +110]

Pilot tone of 52-tone DRU 4: Tone index [−72, −4, +52, +120]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[121, 122].

Pilot tone of 106-tone DRU 1: Tone index [−120 or −82, −52 or −14, +4 or +42, +72 or +110]

Pilot tone of 106-tone DRU 2: Tone index [−110 or −72, −42 or −4, +14 or +52, +82 or +120]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −122 and +121 and two additional tones for 106-tone DRU 2 may be −121 and +122.

As an example, the pilot tone of 106-tone DRU 1 may be [−120, −52, +4, +72] and the pilot tone of 106-tone DRU 2 may be [−72, −4, +52, +120].

Through this, a 106-tone DRU may be configured with evenly distributed tones and sufficiently distributed tones.

Example 18-3. When a Different Shift Value is Applied to all DRUs

Based on a 26-tone DRU tone plan in the above-described Method 1-4, when the shift value of −6, −4, −3, −1, 0, +1, +3, +4, +6 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−120, +4]

Pilot tone of 26-tone DRU 2: Tone index [−101, +23]

Pilot tone of 26-tone DRU 3: Tone index [−91, +33]

Pilot tone of 26-tone DRU 4: Tone index [−72, +52]

Pilot tone of 26-tone DRU 5: Tone index [−62, +62]

Pilot tone of 26-tone DRU 6: Tone index [−52, +72]

Pilot tone of 26-tone DRU 7: Tone index [−33, +91]

Pilot tone of 26-tone DRU 8: Tone index [−23, +101]

Pilot tone of 26-tone DRU 9: Tone index [−4, +120]

In other words, for a corresponding 20 MHz DRU tone plan, all DRUs may be based on pilot tone +−[4, 23, 33, 52, 62, 72, 91, 101, 120].

In addition, the tone index of a pilot tone for each 52-tone DRU may be as follows.

Pilot tone of 52-tone DRU 1: Tone index [−120, −52, +4, +72]

Pilot tone of 52-tone DRU 2: Tone index [−101, −33, +23, +91]

Pilot tone of 52-tone DRU 3: Tone index [−91, −23, +33, +101]

Pilot tone of 52-tone DRU 4: Tone index [−72, −4, +52, +120]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[121, 122].

Pilot tone of 106-tone DRU 1: Tone index [−120 or −91, −52 or −23, +4 or +33, +72 or +101]

Pilot tone of 106-tone DRU 2: Tone index [−101 or −72, −33 or −4, +23 or +52, +91 or +120]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −122 and +121 and two additional tones for 106-tone DRU 2 may be −121 and +121.

As an example, the pilot tone of 106-tone DRU 1 may be [−120, −52, +4, +72] and the pilot tone of 106-tone DRU 2 may be [−72, −4, +52, +120].

Through this, a 106-tone DRU may be configured with evenly distributed tones and sufficiently distributed tones.

Example 19. When a Different Shift Value is Applied to all DRUs

Based on a 26-tone DRU tone plan in the above-described Method 1-4, when the shift value of −6, −5, −3, −2, 0, +2, +3, +5, +6 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−120, +4]
Pilot tone of 26-tone DRU 2: Tone index [−110, +14]
Pilot tone of 26-tone DRU 3: Tone index [−91, +33]
Pilot tone of 26-tone DRU 4: Tone index [−81, +43]
Pilot tone of 26-tone DRU 5: Tone index [−62, +62]
Pilot tone of 26-tone DRU 6: Tone index [−43, +81]
Pilot tone of 26-tone DRU 7: Tone index [−33, +91]
Pilot tone of 26-tone DRU 8: Tone index [−14, +110]
Pilot tone of 26-tone DRU 9: Tone index [−4, +120]

In other words, for a corresponding 20 MHz DRU tone plan, all DRUs may be based on pilot tone +−[4, 14, 33, 43, 62, 81, 91, 110, 120].

In addition, the tone index of a pilot tone for each 52-tone DRU may be as follows.

Pilot tone of 52-tone DRU 1: Tone index [−120, −43, +4, +81]
Pilot tone of 52-tone DRU 2: Tone index [−110, −33, +14, +91]
Pilot tone of 52-tone DRU 3: Tone index [−91, −14, +33, +110]
Pilot tone of 52-tone DRU 4: Tone index [−81, −4, +43, +120]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[121, 122].

Pilot tone of 106-tone DRU 1: Tone index [−120 or −91, −43 or −14, +4 or +33, +81 or +110]
Pilot tone of 106-tone DRU 2: Tone index [−110 or −81, −33 or −4, +14 or +43, +91 or +120]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −122 and +121 and two additional tones for 106-tone DRU 2 may be −121 and +122.

As an example, the pilot tone of 106-tone DRU 1 may be [−120, −43, +33, +110] and the pilot tone of 106-tone DRU 2 may be [−110, −33, +43, +120]. As another example, in terms of further distributing a pilot tone between DRUs, the pilot tone of 106-tone DRU 1 may be [−120, −43, +4, +81] and the pilot tone of 106-tone DRU 2 may be [−81, −4, +43, +120].

Through this, a 106-tone DRU may be configured with evenly distributed tones and sufficiently distributed tones.

Example 20. When a Different Shift Value is Applied to all DRUs

Based on a 26-tone DRU tone plan in the above-described Method 1-4, when the shift value of −6, −5, −4, −3, 0, +3, +4, +5, +6 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−120, +4]
Pilot tone of 26-tone DRU 2: Tone index [−110, +14]
Pilot tone of 26-tone DRU 3: Tone index [−100, +24]
Pilot tone of 26-tone DRU 4: Tone index [−90, +34]
Pilot tone of 26-tone DRU 5: Tone index [−62, +62]
Pilot tone of 26-tone DRU 6: Tone index [−34, +90]
Pilot tone of 26-tone DRU 7: Tone index [−24, +100]
Pilot tone of 26-tone DRU 8: Tone index [−14, +110]
Pilot tone of 26-tone DRU 9: Tone index [−4, +120]

In other words, for a corresponding 20 MHz DRU tone plan, all DRUs may be based on pilot tone +−[4, 14, 24, 34, 62, 90, 100, 110, 120].

In addition, the tone index of a pilot tone for each 52-tone DRU may be as follows.

Pilot tone of 52-tone DRU 1: Tone index [−120, −34, +4, +90]
Pilot tone of 52-tone DRU 2: Tone index [−110, −24, +14, +100]
Pilot tone of 52-tone DRU 3: Tone index [−100, −14, +24, +110]
Pilot tone of 52-tone DRU 4: Tone index [−90, −4, +34, +120]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[121, 122].

Pilot tone of 106-tone DRU 1: Tone index [−120 or −100, −34 or −14, +4 or +24, +90 or +110]
Pilot tone of 106-tone DRU 2: Tone index [−110 or −90, −24 or −4, +14 or +34, +100 or +120]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −122 and +121 and two additional tones for 106-tone DRU 2 may be −121 and +121.

As an example, the pilot tone of 106-tone DRU 1 may be [−100, −34, +24, +90] and the pilot tone of 106-tone DRU 2 may be [−90, −24, +34, +100]. As another example, in terms of further distributing a pilot tone between DRUs, the pilot tone of 106-tone DRU 1 may be [−120, −34, +4, +90] and the pilot tone of 106-tone DRU 2 may be [−90, −4, +34, +120].

Through this, a 106-tone DRU may be configured with evenly distributed tones and sufficiently distributed tones.

In addition, in a tone plan based on Method 1-4, the null tone of [−3, +2] instead of [−122, +121] may be combined for 106-tone DRU 1 and the null tone of [−2, +3] instead of [−121, +122] may be combined for 106-tone DRU 2.

Example 21. When the Same Shift is Applied to Some DURS

Based on a 26-tone DRU tone plan in the above-described Method 1-5, when a −3 shift value is applied to the pilot tone of 26-tone DRU 1 to 26-tone DRU 4, a shift is not applied to the pilot tone of 26-tone DRU 5 and a +3 shift value is applied to the pilot tone of 26-tone DRU 6 to 26-tone DRU 9, the tone index of a pilot tone for each 26-tone DRU may be as follows.

Pilot tone of 26-tone DRU 1: Tone index [−91, +29]
Pilot tone of 26-tone DRU 2: Tone index [−90, +30]

Pilot tone of 26-tone DRU 3: Tone index [−89, +31]
Pilot tone of 26-tone DRU 4: Tone index [−88, +32]
Pilot tone of 26-tone DRU 5: Tone index [−60, +60]
Pilot tone of 26-tone DRU 6: Tone index [−32, +88]
Pilot tone of 26-tone DRU 7: Tone index [−31, +89]
Pilot tone of 26-tone DRU 8: Tone index [−30, +90]
Pilot tone of 26-tone DRU 9: Tone index [−29, +91]

In other words, for a corresponding 20 MHz DRU tone plan, all DRUs may be based on pilot tone +−[29, 30, 31, 32, 60, 88, 89, 90, 91].

In addition, the tone index of a pilot tone for each 52-tone DRU may be as follows.

Pilot tone of 52-tone DRU 1: Tone index [−91, −32, +29, +88]
Pilot tone of 52-tone DRU 2: Tone index [−90, −31, +30, +89]
Pilot tone of 52-tone DRU 3: Tone index [−89, −30, +31, +90]
Pilot tone of 52-tone DRU 4: Tone index [−88, −29, +32, +91]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[119, 120].

Pilot tone of 106-tone DRU 1: Tone index [−91 or −89, −32 or −30, +29 or +31, +88 or +90]
Pilot tone of 106-tone DRU 2: Tone index [−90 or −88, −31 or −29, +30 or +32, +89 or +91]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −120 and +119 and two additional tones for 106-tone DRU 2 may be −119 and +120.

As an example, the pilot tone of 106-tone DRU 1 may be [−91, −32, +29, +88] and the pilot tone of 106-tone DRU 2 may be [−88, −29, +32, +91]. An evenly distributed pilot tone may be formed within a DRU, but a similar pilot tone may be configured between DRUs.

Through this, a 106-tone DRU may be configured with evenly distributed tones and sufficiently distributed tones.

Example 22. When a Different Shift Value is Applied to all DRUs

Based on a 26-tone DRU tone plan in the above-described Method 1-5, when the shift value of −4, −3, −2, −1, 0, +1, +2, +3, +4 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−100, +20]
Pilot tone of 26-tone DRU 2: Tone index [−90, +30]
Pilot tone of 26-tone DRU 3: Tone index [−80, +40]
Pilot tone of 26-tone DRU 4: Tone index [−70, +50]
Pilot tone of 26-tone DRU 5: Tone index [−60, +60]
Pilot tone of 26-tone DRU 6: Tone index [−50, +70]
Pilot tone of 26-tone DRU 7: Tone index [−40, +80]
Pilot tone of 26-tone DRU 8: Tone index [−30, +90]
Pilot tone of 26-tone DRU 9: Tone index [−20, +100]

In other words, for a corresponding 20 MHz DRU tone plan, all DRUs may be based on pilot tone +−[20, 30, 40, 50, 60, 70, 80, 90, 100].

In addition, the tone index of a pilot tone for each 52-tone DRU may be as follows.

Pilot tone of 52-tone DRU 1: Tone index [−100, −50, +20, +70]
Pilot tone of 52-tone DRU 2: Tone index [−90, −40, +30, +80]
Pilot tone of 52-tone DRU 3: Tone index [−80, −30, +40, +90]
Pilot tone of 52-tone DRU 4: Tone index [−70, −20, +50, +100]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[119, 120].

Pilot tone of 106-tone DRU 1: Tone index [−100 or −80, −50 or −30, +20 or +40, +70 or +90]
Pilot tone of 106-tone DRU 2: Tone index [−90 or −70, −40 or −20, +30 or +50, +80 or +100]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −120 and +119 and two additional tones for 106-tone DRU 2 may be −119 and +120.

As an example, the pilot tone of 106-tone DRU 1 may be [−100, −50, +20, +70] and the pilot tone of 106-tone DRU 2 may be [−70, −20, +50, +100].

Through this, a 106-tone DRU may be configured with evenly distributed tones and sufficiently distributed tones.

Example 23. When a Different Shift Value is Applied to all DRUs

Based on a 26-tone DRU tone plan in the above-described Method 1-5, when the shift value of −5, −4, −3, −2, 0, +2, +3, +4, +5 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−109, +11]
Pilot tone of 26-tone DRU 2: Tone index [−99, +21]
Pilot tone of 26-tone DRU 3: Tone index [−89, +31]
Pilot tone of 26-tone DRU 4: Tone index [−79, +41]
Pilot tone of 26-tone DRU 5: Tone index [−60, +60]
Pilot tone of 26-tone DRU 6: Tone index [−41, +79]
Pilot tone of 26-tone DRU 7: Tone index [−31, +89]
Pilot tone of 26-tone DRU 8: Tone index [−21, +99]
Pilot tone of 26-tone DRU 9: Tone index [−11, +109]

In other words, for a corresponding 20 MHz DRU tone plan, all DRUs may be based on pilot tone +−[11, 21, 31, 41, 60, 79, 89, 99, 109].

In addition, the tone index of a pilot tone for each 52-tone DRU may be as follows.

Pilot tone of 52-tone DRU 1: Tone index [−109, −41, +11, +79]
Pilot tone of 52-tone DRU 2: Tone index [−99, −31, +21, +89]
Pilot tone of 52-tone DRU 3: Tone index [−89, −21, +31, +99]
Pilot tone of 52-tone DRU 4: Tone index [−79, −11, +41, +109]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[119, 120].

Pilot tone of 106-tone DRU 1: Tone index [−109 or −89, −41 or −21, +11 or +31, +79 or +99]

Pilot tone of 106-tone DRU 2: Tone index [−99 or −79, −31 or −11, +21 or +41, +89 or +109]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −119 and +120 and two additional tones for 106-tone DRU 2 may be −120 and +119.

As an example, the pilot tone of 106-tone DRU 1 may be [−109, −41, +11, +79] and the pilot tone of 106-tone DRU 2 may be [−79, −11, +41, +109].

Through this, a 106-tone DRU may be configured with evenly distributed tones and sufficiently distributed tones.

Example 23-1. When a Different Shift Value is Applied to all DRUs

Based on a 26-tone DRU tone plan in the above-described Method 1-5, when the shift value of −5, −4, −2, −1, 0, +1, +2, +4, +5 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−109, +11]

Pilot tone of 26-tone DRU 2: Tone index [−99, +21]

Pilot tone of 26-tone DRU 3: Tone index [−80, +40]

Pilot tone of 26-tone DRU 4: Tone index [−70, +50]

Pilot tone of 26-tone DRU 5: Tone index [−60, +60]

Pilot tone of 26-tone DRU 6: Tone index [−50, +70]

Pilot tone of 26-tone DRU 7: Tone index [−40, +80]

Pilot tone of 26-tone DRU 8: Tone index [−21, +99]

Pilot tone of 26-tone DRU 9: Tone index [−11, +109]

In other words, for a corresponding 20 MHz DRU tone plan, all DRUs may be based on pilot tone +−[11, 21, 40, 50, 60, 70, 80, 99, 109].

In addition, the tone index of a pilot tone for each 52-tone DRU may be as follows.

Pilot tone of 52-tone DRU 1: Tone index [−109, −50, +11, +70]

Pilot tone of 52-tone DRU 2: Tone index [−99, −40, +21, +80]

Pilot tone of 52-tone DRU 3: Tone index [−80, −21, +40, +99]

Pilot tone of 52-tone DRU 4: Tone index [−70, −11, +50, +109]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[119, 120].

Pilot tone of 106-tone DRU 1: Tone index [−109 or −80, −50 or −21, +11 or +40, +70 or +99]

Pilot tone of 106-tone DRU 2: Tone index [−99 or −70, −40 or −11, +21 or +50, +80 or +109]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −120 and +119 and two additional tones for 106-tone DRU 2 may be −119 and +120.

As an example, the pilot tone of 106-tone DRU 1 may be [−109, −50, +11, +70] and the pilot tone of 106-tone DRU 2 may be [−70, −11, +50, +109].

Through this, a 106-tone DRU may be configured with evenly distributed tones and sufficiently distributed tones.

Example 23-2. When a Different Shift Value is Applied to all DRUs

Based on a 26-tone DRU tone plan in the above-described Method 1-5, when the shift value of −6, −5, −2, −1, 0, +1, +2, +5, +6 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−118, +2]

Pilot tone of 26-tone DRU 2: Tone index [−108, +12]

Pilot tone of 26-tone DRU 3: Tone index [−80, +40]

Pilot tone of 26-tone DRU 4: Tone index [−70, +50]

Pilot tone of 26-tone DRU 5: Tone index [−60, +60]

Pilot tone of 26-tone DRU 6: Tone index [−50, +70]

Pilot tone of 26-tone DRU 7: Tone index [−40, +80]

Pilot tone of 26-tone DRU 8: Tone index [−12, +108]

Pilot tone of 26-tone DRU 9: Tone index [−2, +118]

In other words, for a corresponding 20 MHz DRU tone plan, all DRUs may be based on pilot tone +−[2, 12, 40, 50, 60, 70, 80, 108, 118].

In addition, the tone index of a pilot tone for each 52-tone DRU may be as follows.

Pilot tone of 52-tone DRU 1: Tone index [−118, −50, +2, +70]

Pilot tone of 52-tone DRU 2: Tone index [−108, −40, +12, +80]

Pilot tone of 52-tone DRU 3: Tone index [−80, −12, +40, +108]

Pilot tone of 52-tone DRU 4: Tone index [−70, −2, +50, +118]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[119, 120].

Pilot tone of 106-tone DRU 1: Tone index [−118 or −80, −50 or −12, +2 or +40, +70 or +108]

Pilot tone of 106-tone DRU 2: Tone index [−108 or −70, −40 or −2, +12 or +50, +80 or +118]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −120 and +119 and two additional tones for 106-tone DRU 2 may be −119 and +120.

As an example, the pilot tone of 106-tone DRU 1 may be [−118, −50, +2, +70] and the pilot tone of 106-tone DRU 2 may be [−70, −2, +50, +118].

Through this, a 106-tone DRU may be configured with evenly distributed tones and sufficiently distributed tones.

Example 23-3. When a Different Shift Value is Applied to all DRUs

Based on a 26-tone DRU tone plan in the above-described Method 1-5, when the shift value of −6, −4, −3, −1, 0, +1, +3, +4, +6 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−118, +2]

Pilot tone of 26-tone DRU 2: Tone index [−99, +21]

Pilot tone of 26-tone DRU 3: Tone index [−89, +31]

Pilot tone of 26-tone DRU 4: Tone index [−70, +50]

Pilot tone of 26-tone DRU 5: Tone index [−60, +60]
Pilot tone of 26-tone DRU 6: Tone index [−50, +70]
Pilot tone of 26-tone DRU 7: Tone index [−31, +89]
Pilot tone of 26-tone DRU 8: Tone index [−21, +99]
Pilot tone of 26-tone DRU 9: Tone index [−2, +118]

In other words, for a corresponding 20 MHz DRU tone plan, all DRUs may be based on pilot tone +−[2, 21, 31, 50, 60, 70, 89, 99, 118].

In addition, the tone index of a pilot tone for each 52-tone DRU may be as follows.

Pilot tone of 52-tone DRU 1: Tone index [−118, −50, +2, +70]
Pilot tone of 52-tone DRU 2: Tone index [−99, −31, +21, +89]
Pilot tone of 52-tone DRU 3: Tone index [−89, −21, +31, +99]
Pilot tone of 52-tone DRU 4: Tone index [−70, −2, +50, +118]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[119, 120].

Pilot tone of 106-tone DRU 1: Tone index [−118 or −89, −50 or −21, +2 or +31, +70 or +99]
Pilot tone of 106-tone DRU 2: Tone index [−99 or −70, −31 or −2, +21 or +50, +89 or +118]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −120 and +119 and two additional tones for 106-tone DRU 2 may be −119 and +120.

As an example, the pilot tone of 106-tone DRU 1 may be [−118, −50, +2, +70] and the pilot tone of 106-tone DRU 2 may be [−70, −2, +50, +118].

Through this, a 106-tone DRU may be configured with evenly distributed tones and sufficiently distributed tones.

Example 24. When a Different Shift Value is Applied to all DRUs

Based on a 26-tone DRU tone plan in the above-described Method 1-5, when the shift value of −6, −5, −3, −2, 0, +2, +3, +5, +6 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−118, +2]
Pilot tone of 26-tone DRU 2: Tone index [−108, +11]
Pilot tone of 26-tone DRU 3: Tone index [−89, +31]
Pilot tone of 26-tone DRU 4: Tone index [−79, +41]
Pilot tone of 26-tone DRU 5: Tone index [−60, +60]
Pilot tone of 26-tone DRU 6: Tone index [−41, +79]
Pilot tone of 26-tone DRU 7: Tone index [−31, +89]
Pilot tone of 26-tone DRU 8: Tone index [−12, +108]
Pilot tone of 26-tone DRU 9: Tone index [−2, +118]

In other words, for a corresponding 20 MHz DRU tone plan, all DRUs may be based on pilot tone +−[2, 12, 31, 41, 60, 79, 89, 108, 118].

In addition, the tone index of a pilot tone for each 52-tone DRU may be as follows.

Pilot tone of 52-tone DRU 1: Tone index [−118, −41, +2, +79]
Pilot tone of 52-tone DRU 2: Tone index [−108, −31, +12, +89]
Pilot tone of 52-tone DRU 3: Tone index [−89, −12, +31, +108]
Pilot tone of 52-tone DRU 4: Tone index [−79, −2, +41, +118]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[119, 120].

Pilot tone of 106-tone DRU 1: Tone index [−118 or −89, −41 or −12, +2 or +31, +79 or +108]
Pilot tone of 106-tone DRU 2: Tone index [−108 or −79, −31 or −2, +12 or +41, +89 or +118]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −120 and +119 and two additional tones for 106-tone DRU 2 may be −119 and +120.

As an example, the pilot tone of 106-tone DRU 1 may be [−118, −41, +2, +79] and the pilot tone of 106-tone DRU 2 may be [−79, −2, +41, +118].

Through this, a 106-tone DRU may be configured with evenly distributed tones and sufficiently distributed tones.

Example 25. When a Different Shift Value is Applied to all DRUs

Based on a 26-tone DRU tone plan in the above-described Method 1-5, when the shift value of −6, −5, −4, −3, 0, +3, +4, +5, +6 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−118, +2]
Pilot tone of 26-tone DRU 2: Tone index [−108, +12]
Pilot tone of 26-tone DRU 3: Tone index [−98, +22]
Pilot tone of 26-tone DRU 4: Tone index [−88, +32]
Pilot tone of 26-tone DRU 5: Tone index [−60, +60]
Pilot tone of 26-tone DRU 6: Tone index [−32, +88]
Pilot tone of 26-tone DRU 7: Tone index [−22, +98]
Pilot tone of 26-tone DRU 8: Tone index [−12, +108]
Pilot tone of 26-tone DRU 9: Tone index [−2, +118]

In other words, for a corresponding 20 MHz DRU tone plan, all DRUs may be based on pilot tone +−[2, 12, 22, 32, 60, 88, 98, 108, 118].

In addition, the tone index of a pilot tone for each 52-tone DRU may be as follows.

Pilot tone of 52-tone DRU 1: Tone index [−118, −32, +2, +88]
Pilot tone of 52-tone DRU 2: Tone index [−108, −22, +12, +98]
Pilot tone of 52-tone DRU 3: Tone index [−98, −12, +22, +108]
Pilot tone of 52-tone DRU 4: Tone index [−88, −2, +32, +118]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[119, 120].

Pilot tone of 106-tone DRU 1: Tone index [−118 or −98, −32 or −12, +2 or +22, +88 or +108]
Pilot tone of 106-tone DRU 2: Tone index [−108 or −88, −22 or −2, +12 or +32, +98 or +118]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −120 and +119 and two additional tones for 106-tone DRU 2 may be −119 and +120.

As an example, the pilot tone of 106-tone DRU 1 may be [−118, −32, +2, +88] and the pilot tone of 106-tone DRU 2 may be [−88, −2, +32, +118].

Through this, a 106-tone DRU may be configured with evenly distributed tones and sufficiently distributed tones.

Example 26. When the Same Shift is Applied to Some DURS

Based on a 26-tone DRU tone plan in the above-described Method 1-6, when a −3 shift value is applied to the pilot tone of 26-tone DRU 1 to 26-tone DRU 4, a shift is not applied to the pilot tone of 26-tone DRU 5 and a +3 shift value is applied to the pilot tone of 26-tone DRU 6 to 26-tone DRU 9, the tone index of a pilot tone for each 26-tone DRU may be as follows.

Pilot tone of 26-tone DRU 1: Tone index [−92, +30]
Pilot tone of 26-tone DRU 2: Tone index [−91, +31]
Pilot tone of 26-tone DRU 3: Tone index [−90, +32]
Pilot tone of 26-tone DRU 4: Tone index [−89, +33]
Pilot tone of 26-tone DRU 5: Tone index [−61, +61]
Pilot tone of 26-tone DRU 6: Tone index [−33, +89]
Pilot tone of 26-tone DRU 7: Tone index [−32, +90]
Pilot tone of 26-tone DRU 8: Tone index [−31, +91]
Pilot tone of 26-tone DRU 9: Tone index [−30, +92]

In other words, for a corresponding 20 MHz DRU tone plan, all DRUs may be based on pilot tone +−[30, 31, 32, 33, 61, 89, 90, 91, 92].

In addition, the tone index of a pilot tone for each 52-tone DRU may be as follows.

Pilot tone of 52-tone DRU 1: Tone index [−92, −33, +30, +89]
Pilot tone of 52-tone DRU 2: Tone index [−91, −32, +31, +90]
Pilot tone of 52-tone DRU 3: Tone index [−90, −31, +32, +91]
Pilot tone of 52-tone DRU 4: Tone index [−89, −30, +33, +92]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[2, 120].

Pilot tone of 106-tone DRU 1: Tone index [−92 or −90, −33 or −31, +30 or +32, +89 or +91]
Pilot tone of 106-tone DRU 2: Tone index [−91 or −89, −32 or −30, +31 or +33, +90 or +92]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −2 and +120 and two additional tones for 106-tone DRU 2 may be −120 and +2.

As an example, the pilot tone of 106-tone DRU 1 may be [−92, −33, +30, +89] and the pilot tone of 106-tone DRU 2 may be [−89, −30, +33, +92]. An evenly distributed pilot tone may be formed within a DRU, but a similar pilot tone may be configured between DRUs.

Through this, a 106-tone DRU may be configured with evenly distributed tones and sufficiently distributed tones.

Example 27. When a Different Shift Value is Applied to all DRUs

Based on a 26-tone DRU tone plan in the above-described Method 1-6, when the shift value of −4, −3, −2, −1, 0, +1, +2, +3, +4 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−101, +21]
Pilot tone of 26-tone DRU 2: Tone index [−91, +31]
Pilot tone of 26-tone DRU 3: Tone index [−81, +41]
Pilot tone of 26-tone DRU 4: Tone index [−71, +51]
Pilot tone of 26-tone DRU 5: Tone index [−61, +61]
Pilot tone of 26-tone DRU 6: Tone index [−51, +71]
Pilot tone of 26-tone DRU 7: Tone index [−41, +81]
Pilot tone of 26-tone DRU 8: Tone index [−31, +91]
Pilot tone of 26-tone DRU 9: Tone index [−21, +101]

In other words, for a corresponding 20 MHz DRU tone plan, all DRUs may be based on pilot tone +−[21, 31, 41, 51, 61, 71, 81, 91, 101].

In addition, the tone index of a pilot tone for each 52-tone DRU may be as follows.

Pilot tone of 52-tone DRU 1: Tone index [−101, −51, +21, +71]
Pilot tone of 52-tone DRU 2: Tone index [−91, −41, +31, +81]
Pilot tone of 52-tone DRU 3: Tone index [−81, −31, +41, +91]
Pilot tone of 52-tone DRU 4: Tone index [−71, −21, +51, +101]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[2, 120].

Pilot tone of 106-tone DRU 1: Tone index [−101 or −81, −51 or −31, +21 or +41, +71 or +91]
Pilot tone of 106-tone DRU 2: Tone index [−91 or −71, −41 or −21, +31 or +51, +81 or +101]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −2 and +120 and two additional tones for 106-tone DRU 2 may be −120 and +2.

As an example, the pilot tone of 106-tone DRU 1 may be [−101, −51, +21, +71] and the pilot tone of 106-tone DRU 2 may be [−71, −21, +51, +101].

Through this, a 106-tone DRU may be configured with evenly distributed tones and sufficiently distributed tones.

Example 28. When a Different Shift Value is Applied to all DRUs

Based on a 26-tone DRU tone plan in the above-described Method 1-6, when the shift value of −5, −4, −3, −2, 0, +2, +3, +4, +5 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−110, +12]
Pilot tone of 26-tone DRU 2: Tone index [−100, +22]
Pilot tone of 26-tone DRU 3: Tone index [−90, +32]
Pilot tone of 26-tone DRU 4: Tone index [−80, +42]

Pilot tone of 26-tone DRU 5: Tone index [−61, +61]

Pilot tone of 26-tone DRU 6: Tone index [−42, +80]

Pilot tone of 26-tone DRU 7: Tone index [−32, +90]

Pilot tone of 26-tone DRU 8: Tone index [−22, +100]

Pilot tone of 26-tone DRU 9: Tone index [−12, +110]

In other words, for a corresponding 20 MHz DRU tone plan, all DRUs may be based on pilot tone +−[12, 22, 32, 42, 61, 80, 90, 100, 110].

In addition, the tone index of a pilot tone for each 52-tone DRU may be as follows.

Pilot tone of 52-tone DRU 1: Tone index [−110, −42, +12, +80]

Pilot tone of 52-tone DRU 2: Tone index [−100, −32, +22, +90]

Pilot tone of 52-tone DRU 3: Tone index [−90, −22, +32, +100]

Pilot tone of 52-tone DRU 4: Tone index [−80, −12, +42, +110]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[2, 120].

Pilot tone of 106-tone DRU 1: Tone index [−110 or −90, −42 or −22, +12 or +32, +80 or +100]

Pilot tone of 106-tone DRU 2: Tone index [−100 or −80, −32 or −12, +22 or +42, +90 or +110]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −2 and +120 and two additional tones for 106-tone DRU 2 may be −120 and +2.

As an example, the pilot tone of 106-tone DRU 1 may be [−110, −42, +12, +80] and the pilot tone of 106-tone DRU 2 may be [−80, −12, +42, +110].

Through this, a 106-tone DRU may be configured with evenly distributed tones and sufficiently distributed tones.

Example 28-1. When a Different Shift Value is Applied to all DRUs

Based on a 26-tone DRU tone plan in the above-described Method 1-6, when the shift value of −5, −4, −2, −1, 0, +1, +2, +4, +5 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−110, +12]

Pilot tone of 26-tone DRU 2: Tone index [−100, +22]

Pilot tone of 26-tone DRU 3: Tone index [−81, +41]

Pilot tone of 26-tone DRU 4: Tone index [−71, +51]

Pilot tone of 26-tone DRU 5: Tone index [−61, +61]

Pilot tone of 26-tone DRU 6: Tone index [−51, +71]

Pilot tone of 26-tone DRU 7: Tone index [−41, +81]

Pilot tone of 26-tone DRU 8: Tone index [−22, +100]

Pilot tone of 26-tone DRU 9: Tone index [−12, +110]

In other words, for a corresponding 20 MHz DRU tone plan, all DRUs may be based on pilot tone +−[12, 22, 41, 51, 61, 71, 81, 100, 110].

In addition, the tone index of a pilot tone for each 52-tone DRU may be as follows.

Pilot tone of 52-tone DRU 1: Tone index [−110, −51, +12, +71]

Pilot tone of 52-tone DRU 2: Tone index [−100, −41, +22, +81]

Pilot tone of 52-tone DRU 3: Tone index [−81, −22, +41, +100]

Pilot tone of 52-tone DRU 4: Tone index [−71, −12, +51, +110]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[2, 120].

Pilot tone of 106-tone DRU 1: Tone index [−110 or −81, −51 or −22, +12 or +41, +71 or +100]

Pilot tone of 106-tone DRU 2: Tone index [−100 or −71, −41 or −12, +22 or +51, +81 or +110]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −2 and +120 and two additional tones for 106-tone DRU 2 may be −120 and +2.

As an example, the pilot tone of 106-tone DRU 1 may be [−110, −51, +12, +71] and the pilot tone of 106-tone DRU 2 may be [−71, −12, +51, +110].

Through this, a 106-tone DRU may be configured with evenly distributed tones and sufficiently distributed tones.

Example 28-2. When a Different Shift Value is Applied to all DRUs

Based on a 26-tone DRU tone plan in the above-described Method 1-6, when the shift value of −6, −5, −2, −1, 0, +1, +2, +5, +6 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−119, +3]

Pilot tone of 26-tone DRU 2: Tone index [−109, +13]

Pilot tone of 26-tone DRU 3: Tone index [−81, +41]

Pilot tone of 26-tone DRU 4: Tone index [−71, +51]

Pilot tone of 26-tone DRU 5: Tone index [−61, +61]

Pilot tone of 26-tone DRU 6: Tone index [−51, +71]

Pilot tone of 26-tone DRU 7: Tone index [−41, +81]

Pilot tone of 26-tone DRU 8: Tone index [−13, +109]

Pilot tone of 26-tone DRU 9: Tone index [−3, +119]

In other words, for a corresponding 20 MHz DRU tone plan, all DRUs may be based on pilot tone +−[3, 13, 41, 51, 61, 71, 81, 109, 119].

In addition, the tone index of a pilot tone for each 52-tone DRU may be as follows.

Pilot tone of 52-tone DRU 1: Tone index [−119, −51, +3, +71]

Pilot tone of 52-tone DRU 2: Tone index [−109, −41, +13, +81]

Pilot tone of 52-tone DRU 3: Tone index [−81, −13, +41, +109]

Pilot tone of 52-tone DRU 4: Tone index [−71, −3, +51, +119]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[2, 120].

Pilot tone of 106-tone DRU 1: Tone index [−119 or −81, −51 or −13, +3 or +41, +71 or +109]

Pilot tone of 106-tone DRU 2: Tone index [−109 or −71, −41 or −3, +13 or +51, +81 or +119]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −2 and +120 and two additional tones for 106-tone DRU 2 may be −120 and +2.

As an example, the pilot tone of 106-tone DRU 1 may be [−119, −51, +3, +71] and the pilot tone of 106-tone DRU 2 may be [−71, −3, +51, +119].

Through this, a 106-tone DRU may be configured with evenly distributed tones and sufficiently distributed tones.

Example 28-3. When a Different Shift Value is Applied to all DRUs

Based on a 26-tone DRU tone plan in the above-described Method 1-6, when the shift value of −6, −4, −3, −1, 0, +1, +3, +4, +6 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−119, +3]
Pilot tone of 26-tone DRU 2: Tone index [−100, +22]
Pilot tone of 26-tone DRU 3: Tone index [−90, +32]
Pilot tone of 26-tone DRU 4: Tone index [−71, +51]
Pilot tone of 26-tone DRU 5: Tone index [−61, +61]
Pilot tone of 26-tone DRU 6: Tone index [−51, +71]
Pilot tone of 26-tone DRU 7: Tone index [−32, +90]
Pilot tone of 26-tone DRU 8: Tone index [−22, +100]
Pilot tone of 26-tone DRU 9: Tone index [−3, +119]

In other words, for a corresponding 20 MHz DRU tone plan, all DRUs may be based on pilot tone +−[3, 22, 32, 51, 61, 71, 90, 100, 119].

In addition, the tone index of a pilot tone for each 52-tone DRU may be as follows.

Pilot tone of 52-tone DRU 1: Tone index [−119, −51, +3, +71]
Pilot tone of 52-tone DRU 2: Tone index [−100, −32, +22, +90]
Pilot tone of 52-tone DRU 3: Tone index [−90, −22, +32, +100]
Pilot tone of 52-tone DRU 4: Tone index [−71, −3, +51, +119]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[2, 120].

Pilot tone of 106-tone DRU 1: Tone index [−119 or −90, −51 or −22, +3 or +32, +71 or +100]
Pilot tone of 106-tone DRU 2: Tone index [−100 or −71, −32 or −3, +22 or +51, +90 or +119]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −2 and +120 and two additional tones for 106-tone DRU 2 may be −120 and +2.

As an example, the pilot tone of 106-tone DRU 1 may be [−119, −51, +3, +71] and the pilot tone of 106-tone DRU 2 may be [−71, −3, +51, +119].

Through this, a 106-tone DRU may be configured with evenly distributed tones and sufficiently distributed tones.

Example 29. When a Different Shift Value is Applied to all DRUs

Based on a 26-tone DRU tone plan in the above-described Method 1-6, when the shift value of −6, −5, −3, −2, 0, +2, +3, +5, +6 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−119, +3]
Pilot tone of 26-tone DRU 2: Tone index [−109, +13]
Pilot tone of 26-tone DRU 3: Tone index [−90, +32]
Pilot tone of 26-tone DRU 4: Tone index [−80, +42]
Pilot tone of 26-tone DRU 5: Tone index [−61, +61]
Pilot tone of 26-tone DRU 6: Tone index [−42, +80]
Pilot tone of 26-tone DRU 7: Tone index [−32, +90]
Pilot tone of 26-tone DRU 8: Tone index [−13, +109]
Pilot tone of 26-tone DRU 9: Tone index [−3, +119]

In other words, for a corresponding 20 MHz DRU tone plan, all DRUs may be based on pilot tone +−[3, 13, 32, 42, 61, 80, 90, 109, 119].

In addition, the tone index of a pilot tone for each 52-tone DRU may be as follows.

Pilot tone of 52-tone DRU 1: Tone index [−119, −42, +3, +80]
Pilot tone of 52-tone DRU 2: Tone index [−109, −32, +13, +90]
Pilot tone of 52-tone DRU 3: Tone index [−90, −13, +32, +109]
Pilot tone of 52-tone DRU 4: Tone index [−80, −3, +42, +119]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[2, 120].

Pilot tone of 106-tone DRU 1: Tone index [−119 or −90, −42 or −13, +3 or +32, +80 or +109]
Pilot tone of 106-tone DRU 2: Tone index [−109 or −80, −32 or −3, +13 or +42, +90 or +119]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −2 and +120 and two additional tones for 106-tone DRU 2 may be −120 and +2.

As an example, the pilot tone of 106-tone DRU 1 may be [−119, −42, +3, +80] and the pilot tone of 106-tone DRU 2 may be [−80, −3, +42, +119].

Through this, a 106-tone DRU may be configured with evenly distributed tones and sufficiently distributed tones.

Example 30. When a Different Shift Value is Applied to all DRUs

Based on a 26-tone DRU tone plan in the above-described Method 1-6, when the shift value of −6, −5, −4, −3, 0, +3, +4, +5, +6 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−119, +3]
Pilot tone of 26-tone DRU 2: Tone index [−109, +13]
Pilot tone of 26-tone DRU 3: Tone index [−99, +23]
Pilot tone of 26-tone DRU 4: Tone index [−89, +33]
Pilot tone of 26-tone DRU 5: Tone index [−61, +61]
Pilot tone of 26-tone DRU 7: Tone index [−23, +99]
Pilot tone of 26-tone DRU 8: Tone index [−13, +109]
Pilot tone of 26-tone DRU 9: Tone index [−3, +119]

In other words, for a corresponding 20 MHz DRU tone plan, all DRUs may be based on pilot tone +−[3, 13, 23, 33, 61, 89, 99, 109, 119].

In addition, the tone index of a pilot tone for each 52-tone DRU may be as follows.

Pilot tone of 52-tone DRU 1: Tone index [−119, −33, +3, +89]

Pilot tone of 52-tone DRU 2: Tone index [−109, −23, +13, +99]

Pilot tone of 52-tone DRU 3: Tone index [−99, −13, +23, +109]

Pilot tone of 52-tone DRU 4: Tone index [−89, −3, +33, +119]

Through this, a 52-tone DRU may be configured with evenly distributed tones and sufficiently distributed tones.

In addition, the tone index of a pilot tone for each 106-tone DRU may be as follows. In this regard, two additional tones for configuring a 106-tone DRU may be two of +−[2, 120].

Pilot tone of 106-tone DRU 1: Tone index [−119 or −99, −33 or −13, +3 or +23, +89 or +109]

Pilot tone of 106-tone DRU 2: Tone index [−109 or −89, −23 or −3, +13 or +33, +99 or +119]

A 106-tone DRU may select four of eight pilot tones for two 52-tone DRUs configuring a corresponding 106-tone DRU as a pilot tone and use the remaining four as a data tone. In this regard, for power boosting gain, two additional tones for 106-tone DRU 1 may be −2 and +120 and two additional tones for 106-tone DRU 2 may be −120 and +2.

As an example, the pilot tone of 106-tone DRU 1 may be [−119, −33, +3, +89] and the pilot tone of 106-tone DRU 2 may be [−89, −3, +33, +119].

Through this, a 106-tone DRU may be configured with evenly distributed tones and sufficiently distributed tones.

Additionally or alternatively, in the above-described 26-tone DRU tone plan methods (e.g., methods 1-1 to 1-6), a pilot tone as in the following example may be considered for a 26-tone DRU, a 52-tone DRU and a 106-tone DRU. The pilot tone of a 52-tone DRU may be defined/configured based on the pilot tone of 26-tone DRUs configuring a corresponding DRU. In addition, the pilot tone of a 106-tone DRU may be defined/configured by selecting four of the pilot tones of 52-tone DRUs configuring a corresponding DRU and the remaining four pilot tones may be converted into data tones.

The following examples correspond to a method for maintaining a constant distance as much as possible between pilot tones and in this case, a pilot tone may be evenly distributed not only within all DRUs, but also between all DRUs.

Example 31-1

Based on a 26-tone DRU tone plan in the above-described Method 1-1, when the shift value of −5, +1, −4, +2, −3, +3, −2, +4, −1 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−112, +13]
Pilot tone of 26-tone DRU 2: Tone index [−56, +68]
Pilot tone of 26-tone DRU 3: Tone index [−101, +24]
Pilot tone of 26-tone DRU 4: Tone index [−45, +80]
Pilot tone of 26-tone DRU 5: Tone index [−90, +35]
Pilot tone of 26-tone DRU 6: Tone index [−34, +91]
Pilot tone of 26-tone DRU 7: Tone index [−79, +46]
Pilot tone of 26-tone DRU 8: Tone index [−23, +102]
Pilot tone of 26-tone DRU 9: Tone index [−67, +57]

Based thereon, all DRUs may be based on pilot tones described above.

Example 31-2

Based on a 26-tone DRU tone plan in the above-described Method 1-1, when the shift value of −4, +2, −3, +3, −2, +4, −1, +5, 0 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−103, +22]
Pilot tone of 26-tone DRU 2: Tone index [−47, +78]
Pilot tone of 26-tone DRU 3: Tone index [−92, +33]
Pilot tone of 26-tone DRU 4: Tone index [−36, +89]
Pilot tone of 26-tone DRU 5: Tone index [−81, +44]
Pilot tone of 26-tone DRU 6: Tone index [−25, +100]
Pilot tone of 26-tone DRU 7: Tone index [−70, +55]
Pilot tone of 26-tone DRU 8: Tone index [−14, +111]
Pilot tone of 26-tone DRU 9: Tone index [−58, +66]

Based thereon, all DRUs may be based on pilot tones described above.

Example 32-1

Based on a 26-tone DRU tone plan in the above-described Method 1-2, when the shift value of −5, +1, −4, +2, −3, +3, −2, +4, −1 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−113, +15]
Pilot tone of 26-tone DRU 2: Tone index [−58, +70]
Pilot tone of 26-tone DRU 3: Tone index [−102, +26]
Pilot tone of 26-tone DRU 4: Tone index [−47, +81]
Pilot tone of 26-tone DRU 5: Tone index [−91, +37]
Pilot tone of 26-tone DRU 6: Tone index [−36, +92]
Pilot tone of 26-tone DRU 7: Tone index [−80, +48]
Pilot tone of 26-tone DRU 8: Tone index [−25, +103]
Pilot tone of 26-tone DRU 9: Tone index [−69, +59]

Based thereon, all DRUs may be based on pilot tones described above.

Example 32-2

Based on a 26-tone DRU tone plan in the above-described Method 1-2, when the shift value of −4, +2, −3, +3, −2, +4, −1, +5, 0 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−104, +24]
Pilot tone of 26-tone DRU 2: Tone index [−49, +79]
Pilot tone of 26-tone DRU 3: Tone index [−93, +35]
Pilot tone of 26-tone DRU 4: Tone index [−38, +90]
Pilot tone of 26-tone DRU 5: Tone index [−82, +46]
Pilot tone of 26-tone DRU 6: Tone index [−27, +101]
Pilot tone of 26-tone DRU 7: Tone index [−71, +57]
Pilot tone of 26-tone DRU 8: Tone index [−16, +112]
Pilot tone of 26-tone DRU 9: Tone index [−60, +68]

Based thereon, all DRUs may be based on pilot tones described above.

Example 33-1

Based on a 26-tone DRU tone plan in the above-described Method 1-3, when the shift value of −5, +1, −4, +2, −3, +3, −2, +4, −1 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−112, +14]
Pilot tone of 26-tone DRU 2: Tone index [−57, +69]
Pilot tone of 26-tone DRU 3: Tone index [−101, +25]
Pilot tone of 26-tone DRU 4: Tone index [−46, +80]
Pilot tone of 26-tone DRU 5: Tone index [−90, +36]
Pilot tone of 26-tone DRU 6: Tone index [−35, +91]
Pilot tone of 26-tone DRU 7: Tone index [−79, +47]
Pilot tone of 26-tone DRU 8: Tone index [−24, +102]
Pilot tone of 26-tone DRU 9: Tone index [−68, +58]

Based thereon, all DRUs may be based on pilot tones described above.

Example 33-2

Based on a 26-tone DRU tone plan in the above-described Method 1-3, when the shift value of −4, +2, −3, +3, −2, +4, −1, +5, 0 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−103, +23]
Pilot tone of 26-tone DRU 2: Tone index [−48, +78]
Pilot tone of 26-tone DRU 3: Tone index [−92, +34]
Pilot tone of 26-tone DRU 4: Tone index [−37, +89]
Pilot tone of 26-tone DRU 5: Tone index [−81, +45]
Pilot tone of 26-tone DRU 6: Tone index [−26, +100]
Pilot tone of 26-tone DRU 7: Tone index [−70, +56]
Pilot tone of 26-tone DRU 8: Tone index [−16, +111]
Pilot tone of 26-tone DRU 9: Tone index [−59, +67]

Based thereon, all DRUs may be based on pilot tones described above.

Example 34-1

Based on a 26-tone DRU tone plan in the above-described Method 1-4, when the shift value of −5, +1, −4, +2, −3, +3, −2, +4, −1 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−111, +13]
Pilot tone of 26-tone DRU 2: Tone index [−56, +68]
Pilot tone of 26-tone DRU 3: Tone index [−100, +24]
Pilot tone of 26-tone DRU 4: Tone index [−45, +79]
Pilot tone of 26-tone DRU 5: Tone index [−89, +35]
Pilot tone of 26-tone DRU 6: Tone index [−34, +90]
Pilot tone of 26-tone DRU 7: Tone index [−78, +46]
Pilot tone of 26-tone DRU 8: Tone index [−23, +101]
Pilot tone of 26-tone DRU 9: Tone index [−67, +57]

Based thereon, all DRUs may be based on pilot tones described above.

Example 34-2

Based on a 26-tone DRU tone plan in the above-described Method 1-4, when the shift value of −4, +2, −3, +3, −2, +4, −1, +5, 0 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−102, +22]
Pilot tone of 26-tone DRU 2: Tone index [−47, +77]
Pilot tone of 26-tone DRU 3: Tone index [−91, +33]
Pilot tone of 26-tone DRU 4: Tone index [−36, +88]
Pilot tone of 26-tone DRU 5: Tone index [−80, +44]
Pilot tone of 26-tone DRU 6: Tone index [−25, +99]
Pilot tone of 26-tone DRU 7: Tone index [−69, +55]
Pilot tone of 26-tone DRU 8: Tone index [−14, +110]
Pilot tone of 26-tone DRU 9: Tone index [−58, +66]

Based thereon, all DRUs may be based on pilot tones described above.

Example 35-1

Based on a 26-tone DRU tone plan in the above-described Method 1-5, when the shift value of −5, +1, −4, +2, −3, +3, −2, +4, −1 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−109, +11]
Pilot tone of 26-tone DRU 2: Tone index [−54, +66]
Pilot tone of 26-tone DRU 3: Tone index [−98, +22]
Pilot tone of 26-tone DRU 4: Tone index [−43, +77]
Pilot tone of 26-tone DRU 5: Tone index [−87, +33]
Pilot tone of 26-tone DRU 6: Tone index [−32, +88]
Pilot tone of 26-tone DRU 7: Tone index [−76, +44]
Pilot tone of 26-tone DRU 8: Tone index [−21, +99]
Pilot tone of 26-tone DRU 9: Tone index [−65, +55]

Based thereon, all DRUs may be based on pilot tones described above.

Example 35-2

Based on a 26-tone DRU tone plan in the above-described Method 1-5, when the shift value of −4, +2, −3, +3, −2, +4, −1, +5, 0 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−100, +20]
Pilot tone of 26-tone DRU 2: Tone index [−45, +75]
Pilot tone of 26-tone DRU 3: Tone index [−89, +31]
Pilot tone of 26-tone DRU 4: Tone index [−34, +86]
Pilot tone of 26-tone DRU 5: Tone index [−78, +42]
Pilot tone of 26-tone DRU 6: Tone index [−23, +97]
Pilot tone of 26-tone DRU 7: Tone index [−67, +53]
Pilot tone of 26-tone DRU 8: Tone index [−12, +108]
Pilot tone of 26-tone DRU 9: Tone index [−56, +64]

Based thereon, all DRUs may be based on pilot tones described above.

Example 36-1

Based on a 26-tone DRU tone plan in the above-described Method 1-6, when the shift value of −5, +1, −4, +2, −3, +3, −2, +4, −1 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−110, +12]
Pilot tone of 26-tone DRU 2: Tone index [−55, +67]
Pilot tone of 26-tone DRU 3: Tone index [−99, +23]
Pilot tone of 26-tone DRU 4: Tone index [−44, +78]
Pilot tone of 26-tone DRU 5: Tone index [−88, +34]
Pilot tone of 26-tone DRU 7: Tone index [−77, +45]
Pilot tone of 26-tone DRU 8: Tone index [−22, +100]
Pilot tone of 26-tone DRU 9: Tone index [−66, +56]

Based thereon, all DRUs may be based on pilot tones described above.

Example 36-2

Based on a 26-tone DRU tone plan in the above-described Method 1-6, when the shift value of −4, +2, −3, +3, −2, +4, −1, +5, 0 is applied to the pilot tone of 26-tone DRU 1 to 26-tone DRU 9, respectively, the tone index of a pilot tone for each 26-tone DRU may be as follows.

Pilot tone of 26-tone DRU 1: Tone index [−101, +21]

Pilot tone of 26-tone DRU 2: Tone index [−46, +76]

Pilot tone of 26-tone DRU 3: Tone index [−90, +32]

Pilot tone of 26-tone DRU 4: Tone index [−35, +87]

Pilot tone of 26-tone DRU 5: Tone index [−79, +43]

Pilot tone of 26-tone DRU 6: Tone index [−24, +98]

Pilot tone of 26-tone DRU 7: Tone index [−68, +54]

Pilot tone of 26-tone DRU 8: Tone index [−13, +109]

Pilot tone of 26-tone DRU 9: Tone index [−57, +65]

Based thereon, all DRUs may be based on pilot tones described above.

In addition, regarding the above-described examples 31 to 36, a 52-tone DRU may be configured as a combination of 26-tone DRUs as follows. A corresponding combination configuration may be applied to other examples of the present disclosure.

52-tone DRU 1: A combination of 26-tone DRU 1 and 26-tone DRU 5

52-tone DRU 2: A combination of 26-tone DRU 2 and 26-tone DRU 6

52-tone DRU 3: A combination of 26-tone DRU 3 and 26-tone DRU 7

52-tone DRU 4: A combination of 26-tone DRU 4 and 26-tone DRU 8

In addition, a 106-tone DRU may be defined as a combination of two 52-tone DRUs and null tones as described in the above-described method (e.g., Embodiment 1-3), but may additionally or alternatively be configured as a combination of other null tones. For the pilot tone of a 106-tone DRU, four of the eight pilot tones of two 52-tone DRUs used for the configuration of a corresponding DRU may be selected and the remaining four may be converted into data tones. In this case, a method for selecting one of the two pilot tones that are relatively close as a pilot tone and converting the other one into a data tone may be applied.

In addition, a tone plan and a pilot tone based on various shift methods/values other than examples described above may be configured/defined.

Embodiment 1-7

This embodiment relates to the tone index of each DRU when a DRU is applied within each 20 MHz in a bandwidth exceeding 40 MHz (e.g., a bandwidth of 80 MHz or more).

In examples below, a set of tone indexes included in each of the at least one DRU for a channel of x MHz among the bandwidth of y MHz may be represented as S_x_y.

In addition, regarding examples below, a separate tone shift value may be additionally applied by considering performance improvement, the tone plan/arrangement of the existing 242-tone RRU, etc.

First, a tone index (S_20_40) at the specific 20 MHz of a 40 MHz bandwidth may be defined as follows.

Tone index (1st S_20_40) of the first 20 MHz within a 40 MHz bandwidth: DRU tone index defined at 20 MHz described above −128

Tone index (2nd S_20_40) of the second 20 MHz within a 40 MHz bandwidth: DRU tone index defined at 20 MHz described above +128

For example, it may also be expressed as follows.

1st S_20_40=S_20_20-128; and

2nd S_20_40=S_20_20+128.

Next, a tone index (S_20_80) at the specific 20 MHz of a 80 MHz bandwidth may be defined as follows.

Tone index (1st S_20_80 and 2nd S_20_80) of each 20 MHz within the first 40 MHz: DRU tone index (1st S_20_40 and 2nd S_20_40) of each 20 MHz defined at 40 MHz described above −256

Tone index (3rd S_20_80 and 4th S_20_80) of each 20 MHz within the second 40 MHz: DRU tone index (1st S_20_40 and 2nd S_20_40) of each 20 MHz defined at 40 MHz described above +256

For example, it may also be expressed as follows.

1st S_20_80=1st S_20_40-256;

2nd S_20_80=2nd S_20_40-256;

3rd S_20_80=1st S_20_40+256; and

4th S_20_80=2nd S_20_40+256.

Next, a tone index (S_20_160) at the specific 20 MHz of a 160 MHz bandwidth may be defined as follows.

Tone index (1st S_20_160 to 4th S_20_160) of each 20 MHz within the first 80 MHz: DRU tone index (1st S_20_80 to 4th S_20_80) of each 20 MHz defined at 80 MHz described above −512

Tone index (5th S_20_160 to 8th S_20_160) of each 20 MHz within the second 80 MHz: DRU tone index (1st S_20_80 to 4th S_20_80) of each 20 MHz defined at 80 MHz described above +512

For example, it may also be expressed as follows.

1st S_20_160=1st S_20_80-512;

2nd S_20_160=2nd S_20_80-512;

3rd S_20_160=3rd S_20_80-512;

4th S_20_160=4th S_20_80-512;

5th S_20_160=1st S_20_80+512;

6th S_20_160=2nd S_20_80+512;

7th S_20_160=3rd S_20_80+512; and

8th S_20_160=4th S_20_80+512.

Next, a tone index (S_20_240) at the specific 20 MHz of a 240 MHz bandwidth may be defined as follows.

Tone index (1st S_20_240 to 4th S_20_240) of each 20 MHz within the first 80 MHz: DRU tone index (1st S_20_80 to 4th S_20_80) of each 20 MHz defined at 80 MHz described above −1024

Tone index (5th S_20_240 to 8th S_20_240) of each 20 MHz within the second 80 MHz: DRU tone index (1st S_20_80 to 4th S_20_80) of each 20 MHz defined at 80 MHz described above Tone index (9th S_20_240 to 12th S_20_240) of each 20 MHz within the third 80 MHz: DRU tone index (1st S_20_80 to 4th S_20_80) of each 20 MHz defined at 80 MHz described above +1024

For example, it may also be expressed as follows.

1st S_20_240=1st S_20_80-1024;

2nd S_20_240=2nd S_20_80-1024;

3rd S_20_240=3rd S_20_80-1024;

4th S_20_240=4th S_20_80-1024;

5th S_20_240=1st S_20_80;

6th S_20_240=2nd S_20_80;

7th S_20_240=3rd S_20_80;

8th S_20_240=4th S_20_80;

9th S_20_240=1st S_20_80+1024;

10th S_20_240=2nd S_20_80+1024;

11th S_20_240=3rd S_20_80+1024; and

12th S_20_240=4th S_20_80+1024.

Next, a tone index (S_20_320) at the specific 20 MHz of a 320 MHz bandwidth may be defined as follows.

Tone index (1st S_20_320 to 8th S_20_320) of each 20 MHz within the first 160 MHz: DRU tone index (1st S_20_160 to 8th S_20_160) of each 20 MHz defined at 160 MHz described above −1024

Tone index (9th S_20_320 to 16th S_20_320) of each 20 MHz within the second 160 MHz: DRU tone index (1st S_20_160 to 8th S_20_160) of each 20 MHz defined at 160 MHz described above +1024

For example, it may also be expressed as follows.

1st S_20_320=1st S_20_160-1024;
2nd S_20_320=2nd S_20_160-1024;
3rd S_20_320=3rd S_20_160-1024;
4th S_20_320=4th S_20_160-1024;
5th S_20_320=5th S_20_160-1024;
6th S_20_320=6th S_20_160-1024;
7th S_20_320=7th S_20_160-1024;
8th S_20_320=8th S_20_160-1024;
9th S_20_320=1st S_20_160+1024;
10th S_20_320=2nd S_20_160+1024;
11th S_20_320=3rd S_20_160+1024;
12th S_20_320=4th S_20_160+1024;
13th S_20_320=5th S_20_160+1024;
14th S_20_320=6th S_20_160+1024;
15th S_20_320=7th S_20_160+1024; and
16th S_20_320=8th S_20_160+1024.

Next, a tone index (S_20_480) at the specific 20 MHz of a 480 MHz bandwidth may be defined as follows.

- Tone index (1st S_20_480 to 8th S_20_480) of each 20 MHz within the first 160 MHz: DRU tone index (1st S_20_160 to 8th S_20_160) of each 20 MHz defined at 160 MHz described above −2048
- Tone index (9th S_20_480 to 16th S_20_480) of each 20 MHz within the second 160 MHz: DRU tone index (1st S_20_160 to 8th S_20_160) of each 20 MHz defined at 160 MHz described above
- Tone index (17th S_20_480 to 24th S_20_480) of each 20 MHz within the third 160 MHz: DRU tone index (1st S_20_160 to 8th S_20_160) of each 20 MHz defined at 160 MHz described above +2048

For example, it may also be expressed as follows.

1st S_20_480=1st S_20_160-2048;
2nd S_20_480=2nd S_20_160-2048;
3rd S_20_480=3rd S_20_160-2048;
4th S_20_480=4th S_20_160-2048;
5th S_20_480=5th S_20_160-2048;
6th S_20_480=6th S_20_160-2048;
7th S_20_480=7th S_20_160-2048;
8th S_20_480=8th S_20_160-2048;
9th S_20_480=1st S_20_160;
10th S_20_480=2nd S_20_160;
11th S_20_480=3rd S_20_160;
12th S_20_480=4th S_20_160;
13th S_20_480=5th S_20_160;
14th S_20_480=6th S_20_160;
15th S_20_480=7th S_20_160;
16th S_20_480=8th S_20_160;
17th S_20_480=1st S_20_160+2048;
18th S_20_480=2nd S_20_160+2048;
19th S_20_480=3rd S_20_160+2048;
20th S_20_480=4th S_20_160+2048;
21th S_20_480=5th S_20_160+2048;
22th S_20_480=6th S_20_160+2048;
23th S_20_480=7th S_20_160+2048; and
24th S_20_480=8th S_20_160+2048.

Next, a tone index (S_20_640) at the specific 20 MHz of a 640 MHz bandwidth may be defined as follows.

- Tone index (1st S_20_640 to 16th S_20_320) of each 20 MHz within the first 320 MHz: DRU tone index (1st S_20_320 to 16th S_20_320) of each 20 MHz defined at 320 MHz described above −2048

Tone index (17th S_20_640 to 32th S_20_640) of each 20 MHz within the second 320 MHz: DRU tone index (1st S_20_320 to 16th S_20_320) of each 20 MHz defined at 320 MHz described above +2048

For example, it may also be expressed as follows.

1st S_20_640=1st S_20_320-2048;
2nd S_20_640=2nd S_20_320-2048;
3rd S_20_640=3rd S_20_320-2048;
4th S_20_640=4th S_20_320-2048;
5th S_20_640=5th S_20_320-2048;
6th S_20_640=6th S_20_320-2048;
7th S_20_640=7th S_20_320-2048;
8th S_20_640=8th S_20_320-2048;
9th S_20_640=9th S_20_320-2048;
10th S_20_640=10th S_20_320-2048;
11th S_20_640=11th S_20_320-2048;
12th S_20_640=12th S_20_320-2048;
13th S_20_640=13th S_20_320-2048;
14th S_20_640=14th S_20_320-2048;
15th S_20_640=15th S_20_320-2048;
16th S_20_640=16th S_20_320-2048;
17th S_20_640=1st S_20_320+2048;
18th S_20_640=2nd S_20_320+2048;
19th S_20_640=3rd S_20_320+2048;
20th S_20_640=4th S_20_320+2048;
21th S_20_640=5th S_20_320+2048;
22th S_20_640=6th S_20_320+2048;
23th S_20_640=7th S_20_320+2048;
24th S_20_640=8th S_20_320+2048;
25th S_20_640=9th S_20_320+2048;
26th S_20_640=10th S_20_320+2048;
27th S_20_640=11th S_20_320+2048;
28th S_20_640=12th S_20_320+2048;
29th S_20_640=13th S_20_320+2048;
30th S_20_640=14th S_20_320+2048;
31th S_20_640=15th S_20_320+2048; and
32th S_20_640=16th S_20_320+2048.

Embodiment 2

This embodiment relates to a method for defining a tone plan for a 26-tone DRU, a 52-tone DRU, a 106-tone DRU and a 242-tone DRU regarding a DRU tone plan in a bandwidth/a channel of 40 MHz or more.

In the present disclosure, a DRU tone plan within each 40 MHz is proposed in a bandwidth/channel situation of 40 MHz or more and basically, it is described on the premise that the same number of DRUs in the same size as each existing 40 MHz RRU tone plan in a bandwidth/a channel of 40 MHz or more is defined (but, a 484-tone DRU is excluded). In the description of the following methods, the same number of guard tones and/or DC tones at the same position as before may be based on a 40 MHz tone plan in FIG. 9 described above.

In addition, it is required to define a null tone, and a part of a corresponding null tone may be converted into a data tone when configuring a 106-tone DRU and the remaining null tone may be converted into a data tone when configuring a 242-tone DRU. Hereinafter, for convenience of a description, a null tone converted into a data tone when configuring a 106-tone DRU is named null tone type 1 and a null tone converted into a data tone when configuring a 242-tone DRU is named null tone type 2.

In this regard, the present disclosure proposes a DRU tone plan by considering the following four null tone groups (/methods). Each null tone group may include tones of null tone type 1 and tones of null tone type 2. When new null tone groups excluding conventional null tone groups (e.g., based on a tone plan in FIG. 9) are used, the maximum power boosting gain may be obtained from all DRUs.

Conventional Null Tone Group

Null tone type 1: Tone index [−191, −190, −57, −56, 56, 57, 190, 191]

Null tone type 2: Tone index [−244, −137, −110, −3, 3, 110, 137, 244]

Proposed Null Tone Group 1

Null tone type 1: Tone index [−10, −9, −8, −7, 7, 8, 9, 10]

Null tone type 2: Tone index [−6, −5, −4, −3, 3, 4, 5, 6]

Proposed Null Tone Group 2

Null tone type 1: Tone index [−244, −243, −242, −241, 241, 242, 243, 244]

Null tone type 2: Tone index [−6, −5, −4, −3, 3, 4, 5, 6]

Proposed Null Tone Group 3

Null tone type 1: Tone index [−240, −239, −238, −237, 237, 238, 239, 240]

Null tone type 2: Tone index [−244, −243, −242, −241, 241, 242, 243, 244]

In the above-described null tone group (particularly, in proposed null tone group 1, proposed null tone group 2, proposed null tone group 3), null tone type 1 and null tone type 2 may be used interchangeably. However, since interference effects of an adjacent channel and a DC offset may be more easily overcome in a 242-tone DRU than in a 106-tone DRU, proposed null tone type 1 and null tone type 2 may be considered as described above. In other words, null tone type 1 allocated to a 106-tone DRU may be configured at a position farther from a 20 MHz boundary or farther from DC than null tone type 2 allocated to a 242-tone DRU. In particular, since a DC offset may be a more influential factor in terms of performance in proposed null tone group 2, null tone type 2 may be configured as a tone around DC, not a 20 MHz boundary. In other words, null tone type 2 allocated to a 242-tone DRU may be configured for a tone around more influential DC and null tone type 1 allocated to a 106-tone DRU may be configured for a tone around a less influential 20 MHz boundary.

Embodiment 2-1

This embodiment relates to a variety of methods for defining a tone plan for a 26-tone DRU for a bandwidth/a channel of 40 MHz or more. Regarding a DRU tone plan for a bandwidth/a channel of 40 MHz or more, at least one of the methods described below may be applied.

A 26-tone DRU tone plan may be defined by considering the remaining available tones (e.g., available tones) excluding a guard tone, a DC tone and a null tone and may be defined as follows based on a null tone group used. Starting from the lowest available tone, each tone may be allocated to each of the 18 26-tone DRUs.

(Method 2-1)

A specific tone plan for 18 26-tone DRUs based on the conventional null tone group may be as follows.

26-tone DRU 1: Tone index [−243, −225, −207, −187, −169, −151, −132, −114, −95, −77, −59, −39, −21, 4, 22, 40, 60, 78, 96, 115, 133, 152, 170, 188, 208, 226]

26-tone DRU 2: Tone index [−242, −224, −206, −186, −168, −150, −131, −113, −94, −76, −58, −38, −20, 5, 23, 41, 61, 79, 97, 116, 134, 153, 171, 189, 209, 227]

26-tone DRU 3: Tone index [−241, −223, −205, −185, −167, −149, −130, −112, −93, −75, −55, −37, −19, 6, 24, 42, 62, 80, 98, 117, 135, 154, 172, 192, 210, 228]

26-tone DRU 4: Tone index [−240, −222, −204, −184, −166, −148, −129, −111, −92, −74, −54, −36, −18, 7, 25, 43, 63, 81, 99, 118, 136, 155, 173, 193, 211, 229]

26-tone DRU 5: Tone index [−239, −221, −203, −183, −165, −147, −128, −109, −91, −73, −53, −35, −17, 8, 26, 44, 64, 82, 100, 119, 138, 156, 174, 194, 212, 230]

26-tone DRU 6: Tone index [−238, −220, −202, −182, −164, −146, −127, −108, −90, −72, −52, −34, −16, 9, 27, 45, 65, 83, 101, 120, 139, 157, 175, 195, 213, 231]

26-tone DRU 7: Tone index [−237, −219, −201, −181, −163, −145, −126, −107, −89, −71, −51, −33, −15, 10, 28, 46, 66, 84, 102, 121, 140, 158, 176, 196, 214, 232]

26-tone DRU 8: Tone index [−236, −218, −200, −180, −162, −144, −125, −106, −88, −70, −50, −32, −14, 11, 29, 47, 67, 85, 103, 122, 141, 159, 177, 197, 215, 233]

26-tone DRU 9: Tone index [−235, −217, −199, −179, −161, −143, −124, −105, −87, −69, −49, −31, −13, 12, 30, 48, 68, 86, 104, 123, 142, 160, 178, 198, 216, 234]

26-tone DRU 10: Tone index [−234, −216, −198, −178, −160, −142, −123, −104, −86, −68, −48, −30, −12, 13, 31, 49, 69, 87, 105, 124, 143, 161, 179, 199, 217, 235]

26-tone DRU 11: Tone index [−233, −215, −197, −177, −159, −141, −122, −103, −85, −67, −47, −29, −11, 14, 32, 50, 70, 88, 106, 125, 144, 162, 180, 200, 218, 236]

26-tone DRU 12: Tone index [−232, −214, −196, −176, −158, −140, −121, −102, −84, −66, −46, −28, −10, 15, 33, 51, 71, 89, 107, 126, 145, 163, 181, 201, 219, 237]

26-tone DRU 13: Tone index [−231, −213, −195, −175, −157, −139, −120, −101, −83, −65, −45, −27, −9, 16, 34, 52, 72, 90, 108, 127, 146, 164, 182, 202, 220, 238]

26-tone DRU 14: Tone index [−230, −212, −194, −174, −156, −138, −119, −100, −82, −64, −44, −26, −8, 17, 35, 53, 73, 91, 109, 128, 147, 165, 183, 203, 221, 239]

26-tone DRU 15: Tone index [−229, −211, −193, −173, −155, −136, −118, −99, −81, −63, −43, −25, −7, 18, 36, 54, 74, 92, 111, 129, 148, 166, 184, 204, 222, 240]

26-tone DRU 16: Tone index [−228, −210, −192, −172, −154, −135, −117, −98, −80, −62, −42, −24, −6, 19, 37, 55, 75, 93, 112, 130, 149, 167, 185, 205, 223, 241]

26-tone DRU 17: Tone index [−227, −209, −189, −171, −153, −134, −116, −97, −79, −61, −41, −23, −5, 20, 38, 58, 76, 94, 113, 131, 150, 168, 186, 206, 224, 242]

26-tone DRU 18: Tone index [−226, −208, −188, −170, −152, −133, −115, −96, −78, −60, −40, −22, −4, 21, 39, 59, 77, 95, 114, 132, 151, 169, 187, 207, 225, 243]

(Method 2-2)

A specific tone plan for 18 26-tone DRUs based on proposed null tone group 1 may be as follows.

26-tone DRU 1: Tone index [−244:18:−28, 11:18:227]

26-tone DRU 2: Tone index [−243:18:−27, 12:18:228]

26-tone DRU 3: Tone index [−242:18:−26, 13:18:229]

26-tone DRU 4: Tone index [−241:18:−25, 14:18:230]

26-tone DRU 5: Tone index [−240:18:−24, 15:18:231]

26-tone DRU 6: Tone index [−239:18:−23, 16:18:232]

26-tone DRU 7: Tone index [−238:18:−22, 17:18:233]

26-tone DRU 8: Tone index [−237:18:−21, 18:18:234]

26-tone DRU 9: Tone index [−236:18:−20, 19:18:235]

26-tone DRU 10: Tone index [−235:18:−19, 20:18:236]

26-tone DRU 11: Tone index [−234:18:−18, 21:18:237]

26-tone DRU 12: Tone index [−233:18:−17, 22:18:238]

26-tone DRU 13: Tone index [−232:18:−16, 23:18:239]

26-tone DRU 14: Tone Index [−231:18:−15, 24:18:240]

26-tone DRU 15: Tone Index [−230:18:−14, 25:18:241]

26-tone DRU 16: Tone Index [−229:18:−13, 26:18:242]

26-tone DRU 17: Tone Index [−228:18:−12, 27:18:243]

26-tone DRU 18: Tone Index [−227:18:−11, 28:18:244]

(Method 2-3)

A specific tone plan for 18 26-tone DRUs based on proposed null tone group 2 may be as follows.

26-tone DRU 1: Tone index [−240:18:−24, 07:18:223]

26-tone DRU 2: Tone index [−239:18:−23, 08:18:224]

26-tone DRU 3: Tone index [−238:18:−22, 09:18:225]

26-tone DRU 4: Tone index [−237:18:−21, 10:18:226]
26-tone DRU 5: Tone index [−236:18:−20, 11:18:227]
26-tone DRU 6: Tone index [−235:18:−19, 12:18:228]
26-tone DRU 7: Tone index [−234:18:−18, 13:18:229]
26-tone DRU 8: Tone index [−233:18:−17, 14:18:230]
26-tone DRU 9: Tone index [−232:18:−16, 15:18:231]
26-tone DRU 10: Tone index [−231:18:−15, 16:18:232]
26-tone DRU 11: Tone index [−230:18:−14, 17:18:233]
26-tone DRU 12: Tone index [−229:18:−13, 18:18:234]
26-tone DRU 13: Tone index [−228:18:−12, 19:18:235]
26-tone DRU 14: Tone index [−227:18:−11, 20:18:236]
26-tone DRU 15: Tone index [−226:18:−10, 21:18:237]
26-tone DRU 16: Tone index [−225:18:−9, 22:18:238]
26-tone DRU 17: Tone index [−224:18:−8, 23:18:239]
26-tone DRU 18: Tone Index [−223:18:−7, 24:18:240]

(Method 2-4)

A specific tone plan for 18 26-tone DRUs based on proposed null tone group 3 may be as follows.

26-tone DRU 1: Tone index [−236:18:−20, 03:18:219]
26-tone DRU 2: Tone index [−235:18:−19, 04:18:220]
26-tone DRU 3: Tone index [−234:18:−18, 05:18:221]
26-tone DRU 4: Tone index [−233:18:−17, 06:18:222]
26-tone DRU 5: Tone index [−232:18:−16, 07:18:223]
26-tone DRU 6: Tone index [−231:18:−15, 08:18:224]
26-tone DRU 7: Tone index [−230:18:−14, 09:18:225]
26-tone DRU 8: Tone index [−229:18:−13, 10:18:226]
26-tone DRU 9: Tone index [−228:18:−12, 11:18:227]
26-tone DRU 10: Tone index [−227:18:−11, 12:18:228]
26-tone DRU 11: Tone index [−226:18:−10, 13:18:229]
26-tone DRU 12: Tone index [−225:18:−9, 14:18:230]
26-tone DRU 13: Tone index [−224:18:−8, 15:18:231]
26-tone DRU 14: Tone index [−223:18:−7, 16:18:232]
26-tone DRU 15: Tone index [−222:18:−6, 17:18:233]
26-tone DRU 16: Tone index [−221:18:−5, 18:18:234]
26-tone DRU 17: Tone index [−220:18:−4, 19:18:235]
26-tone DRU 18: Tone index [−219:18:−3, 20:18:236]

Embodiment 2-2

This embodiment relates to a method for defining a tone plan for a 52-tone DRU for a bandwidth/a channel of 40 MHz or more.

A 52-tone DRU may be configured as a combination of two 26-tone DRUs (e.g., refer to Embodiment 2-1), and may be defined as follows to maximize the power boosting gain by distributing a tone as much as possible.

52-tone DRU 1: A combination of 26-tone DRU 1 and 26-tone DRU 10
52-tone DRU 2: A combination of 26-tone DRU 2 and 26-tone DRU 11
52-tone DRU 3: A combination of 26-tone DRU 3 and 26-tone DRU 12
52-tone DRU 4: A combination of 26-tone DRU 4 and 26-tone DRU 13
52-tone DRU 5: A combination of 26-tone DRU 6 and 26-tone DRU 15
52-tone DRU 6: A combination of 26-tone DRU 7 and 26-tone DRU 16
52-tone DRU 7: A combination of 26-tone DRU 8 and 26-tone DRU 17
52-tone DRU 8: A combination of 26-tone DRU 9 and 26-tone DRU 18

Embodiment 2-3

This embodiment relates to a method for defining a tone plan for a 106-tone DRU for a bandwidth/a channel of 40 MHz or more. A 106-tone DRU may be configured by combining two 52-tone DRUs and two of the null tones of null tone type 1. A 106-tone DRU tone plan may be defined as follows to maximize the power boosting gain based on a null tone group used.

(Method 2-A)

A specific tone plan for 4 106-tone DRUs based on the conventional null tone group may be as follows.

106-tone DRU 1: A combination of 52-tone DRU 1, 52-tone DRU 5, and tone index [−191, 56] or [−56, 191] or [−57, 190] or [−190, 57]]
106-tone DRU 2: A combination of 52-tone DRU 2, 52-tone DRU 6, and tone index [−190, 57] or [−191, 56] or [−56, 191] or [−57, 190]
106-tone DRU 3: A combination of 52-tone DRU 3, 52-tone DRU 7, and tone index [−57, 190] or [−190, 57] or [−191, 56] or [−56, 191]
106-tone DRU 4: A combination of 52-tone DRU 4, 52-tone DRU 8, and tone index [−56, 191] or [−57, 190] or [−190, 57] or [−191, 56]

(Method 2-B)

A specific tone plan for 4 106-tone DRUs based on proposed null tone group 1 may be as follows.

106-tone DRU 1: A combination of 52-tone DRU 1, 52-tone DRU 5 and tone index [−10, 7]
106-tone DRU 2: A combination of 52-tone DRU 2, 52-tone DRU 6 and tone index [−9, 8]
106-tone DRU 3: A combination of 52-tone DRU 3, 52-tone DRU 7 and tone index [−8, 9]
106-tone DRU 4: A combination of 52-tone DRU 4, 52-tone DRU 8 and tone index [−7, 10]

(Method 2-C)

A specific tone plan for 4 106-tone DRUs based on proposed null tone group 2 may be as follows.

106-tone DRU 1: A combination of 52-tone DRU 1, 52-tone DRU 5 and tone index [−244, 241]
106-tone DRU 2: A combination of 52-tone DRU 2, 52-tone DRU 6 and tone index [−243, 242]
106-tone DRU 3: A combination of 52-tone DRU 3, 52-tone DRU 7 and tone index [−242, 243]
106-tone DRU 4: A combination of 52-tone DRU 4, 52-tone DRU 8 and tone index [−241, 244]

(Method 2-D)

A specific tone plan for 4 106-tone DRUs based on proposed null tone group 3 may be as follows.

106-tone DRU 1: A combination of 52-tone DRU 1, 52-tone DRU 5 and tone index [−240, 237]
106-tone DRU 2: A combination of 52-tone DRU 2, 52-tone DRU 6 and tone index [−239, 238]
106-tone DRU 3: A combination of 52-tone DRU 3, 52-tone DRU 7 and tone index [−238, 239]
106-tone DRU 4: A combination of 52-tone DRU 4, 52-tone DRU 8 and tone index [−237, 240]

Embodiment 2-4

This embodiment relates to a method for defining a tone plan for a 242-tone DRU for a bandwidth/a channel of 40 MHz or more. A 242-tone DRU may be configured by combining two 106-tone DRUs, one 26-tone DRU (e.g., one of 26-tone DRU 5 and 26-tone DRU 14 that are not used for a DRU configuration), and four of the null tones of null tone type 2. A 242-tone DRU tone plan may be defined as follows to maximize the power boosting gain based on a null tone group used.

(Method 2-E)

A specific tone plan for 2 242-tone DRUs based on the conventional null tone group may be as follows.

242-tone DRU 1: A combination of 106-tone DRU 1, 106-tone DRU 3, 26-tone DRU 5 (or 26-tone DRU 14), and tone index [−137, −3, 110, 244] or [−244, −110, 3, 137]

242-tone DRU 2: A combination of 106-tone DRU 2, 106-tone DRU 4, 26-tone DRU 14 (or 26-tone DRU 5), and tone index [−244, −110, 3, 137] or [−137, −3, 110, 244]

(Method 2-F)

A specific tone plan for 2 242-tone DRUs based on proposed null tone group 1 may be as follows.

242-tone DRU 1: A combination of 106-tone DRU 1, 106-tone DRU 3, 26-tone DRU 5 (or 26-tone DRU 14), and tone index [−6, −4, 3, 5]

242-tone DRU 2: A combination of 106-tone DRU 2, 106-tone DRU 4, 26-tone DRU 14 (or 26-tone DRU 5), and tone index [−5, −3, 4, 6]

(Method 2-G)

A specific tone plan for 2 242-tone DRUs based on proposed null tone group 2 may be as follows.

242-tone DRU 1: A combination of 106-tone DRU 1, 106-tone DRU 3, 26-tone DRU 5 (or 26-tone DRU 14), and tone index [−6, −4, 3, 5]

242-tone DRU 2: A combination of 106-tone DRU 2, 106-tone DRU 4, 26-tone DRU 14 (or 26-tone DRU 5), and tone index [−5, −3, 4, 6]

(Method 2-H)

A specific tone plan for 2 242-tone DRUs based on proposed null tone group 3 may be as follows.

242-tone DRU 1: A combination of 106-tone DRU 1, 106-tone DRU 3, 26-tone DRU 5 (or 26-tone DRU 14), and tone index [−244, −242, 241, 243]

242-tone DRU 2: A combination of 106-tone DRU 2, 106-tone DRU 4, 26-tone DRU 14 (or 26-tone DRU 5), and tone index [−243, −241, 242, 244]

Embodiment 2-5

Instead of pre-defining a 52-tone DRU in the above-described Embodiment 2-22 as including tones of two 26-tone DRUs in a fixed combination, various 52-tone DRUs may be generated by combining tones of two 26-tone DRUs in any combination. Here, a 26-tone DRU may be defined in Embodiment 2-1 or may be defined in another way.

Additionally or alternatively, instead of pre-defining a 106-tone DRU in the above-described Embodiment 2-3 as including tones of two 52-tone DRUs in a fixed combination (or four 26-tone DRUs in a fixed combination), various 106-tone DRUs may be generated by combining tones of two 52-tone DRUs in any combination (or four 26-tone DRUs in any combination). Here, a 26-tone DRU/a 52-tone DRU may be defined in Embodiment 2-1/2-2 or may be defined in another way. Furthermore, two null tone combinations additionally included in a 106-tone DRU may be defined as described in Embodiment 2-3.

Additionally or alternatively, instead of pre-defining a 242-tone DRU in the above-described Embodiment 2-4 as including tones of two 106-tone DRUs and one 26-tone DRU in a fixed combination (or four 52-tone DRUs and one 26-tone DRU in a fixed combination or nine 26-tone DRUs in a fixed combination), various 242-tone DRUs may be generated by combining tones of two 106-tone DRUs and one 26-tone DRU in any combination (or four 52-tone DRUs and one 26-tone DRU in any combination or nine 26-tone DRUs in any combination). Here, a 26-tone DRU/a 52-tone DRU/a 106-tone DRU may be defined in Embodiment 2-1/2-2/2-3 or may be defined in another manner. Furthermore, for a 242-tone DRU, a null tone may be additionally combined by selecting four of the tones of null tone type 1 (e.g., defining eight null tones as null-1 to null-8 in order and allocating an odd-numbered combination and an even-numbered combination to each 242-tone DRU) and selecting four of the tones of null tone type 2 (e.g., defining eight null tones as null-1 to null-8 in order and allocating an odd-numbered combination and an even-numbered combination to each 242-tone DRU).

A method for generating a 52-tone DRU, a 106-tone DRU and/or a 242-tone DRU in this way (e.g., a method for dynamically signaling a tone included in a corresponding DRU) may be usefully applied when a DRU shifted per symbol is applied to obtain diversity gain (e.g., when a subcarrier index included in a specific DRU index in the first symbol is different from a subcarrier index included in the same specific DRU index in the second symbol).

When a DRU index allocated to a STA is signaled by using the existing RU allocation information (e.g., SIG (e.g., U-SIG and/or UHR-SIG) field for a DL OFDMA PPDU), a predefined mapping rule between a 26-tone RRU index and a 26-tone DRU index may be applied. For example, a mapping rule may be to map DRU index-1 including the lowest tone to RRU-1 including the lowest tone and map DRUs including the next lowest tone in ascending order of RRU indexes. When a RRU-to-DRU mapping rule is defined in this way, a plurality of 26-tone RRU indexes may be indicated to a STA to allocate a 52-tone DRU, a 106-tone DRU or a 242-tone DRU, and accordingly, a STA may determine which 26-tone DRUs include a tone included in a 52-tone DRU, a 106-tone DRU or a 242-tone DRU allocated to it.

For example, 2/4/9 26-tone RRU indexes corresponding to 2/4/9 26-tone DRUs corresponding to a 52-DRU/a 106-tone DRU/a 242-tone DRU may be indicated to one STA through RU allocation information, and STA ID values included in user information corresponding to such 2/4/9 26-tone RRUs (e.g., the user field of a U-SIG/UHR-SIG field of a DL OFDMA PPDU (e.g., a MU PPDU) or the UHR variant user information field of a trigger frame) may be configured as the same value as the ID of a corresponding STA. In addition, information indicating that a DRU is allocated and/or information indicating whether it is the last of a plurality of 26-tone RRU indexes corresponding to a DRU allocated to a corresponding STA may be defined within user information (e.g., the user field of a U-SIG/UHR-SIG field of a DL OFDMA PPDU (e.g., a MU PPDU) or the UHR variant user information field of a trigger frame).

Embodiment 2-6

As in the above-described embodiment 2-22, it is pre-defined that the 52-tone DRU includes tones of two 26-tone DRUs of a fixed combination, as in the above-described embodiment 2-3, it is predefined that the 106-tone DRU includes tones of two 52-tone DRUs of a fixed combination (or four 26-tone DRUs of a fixed combination), and as in the above-described embodiment 2-4, it is predefined that the 242-tone DRU includes tones of two 106-tone DRUs of a fixed combination and one additional 26-tone DRU (or four 52-tone DRUs of a fixed combination and one additional 26-tone DRU, or nine 26-tone DRUs of a fixed combination), but by generalizing the DRU index and mapping it to each RRU index, it corresponds to a specific 52-tone DRU/106-tone DRU/242-tone DRU. It can also be flexibly configured as a 26-ton DRU/52-ton DRU/242-ton DRU.

For example, 26-tone DRU-a/b/c/d/e/f/g/h/i/j/k/l/m/n/o/p/q/r may be defined as corresponding to 26-tone DRU-1/2/3/4/5/6/7/8/9/10/11/12/13/14/15/16/17/18 in an arbitrary manner (e.g., indexes a to r and indexes 1 to 18 correspond one-to-one, but a numeric index corresponding to each alphabetic index is determined in ascending order or in arbitrary order). Here, for the position of a tone included in a 26-tone DRU, examples of Embodiment 2-1 may be applied or another manner may be applied. Based on this, 52-tone DRU-a/b/c/d/e/f/g/h, 106-tone DRU-a/b/c/d and 242-tone DRU-a/b may be defined as corresponding to a combination of lower-sized DRU indexes as in examples below.

- 52-tone DRU-a: 26-tone DRU-a, and 26-tone DRU-j
- 52-tone DRU-b: 26-tone DRU-b, and 26-tone DRU-k
- 52-tone DRU-c: 26-tone DRU-c, and 26-tone DRU-l
- 52-tone DRU-d=26-tone DRU-d, and 26-tone DRU-m
- 52-tone DRU-e: 26-tone DRU-f, and 26-tone DRU-o
- 52-tone DRU-f: 26-tone DRU-g, and 26-tone DRU-p
- 52-tone DRU-g: 26-tone DRU-h, and 26-tone DRU-q
- 52-tone DRU-h=26-tone DRU-i, and 26-tone DRU-r
- 106-tone DRU-a: 52-tone DRU-a, 52-tone DRU-e, and two of the tones of null tone type 1
- 106-tone DRU-b: 52-tone DRU-b, 52-tone DRU-f, and two of the tones of null tone type 1
- 106-tone DRU-c: 52-tone DRU-c, 52-tone DRU-g, and two of the tones of null tone type 1
- 106-tone DRU-d: 52-tone DRU-d, 52-tone DRU-h, and two of the tones of null tone type 1
- 242-tone DRU-a: 106-tone DRU-a, 106-tone DRU-c, 26-tone DRU-e, and four of the tones of null tone type 2
- 242-tone DRU-b: 106-tone DRU-b, 106-tone DRU-d, 26-tone DRU-n, and four of the tones of null tone type 2

In the above-described generalized/flexible method, two of the tones of null tone type 1 used for a combination may be defined as described in Embodiment 2-3 and four of the tones of null tone type 2 may be defined as described in Embodiment 2-4.

Additionally or alternatively, a gap between a plurality of lower-sized DRU indexes corresponding to one upper sized-DRU index may be used. The value of this gap may be explicitly signaled to a STA or may be implicitly signaled based on another information (e.g., bandwidth information, BSS color information, etc.) without separate signaling. For example, a 52-tone DRU and a 106-tone DRU may include subcarriers of a lower-sized DRU as follows.

- 52-tone DRU-a: 26-tone DRU-a, and 26-tone DRU-(a+Gap)
- 52-tone DRU-b: 26-tone DRU-b, and 26-tone DRU-(b+Gap)
- 52-tone DRU-c: 26-tone DRU-c, and 26-tone DRU-(c+Gap)
- 52-tone DRU-d=26-tone DRU-d, and 26-tone DRU-(d+Gap)
- 52-tone DRU-e: 26-tone DRU-f, and 26-tone DRU-(f+Gap)
- 52-tone DRU-f: 26-tone DRU-g, and 26-tone DRU-(g+Gap)
- 52-tone DRU-g: 26-tone DRU-h, and 26-tone DRU-(h+Gap)
- 52-tone DRU-h=26-tone DRU-i, and 26-tone DRU-(i+Gap)
- 106-tone DRU-a: 52-tone DRU-a, 52-tone DRU-(a+Gap), and two of the tones of null tone type 1
- 106-tone DRU-b: 52-tone DRU-b, 52-tone DRU-(b+Gap), and two of the tones of null tone type 1
- 106-tone DRU-c: 52-tone DRU-c, 52-tone DRU-(c+Gap), and two of the tones of null tone type 1
- 106-tone DRU-d: 52-tone DRU-d, 52-tone DRU-(d+Gap), and two of the tones of null tone type 1
- 242-tone DRU-a: 106-tone DRU-a, 106-tone DRU-(a+Gap), 26-tone DRU-e, and four of the tones of null tone type 2
- 242-tone DRU-b: 106-tone DRU-b, 106-tone DRU-(b+Gap), 26-tone DRU-n, and four of the tones of null tone type 2

Here, two of the tones of null tone type 1 for a 106-tone DRU may be defined as described in Embodiment 2-3 and four of the tones of null tone type 2 for a 242-tone DRU may be defined as described in Embodiment 2-4.

In examples described above, the order of alphabetical indexes of a DRU and the order of positions on a frequency domain may be unrelated. In addition, even when the alphabetical indexes of a DRU in a different size are the same, it does not mean that order within DRU indexes in the same size is the same.

In examples described above, the value of a gap may have the same/different value per DRU size. For example, the value of a gap may have an independent value or may have an associated value per DRU size.

Embodiment 2-7

Based on the above-described DRU tone plan, a pilot tone plan in each DRU may be defined.

The pilot tone of all DRUs may be defined based on the pilot tone of a 26-tone DRU. In this regard, in order to configure a sufficiently distributed pilot tone not only within each DRU but also between DRUs, a method for defining the pilot tone of a 26-tone DRU by applying a shift to a tone at a specific position is proposed.

In other words, in a 26-tone DRU, a pilot tone may be defined by applying a shift value based on a specific position (e.g., a tone position defined as a pilot tone within an existing (IEEE 802.11 ax/be) 26-tone RRU). For example, a specific position may correspond to a tone at the [6th, 20th], [7th, 21st] or [7th, 20th] position in each 26-tone DRU.

In addition, for convenience of a description, it is considered that one of the eight pilot tone shift values is applied to each 26-tone DRU and corresponding eight pilot tone shift values are referred to as p1, p2, p3, p4, p5, p6, p7 and p8. When a specific position is [7th, 20th], each pilot tone shift value may be greater than or equal to −6 or may be less than or equal to +6. In addition, when a specific position is [6th, 20th], each pilot tone shift value may be greater than or equal to −5 or may be less than or equal to +6. In addition, when a specific position is [7th, 21st], each pilot tone shift value may be greater than or equal to −6 or may be less than or equal to +5. In addition, an additional limitation (e.g., $p1<p2<p3<p4<p5<p6<p7<p8$) may be applied to eight pilot tone shift values.

For example, a pilot tone shift value may be applied to each 26-tone DRU as follows. For a corresponding example, in order to consider a generalized combination, an alphabetic index (e.g., refer to Embodiment 2-6) described above instead of a numeric index may be used in each DRU index. As a specific example, an alphabetic index in the same order as a numeric index may be used (when a numeric index is 1, 2, 3, . . . , an alphabetic index is a, b, c, . . . ).

p1: 26-tone DRU 1, 26-tone DRU 6
p2: 26-tone DRU 2, 26-tone DRU 7
p3: 26-tone DRU 3, 26-tone DRU 8
p4: 26-tone DRU 4, 26-tone DRU 9
p5: 26-tone DRU 10, 26-tone DRU 15
p6: 26-tone DRU 11, 26-tone DRU 16
p7: 26-tone DRU 12, 26-tone DRU 17
P8: 26-tone DRU 13, 26-tone DRU 18

An arbitrary pilot tone shift value may be applied to 26-tone DRU 5 and 26-tone DRU 14, but it may be defined to use a tone at a specific position described above as a pilot tone.

In each pilot tone shift value described above, 26-tone DRUs positioned in the same order of p1 and p5 may exchange a pilot tone shift value with each other. For example, 26-tone DRU 1 and 26-tone DRU 10 may exchange a pilot tone shift value with each other, and as a result, p5 may be used in 26-tone DRU 1 and p1 may be used in 26-tone DRU 10. For another example, 26-tone DRU 6 and 26-tone DRU 15 may exchange a pilot tone shift value with each other, and as a result, p5 may be used in 26-tone DRU 6 and p1 may be used in 26-tone DRU 15. Similarly, a 26-tone DRU positioned in the same order in p2 and p6, p3 and p7, and/or p4 and p8 may exchange a pilot tone shift value with each other.

The 26-tone DRUs of pilot tone shift values p1, p3, p5 and p7 may be used to configure 242-tone DRU 1 and the 26-tone DRUs of pilot tone shift values p2, p4, p6 and p8 may be used to configure 242-tone DRU 2. In other words, a 242-tone DRU may be configured with two 26-tone DRUs having the same pilot tone shift value. In this case, in the process of configuring a 106-tone DRU, a pilot tone corresponding to one of the two same pilot tone shift values is converted into a data tone and finally, each pilot tone in each 242-tone DRU uses only the pilot tone of one 26-tone DRU from each pilot tone shift value. In other words, not only other DRUs but also pilot tones within a 242-tone DRU may have a sufficient gap. In addition, since pilot tones formed by a different pilot tone shift value are configured between different 242-tone DRUs and/or 106-tone DRUs, a sufficiently distributed pilot tone may be configured between DRUs. In this regard, a pilot tone whose part is formed by the same pilot tone shift value may be configured in a 26-tone DRU and/or a 52-tone DRU.

In a 106-tone DRU, for a method for converting a part of a pilot tone of a small DRU into a data tone and using a part as a pilot tone, at least one of various options below may be considered.

(Option 1)

A method for selecting the pilot tone of a 26-tone DRU of a low index in the shift value of an odd-numbered index (e.g., p1, p3, p5, p7) and selecting the pilot tone of a 26-tone DRU of a high index in the shift value of an even-numbered index (e.g., p2, p4, p6, p8). In this case, a sufficiently distributed pilot tone may be possible even between pilots between DRUs under a specific shift value situation.

(Option 2)

A method for selecting the pilot tone of a 26-tone DRU of a high index in the shift value of an odd-numbered index and selecting the pilot tone of a 26-tone DRU of a low index in the shift value of an even-numbered index.

(Option 3)

A method for selecting the pilot tone of a 26-tone DRU of a low index in a negative tone index and selecting the pilot tone of a 26-tone DRU of a high index in a positive toe index.

(Option 4)

A method for selecting the pilot tone of a 26-tone DRU of a high index in a negative tone index and selecting the pilot tone of a 26-tone DRU of a low index in a positive toe index.

(Option 5)

A method for selecting the pilot tone of a 26-tone DRU of a low index in p1, p2, p3 and p4 and selecting the pilot tone of a 26-tone DRU of a high index in p5, p6, p7 and p8.

(Option 6)

A method for selecting the pilot tone of a 26-tone DRU of a high index in p1, p2, p3 and p4 and selecting the pilot tone of a 26-tone DRU of a low index in p5, p6, p7 and p8.

In this regard, under the situation of p1<p2<p3<p4<p5<p6<p7<p8 and a mirror symmetric type (e.g., −p1=p8, −p2=p7, −p3=p6, −p4=p5), when a pilot tone index used in all 26-tone DRUs and 52-tone DRUs is referred to as +−{i1, i2, i3, i4, i5, i6, i7, i8, i9, i10, i11, i12, i13, i14, i15, i16} and i1>i2>i3>i4>i5>i6>i7>i8>i9>i10>i11>i12>i13>i14>i15>i16>0 is assumed, a pilot tone candidate in each 26-tone DRU (here, excluding 26-tone DRU 5 and 26-tone DRU 14) and 52-tone DRU and a pilot tone candidate in a 106-tone DRU may be as follows. It may mean that pilot tone indexes are listed from the smallest to the biggest.

26-tone DRU 1: Tone index [−i1, i16]
26-tone DRU 2: Tone index [−i3, i14]
26-tone DRU 3: Tone index [−i5, i12]
26-tone DRU 4: Tone index [−i7, i10]
26-tone DRU 6: Tone index [−i2, i15]
26-tone DRU 7: Tone index [−i4, i13]
26-tone DRU 8: Tone index [−i6, i11]
26-tone DRU 9: Tone index [−i8, i9]
26-tone DRU 10: Tone index [−i9, i8]
26-tone DRU 11: Tone index [−i11, i6]
26-tone DRU 12: Tone index [−i13, 14]
26-tone DRU 13: Tone index [−i15, i2]
26-tone DRU 15: Tone index [−i10, i7]
26-tone DRU 16: Tone index [−i12, i5]
26-tone DRU 17: Tone index [−i14, i3]
26-tone DRU 18: Tone index [−i16, i1]
52-tone DRU 1: Tone index [−i1, −19, i16, i8]
52-tone DRU 2: Tone index [−i3, −i11, i14, i6]
52-tone DRU 3: Tone index [−i5, −i13, i12, i4]
52-tone DRU 4: Tone index [−i7, −i15, i10, i2]
52-tone DRU 5: Tone index [−i2, −i10, i15, i7]
52-tone DRU 6: Tone index [−i4, −i12, i13, i5]
52-tone DRU 7: Tone index [−i6, −i14, i11, i3]
52-tone DRU 8: Tone index [−i8, −i16, i9, i1]
106-tone DRU 1: Tone index [−i1, −i2, −i9, −i10, i16, i15, i8, i7]
106-tone DRU 2: Tone index [−i3, −i4, −i11, −i12, i14, i13, i6, i5]
106-tone DRU 3: Tone index [−i5, −i6, −i13, −i14, i12, i11, i4, i3]
106-tone DRU 4: Tone index [−i7, −i8, −i15, −i16, i10, i9, i2, i1]

In this regard, for example, when it is based on option 1, a pilot tone in a 106-tone DRU and a pilot tone in the entire 106-tone DRU may be determined as follows.

106-tone DRU 1: Tone index [−i1, −19, i16, i8]
106-tone DRU 2: Tone index [−i4, −i12, i13, i5]
106-tone DRU 3: Tone index [−i5, −i13, i12, i4]
106-tone DRU 4: Tone index [−i8, −i16, i9, i1]
Entire 106-tone DRU: Tone index +−[i1, i4, i5, i8, i9, i12, i13, i16]

As another example, when it is based on option 2, a pilot tone in a 106-tone DRU and a pilot tone in the entire 106-tone DRU may be determined as follows.

106-tone DRU 1: Tone index [−i2, −i10, i15, i7]

106-tone DRU 2: Tone index [−i3, −i11, i14, i6]

106-tone DRU 3: Tone index [−i6, −i14, i11, i3]

106-tone DRU 4: Tone index [−i7, −i15, i10, 12]

Entire 106-tone DRU: Tone index +−[i2, i3, i6, i7, i10, i11, i14, i15]

As another example, when it is based on option 3, a pilot tone in a 106-tone DRU and a pilot tone in the entire 106-tone DRU may be determined as follows.

106-tone DRU 1: Tone index [−i1, −i9, i15, i7]

106-tone DRU 2: Tone index [−i3, −i11, i13, i5]

106-tone DRU 3: Tone index [−i5, −i13, i11, 13]

106-tone DRU 4: Tone index [−i7, −i15, i9, i1]

Entire 106-tone DRU: Tone index +−[i1, i3, i5, i7, i9, i11, i13, i15]

As another example, when it is based on option 4, a pilot tone in a 106-tone DRU and a pilot tone in the entire 106-tone DRU may be determined as follows.

106-tone DRU 1: Tone index [−i2, −i10, i16, i8]

106-tone DRU 2: Tone index [−i4, −i12, i14, i6]

106-tone DRU 3: Tone index [−i6, −i14, i12, i4]

106-tone DRU 4: Tone index [−i8, −i16, i10, i2]

Entire 106-tone DRU: Tone index +−[i2, i4, i6, i8, i10, i12, i14, i16]

As another example, when it is based on option 5, a pilot tone in a 106-tone DRU and a pilot tone in the entire 106-tone DRU may be determined as follows.

106-tone DRU 1: Tone index [−i1, −i10, i16, i7]

106-tone DRU 2: Tone index [−i3, −i12, i14, i5]

106-tone DRU 3: Tone index [−i5, −i14, i12, i3]

106-tone DRU 4: Tone index [−i7, −i16, i10, i1]

Entire 106-tone DRU: Tone index +−[i1, i3, i5, i7, i10, i12, i14, i16]

As another example, when it is based on option 6, a pilot tone in a 106-tone DRU and a pilot tone in the entire 106-tone DRU may be determined as follows.

106-tone DRU 1: Tone index {−i2, −i9, i15, i8}

106-tone DRU 2: Tone index {−i4, −i11, i13, i6}

106-tone DRU 3: Tone index {−i6, −i13, i11, i4}

106-tone DRU 4: Tone index {−i8, −i15, i9, i2}

Entire 106-tone DRU: Tone index +−{i2, i4, i6, i8, i9, i11, i13, i15}

A variety of examples described above consider four null tone methods (e.g., four null tone groups) and various pilot tone shift methods (e.g., seven pilot tone shift methods) in the present disclosure and the following illustrates a shift value in each pilot tone shift method.

Shift 1: p1 =−4, p2=−3, p3=−2, p4=−1, p5=1, p6=2, p7=3. p8=4

Shift 2: p1=−5, p2=−4, p3=−2, p4=−1, p5=1, p6=2, p7=4. p8=5

Shift 3: p1=−5, p2=−4, p3=−3, p4=−2, p5=2, p6=3, p7=4. p8=5

Shift 4: p1=−6, p2=−5, p3=−3, p4=−2, p5=2, p6=3, p7=5. p8=6

Shift 5: p1=−6, p2=−5, p3=−4, p4=−3, p5=3, p6=4, p7=5. p8=6

Shift 6: p1=−6, p2=−5, p3=−2, p4=−1, p5=1, p6=2, p7=5. p8=6

Shift 7: p1=−6, p2=−4, p3=−3, p4=−1, p5=1, p6-3, p7=4. p8=6

For a shift method per pilot coefficient and symbol applied to each DRU, a method defined in the existing RRU in the same size may be applied as it is.

Embodiment 2-8

This embodiment relates to the tone index of each DRU when a DRU is applied within each 40 MHz in a bandwidth exceeding 40 MHz (e.g., a bandwidth of 80 MHz or more).

In examples below, a set of tone indexes included in each of the at least one DRU for a channel of x MHz among the bandwidth of y MHz may be represented as S_x_y. For example, it may be assumed that S_40_40 corresponds to tone indexes included in a DRU in various sizes for a 40 MHz channel in a 40 MHz bandwidth in examples described in Embodiments 2-1 to 2-7 described above.

First, a tone index (S_40_80) at the specific 40 MHz of a 80 MHz bandwidth may be defined as follows.

Tone index (1st S_40_80) of the first 40 MHz: DRU tone index (S_40_40) defined at 40 MHz described above −256

Tone index (2nd S_40_80) of the second 40 MHz: DRU tone index (S_40_40) defined at 40 MHz described above +256

For example, it may also be expressed as follows.

1st S_40_80=S_40_40-256; and

2nd S_40_80=S_40_40+256.

Next, a tone index (S_40_160) at the specific 40 MHz of a 160 MHz bandwidth may be defined as follows.

Tone index (1st S_40_160 and 2nd S_40_160) of each 40 MHz within the first 80 MHz: DRU tone index (1st S_40_80 and 2nd S_40_80) of each 40 MHz defined at 80 MHz described above −512

Tone index (3rd S_40_160 and 4th S_40_160) of each 40 MHz within the second 80 MHz: DRU tone index (1st S_40_80 and 2nd S_40_80) of each 40 MHz defined at 80 MHz described above +512

For example, it may also be expressed as follows.

1st S_40_160=1st S_40_80-512;

2nd S_40_160=2nd S_40_80-512;

3rd S_40_160=1st S_40_80+512; and

4th S_40_160=2nd S_40_80+512.

Next, a tone index (S_40_240) at the specific 40 MHz of a 240 MHz bandwidth may be defined as follows.

Tone index (1st S_40_240 and 2nd S_40_240) of each 40 MHz within the first 80 MHz: DRU tone index (1st S_40_80 and 2nd S_40_80) of each 40 MHz defined at 80 MHz described above −1024

Tone index (3rd S_40_240 and 4th S_40_240) of each 40 MHz within the second 80 MHz: DRU tone index (1st S_40_80 and 2nd S_40_80) of each 40 MHz defined at 80 MHz described above Tone index (5th S_40_240 and 6th S_40_240) of each 40 MHz within the third 80 MHz: DRU tone index (1st S_40_80 and 2nd S_40_80) of each 40 MHz defined at 80 MHz described above +1024

For example, it may also be expressed as follows.

1st S_40_240=1st S_40_80-1024;

2nd S_40_240=2nd S_40_80-1024;

3rd S_40_240=1st S_40_80;

4th S_40_240=2nd S_40_80;

5th S_40_240=1st S_40_80+1024; and

6th S_40_240=2nd S_40_80+1024.

Next, a tone index (S_40_320) at the specific 40 MHz of a 320 MHz bandwidth may be defined as follows.

Tone index (1st S_40_320 to 4th S_40_320) of each 40 MHz within the first 160 MHz: DRU tone index (1st S_40_160 to 4th S_40_160) of each 40 MHz defined at 160 MHz described above −1024

Tone index (5th S_40_320 to 8th S_40_320) of each 40 MHz within the second 160 MHz: DRU tone index (1st S_40_160 to 4th S_40_160) of each 40 MHz defined at 160 MHz described above +1024

For example, it may also be expressed as follows.

1st S_40_320=1st S_40_160-1024;
2nd S_40_320=2nd S_40_160-1024;
3rd S_40_320=3rd S_40_160-1024;
4th S_40_320=4th S_40_160-1024;
5th S_40_320=1st S_40_160+1024;
6th S_40_320=2nd S_40_160+1024;
7th S_40_320=3rd S_40_160+1024; and
8th S_40_320=4th S_40_160+1024.

Next, a tone index (S_40_480) at the specific 40 MHz of a 480 MHz bandwidth may be defined as follows.

Tone index (1st S_40_480 to 4th S_40_480) of each 40 MHz within the first 160 MHz: DRU tone index (1st S_40_160 to 4th S_40_160) of each 40 MHz defined at 160 MHz described above −2048

Tone index (5th S_40_480 to 8th S_40_480) of each 40 MHz within the second 160 MHz: DRU tone index (1st S_40_160 to 4th S_40_160) of each 40 MHz defined at 160 MHz described above Tone index (9th S_40_480 to 12th S_40_480) of each 40 MHz within the third 160 MHz: DRU tone index (1st S_40_160 to 4th S_40_160) of each 40 MHz defined at 160 MHz described above +2048

For example, it may also be expressed as follows.

1st S_40_480=1st S_40_160-2048;
2nd S_40_480=2nd S_40_160-2048;
3rd S_40_480=3rd S_40_160-2048;
4th S_40_480=4th S_40_160-2048;
5th S_40_480=1st S_40_160;
6th S_40_480=2nd S_40_160;
7th S_40_480=3rd S_40_160;
8th S_40_480=4th S_40_160;
9th S_40_480=1st S_40_160+2048;
10th S_40_480=2nd S_40_160+2048;
11th S_40_480=3rd S_40_160+2048; and
12th S_40_480=4th S_40_160+2048.

Next, a tone index (S_40_640) at the specific 40 MHz of a 640 MHz bandwidth may be defined as follows.

Tone index (1st S_40_640 to 8th S_40_640) of each 40 MHz within the first 320 MHz: DRU tone index (1st S_40_320 to 8th S_40_320) of each 40 MHz defined at 320 MHz described above −2048

Tone index (9th S_40_640 to 16th S_40_640) of each 40 MHz within the second 320 MHz: DRU tone index (1st S_40_320 to 8th S_40_320) of each 40 MHz defined at 320 MHz described above +2048

For example, it may also be expressed as follows.

1st S_40_640=1st S_40_320-2048;
2nd S_40_640=2nd S_40_320-2048;
3rd S_40_640=3rd S_40_320-2048;
4th S_40_640=4th S_40_320-2048;
5th S_40_640=5th S_40_320-2048;
6th S_40_640=6th S_40_320-2048;
7th S_40_640=7th S_40_320-2048;
8th S_40_640=8th S_40_320-2048;
9th S_40_640=1st S_40_320+2048;
10th S_40_640=2nd S_40_320+2048;
11th S_40_640=3rd S_40_320+2048;
12th S_40_640=4th S_40_320+2048;
13th S_40_640=5th S_40_320+2048;
14th S_40_640=6th S_40_320+2048;
15th S_40_640=7th S_40_320+2048; and
16th S_40_640=8th S_40_320+2048.

When a DRU tone plan proposed in the present disclosure is used, a DRU in a different size may be allocated and used to a different STA within a 20 MHz bandwidth/channel or a 40 MHz bandwidth/channel in a similar way to the use of the existing RRU. In addition, a RU allocation field in DL OFDMA transmission and a RU allocation subfield in a trigger frame for TB PPDU transmission may be utilized in the same manner as in RRU transmission. In this regard, in transmitting/allocating a DRU, a mapping rule from a RU allocation field and a RU allocation subfield to a DRU needs to be defined.

Hereinafter, a STA operation based on various examples of the present disclosure described above will be described through FIGS. 13 and 14. The examples of FIGS. 13 and 14 may correspond to some of the various examples of the present disclosure.

Figure 13:
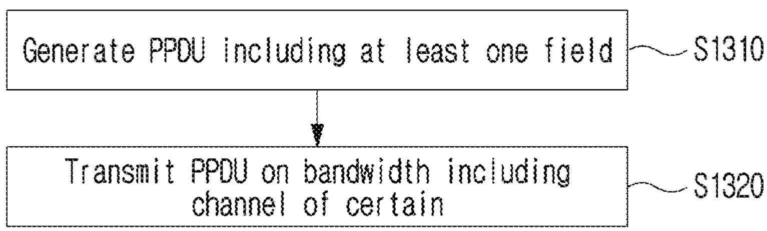
FIG. 13 is a diagram for describing an example of a DRU tone plan-based PPDU transmission method of a first STA according to the present disclosure.

FIG. 13 is a diagram for describing an example of a DRU tone plan-based PPDU transmission method of a first STA according to the present disclosure.

In S1310, a first STA may generate a PPDU including at least one field. Here, the at least one field may be mapped/transmitted on at least one DRU. A corresponding PPDU may be a PPDU transmitted/received on a bandwidth including a channel in a certain size (e.g., 20 MHz, 40 MHz).

For example, at least one field may include a data field. In other words, the data field of a PPDU may be generated by being mapped on at least one DRU in various sizes.

When at least one DRU includes any one 26-tone DRU, a corresponding 26-tone DRU may be one of a predefined number of 26-tone DRU candidates. For example, for a 20 MHz channel, 9 26-tone DRU candidates (e.g., the 1st 26-tone DRU candidate to the 9th 26-tone DRU candidate) may be predefined. In addition, for a 40 MHz channel, 18 26-tone DRU candidates (e.g., the 1st 26-tone DRU candidate to the 18th 26-tone DRU candidate) may be predefined.

In this regard, two pilot tones for a 26-tone DRU candidate may be defined by applying a shift value to two tone indexes in specific order among the 26 tones of a corresponding 26-tone DRU candidate. For example, corresponding specific order may be one of (7th, 20th), (6th, 20th) or (7th, 21st) among the 26 tones.

In this case, a corresponding shift value may be one of nine different shift values for multiple 26-tone DRU candidates described above.

For example, when a channel in a certain size is a 20 MHz channel and 9 26-tone DRU candidates are predefined, a shift value for the 1st 26-tone DRU may be p1, a shift value for the 2nd 26-tone DRU may be p2, a shift value for the 3rd 26-tone DRU may be p3, a shift value for the 4th 26-tone DRU may be p4, a shift value for the 5th 26-tone DRU may be p5, a shift value for the 6th 26-tone DRU may be p6, a shift value for the 7th 26-tone DRU may be p7, a shift value for the 8th 26-tone DRU may be p8 and a shift value for the 9th 26-tone DRU may be p9. Here, p1, p2, p3, p4, p5, p6, p7, p8 and p9 may be a different integer value.

In this case, considering a mirror symmetric pilot tone shift, p1 is −p9, p2 is −p8, p3 is −p7, p4 is −p6 and p5 is 0, and here, p1, p2, p3 and p4 may be an integer value greater than or equal to 1. As an example, [p1, p2, p3, p4, p5, p6, p7, p8, p9] may be [−4, −3, −2, −1, 0, 1, 2, 3, 4]. In this regard, for a corresponding 20 MHz channel, the 1st 26-tone DRU includes the tones of tone indexes [−121:9:−13] and [5:9:113], the 2nd 26-tone DRU includes the tones of tone indexes [−120:9:−12] and [6:9:114], the 3rd 26-tone DRU includes the tones of tone indexes [−119:9:−11] and [7:9:115], the 4th 26-tone DRU includes the tones of tone indexes [−118:9:−10] and [8:9: 116], the 5th 26-tone DRU includes the tones of tone indexes [−117:9:−9] and [9:9:117], the 6th 26-tone DRU includes the tones of tone indexes [−116:9:−8]

and [10:9:118], the 7th 26-tone DRU includes the tones of tone indexes [−115:9:−7] and [11:9:119], the 8th 26-tone DRU includes the tones of tone indexes [−114:9:−6] and [12:9:120] and the 9th 26-tone DRU includes the tones of tone indexes [−113:9:−5] and [13:9:121], wherein tone index [x:y:z] may be the tone index of tones selected in a unit of a y tone from the tone of a x index to the tone of a z index (e.g., refer to Method 1-3 of Embodiment 1-1).

In this regard, by the above-described pilot tone shift method, the entire pilot tone of tone indexes [−103:10:−23] and [23:10:103] may be defined based on 9 different shift values (e.g., [p1, p2, p3, p4, p5, p6, p7, p8, p9]). Based on the entire pilot tone, the pilot tone of each DRU (e.g., a 26-tone DRU, a 52-tone DRU, a 106-tone DRU) may be determined.

As another example, when a channel in a certain size is a 40 MHz channel and 18 26-tone DRU candidates are predefined, a shift value for the 1st 26-tone DRU and the 6th 26-tone DRU may be p1, a shift value for the 2nd 26-tone DRU and the 7th 26-tone DRU may be p2, a shift value for the 3rd 26-tone DRU and the 8th 26-tone DRU may be p3, a shift value for the 4th 26-tone DRU and the 9th 26-tone DRU may be p4, a shift value for the 10th 26-tone DRU and the 15th 26-tone DRU may be p5, a shift value for the 11th 26-tone DRU and the 16th 26-tone DRU may be p6, a shift value for the 12th 26-tone DRU and the 17th 26-tone DRU may be p7 and a shift value for the 13th 26-tone DRU and the 18th 26-tone DRU may be p8. Here, p1, p2, p3, p4, p5, p6, p7 and p8 may be a different integer value.

In this case, considering a mirror symmetric pilot tone shift, p1 may be −p8, p2 may be −p7, p3 may be −p6 and p4 may be −p5. In this case, a pilot tone shift may not be applied to the 5th 26-tone DRU and the 14th 26-tone DRU.

In addition, according to the present disclosure, when at least one DRU described above includes a 52-tone DRU, a corresponding 52-tone DRU may be one of the predefined multiple 52-tone DRU candidates. In this regard, for multiple 52-tone DRU candidates, four pilot tones for a 52-tone DRU candidate may be defined as a combination of pilot tones for two 26-tone DRU candidates for the configuration of a corresponding 52-tone DRU candidate.

In addition, according to the present disclosure, when at least one DRU described above includes a 106-tone DRU, a corresponding 106-tone DRU may be one of the predefined multiple 106-tone DRU candidates. In this regard, for multiple 106-tone DRU candidates, four pilot tones for a 106-tone DRU candidate may be defined as four of the pilot tones for two 52-tone DRU candidates for the configuration of a corresponding 106-tone DRU candidate. In this case, the remaining four of the pilot tones for two 52-tone DRU candidates may be converted into data tones and used.

In addition, according to the present disclosure, the at least one DRU may be indicated based on resource unit (RU) allocation information included in the PPDU or the at least one DRU may be indicated based on RU allocation information included in a trigger frame that triggers transmission of the PPDU. A corresponding PPDU may be a downlink PPDU or an uplink trigger-based (TB) PPDU. In this regard, an indication for the at least one DRU may be based on a mapping rule (e.g., a mapping rule between a RRU and a DRU) between predefined multiple 26-tone DRU candidates and predefined multiple 26-tone RU candidates for a channel in the certain size.

In addition, according to the present disclosure, a tone index included in each of at least one DRU for the above-described channel in a certain size may be tone −shifted according to a position within a bandwidth exceeding a corresponding size. For example, a tone index included in each of at least one DRU for a 20 MHz channel may be tone −shifted based on Embodiment 1-7 and a tone index included in each of at least one DRU for a 40 MHz channel may be tone −shifted based on Embodiment 2-8.

In S1320, a first STA may transmit a PPDU to at least one second STA on a bandwidth including a 20 MHz channel.

A method described in the example of FIG. 13 may be performed by a first device (100) of FIG. 1. For example, at least one processor (102) of a first device (100) of FIG. 1 may be configured to generate a PPDU including at least one field and transmit a PPDU to at least one second STA on a bandwidth including a channel in a certain size. Furthermore, at least one memory (104) of a first device (100) may store instructions for performing a method described in the example of FIG. 13 or examples described above when executed by at least one processor (102).

FIG. 14 is a diagram for describing an example of a DRU tone plan-based PPDU reception method of a second STA according to the present disclosure.

In S1410, a second STA may receive a PPDU including at least one field from a first STA on a bandwidth including a channel in a certain size (e.g., 20 MHz, 40 MHZ).

In S1420, a second STA may decode at least one field received on at least one DRU.

For example, a second STA may determine the number and position (e.g., index) of tones of at least one DRU to which at least one field (e.g., data field) is mapped in a PPDU transmitted by a first STA based on RU allocation information included in a corresponding PPDU or based on RU allocation information included in a trigger frame that triggers transmission of a corresponding PPDU. Based on this, a second STA may decode at least one field mapped to at least one corresponding DRU.

In this regard, since specific details of a tone plan for at least one DRU (e.g., various sizes and tone indexes of a DRU), the pilot tone of a DRU (e.g., a pilot tone for a 26-tone DRU candidate, a 52-tone DRU candidate and a 106-tone DRU candidate), signaling for a DRU indication, etc. are the same as described in the example of FIG. 13, an overlapping description is omitted.

A method described in the example of FIG. 14 may be performed by a second device (200) of FIG. 1. For example, at least one processor (202) of a second device (200) of FIG. 1 may be configured to receive a PPDU including at least one field from a first STA on a bandwidth including a channel in a certain size and decode the at least one field received on at least one DRU. Furthermore, at least one memory (204) of a second device (200) may store instructions for performing a method described in the example of FIG. 14 or examples described above when executed by at least one processor (202).

Figure 15:
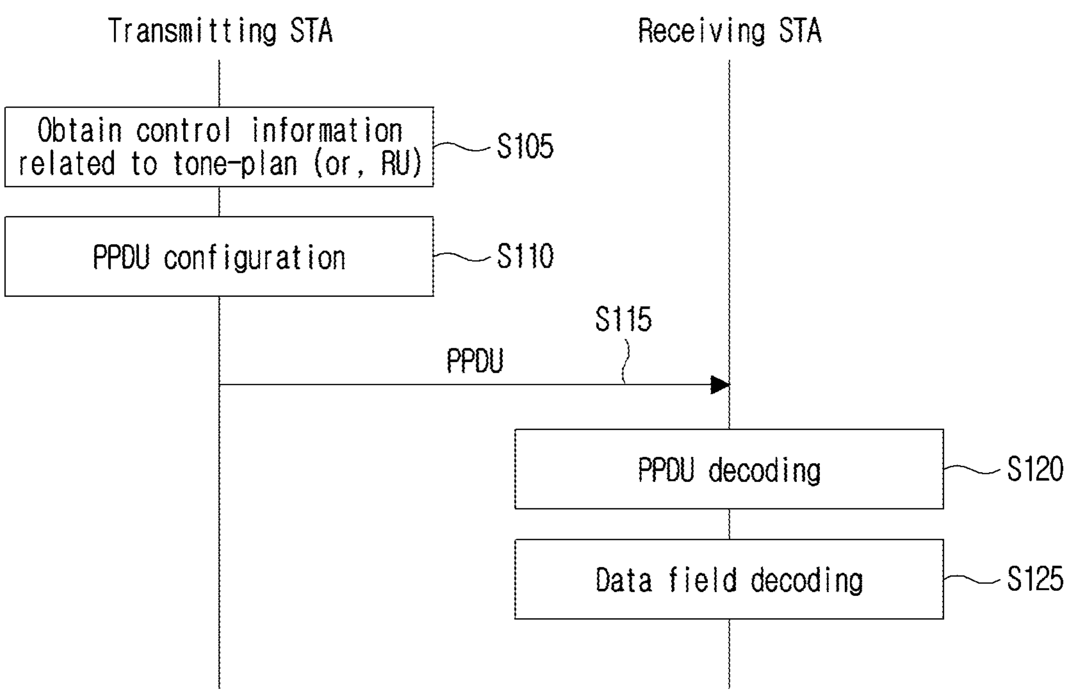
FIG. 15 is a diagram for describing a PPDU transmission or reception procedure between a transmitting STA and a receiving STA according to an example of the present disclosure.

FIG. 15 is a diagram for describing a PPDU transmission or reception procedure between a transmitting STA and a receiving STA according to an embodiment of the present disclosure. Some step(s) shown in FIG. 15 may be omitted according to a situation and/or a configuration, etc. A transmitting device and a receiving STA may be an AP and/or a non-AP STA.

A transmitting STA may obtain control information related to a tone plan (or a RU/a DRU) described above (S105). Control information related to a tone plan may include the size and position of a RU, control information related to a RU, information about a frequency band where a RU is included, information about a STA receiving a RU, etc.

A transmitting STA may configure/generate a PPDU based on obtained control information (S110). Configuring/generating a PPDU may refer to configuring/generating each field of a PPDU. In other words, configuring/generating a PPDU may include configuring an EHT-SIG-A/B/C field that includes control information regarding a tone plan.

In other words, configuring/generating a PPDU may include configuring a field that includes control information (e.g., N bitmaps) indicating the size/position of a RU and/or configuring a field that includes the identifier (e.g., an AID) of a STA receiving a RU.

In addition, configuring/generating a PPDU may include generating a STF/LTF sequence transmitted through a specific RU. A STF/LTF sequence may be generated based on a pre-configured STF generation sequence/LTF generation sequence.

In addition, configuring/generating a PPDU may include generating a data field (i.e., a MPDU) transmitted through a specific RU.

A transmitting STA may transmit a configured/generated PPDU to a receiving STA (S115).

Specifically, a transmitting STA may perform at least one of cyclic shift diversity (CSD), spatial mapping, an inverse discrete fourier transform (IDFT)/inverse fast fourier transform (IFFT) operation, a guard interval (GI) inserting operation, etc.

A receiving STA may decode a PPDU and obtain control information related to a tone plan (or, a RU) (S120).

Specifically, a receiving STA may decode the L-SIG and EHT-SIG of a PPDU based on L-STF/LTF and obtain information included in L-SIG and EHT SIG fields. Information about various tone-plans (i.e., RUs) of the present disclosure may be included in an EHT-SIG (EHT-SIG-A/B/C, etc.) and a receiving STA may obtain information about a tone plan (i.e., a RU) through an EHT-SIG.

A receiving STA may decode the remaining part of a PPDU based on information about an obtained tone plan (i.e., RU) (S125). For example, a receiving STA may decode the STF/LTF field of a PPDU based on information about a tone plan (i.e., a RU). In addition, a receiving STA may decode the data field of a PPDU based on information about a tone plan (i.e., a RU) and obtain a MPDU included in a data field.

In addition, a receiving STA may perform a processing operation that delivers decoded data to a higher layer (e.g., a MAC layer). In addition, when the generation of a signal is indicated from a higher layer to a PHY layer in response to data delivered to a higher layer, a receiving STA may perform a subsequent operation.

When the application of a DRU is supported, whereas only a RRU is applied in the existing WLAN system, the efficiency of resource utilization may be improved by transmitting/receiving at least one field of a PPDU based on a DRU tone plan in various sizes which may be applied to the PPDU of a 20 MHz bandwidth according to the present disclosure.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

A method proposed by the present disclosure is mainly described based on an example applied to an IEEE 802.11-based system. 5G system, but may be applied to various WLAN or wireless communication systems other than the IEEE 802.11-based system.

What is claimed is:

1. A method comprising:

generating, by a first station (STA), a physical layer protocol data unit (PPDU); and transmitting, by the first STA, the PPDU to at least one second STA in a 20 MHz bandwidth, wherein nine 26-tone distributed resource units (DRUs) are defined for the PPDU, wherein each of the nine 26-tone DRUs comprises a plurality of data tones and two pilot tones, and wherein an interval between a lowest tone index for the plurality of data tones and a lowest tone index for the two pilot tones is different for each of the nine 26-tone DRUs.

2. The method of claim 1, wherein:
the interval is defined as a number of tones being a multiple of 9.

3. The method of claim 1, wherein:
for the nine 26-tone DRUs, the interval is being defined as nine times A tones, where A is an integer,
a value of A for a 1st 26-tone DRU is p1,
a value of A for a 2nd 26-tone DRU is p2,
a value of A for a 3rd 26-tone DRU is p3,
a value of A for a 4th 26-tone DRU is p4,
a value of A for a 5th 26-tone DRU is p5,
a value of A for a 6th 26-tone DRU is p6,
a value of A for a 7th 26-tone DRU is p7,
a value of A for a 8th 26-tone DRU is p8,
a value of A for a 9th 26-tone DRU is p9, and
p1, p2, p3, p4, p5, p6, p7, p8, and p9 are an integer value greater than or equal to 1.

4. The method of claim 3, wherein:
(p5-p1) is-(p5-p9), (p5-p2) is-(p5-p8), (p5-p3) is-(p5-p7), and (p5-p4) is-(p5-p6).

5. The method of claim 1, wherein:
for the nine 26-tone DRUs,
a 1st 26-tone DRU includes tones of tone indexes [−121:9:−13] and [5:9:113],
a 2nd 26-tone DRU includes tones of tone indexes [−120:9:−12] and [6:9:114],
a 3rd 26-tone DRU includes tones of tone indexes [−119:9:−11] and [7:9:115],
a 4th 26-tone DRU includes tones of tone indexes [−118:9:−10] and [8:9:116],
a 5th 26-tone DRU includes tones of tone indexes [−117:9:−9] and [9:9:117],
a 6th 26-tone DRU includes tones of tone indexes [−116:9:−8] and [10:9:118],
a 7th 26-tone DRU includes tones of tone indexes [−115:9:−7] and [11:9:119],
a 8th 26-tone DRU includes tones of tone indexes [−114:9:−6] and [12:9:120],
a 9th 26-tone DRU includes tones of tone indexes [−113:9:−5] and [13:9:121],
wherein a tone index [x:y:z] is a tone index of tones selected in a y tone unit from a tone of a x index to a tone of a z index.

6. The method of claim 1, wherein:
at least one 52-tone DRU is defined for a transmission of the PPDU, and
for the at least one 52-tone DRU, pilot tone indices for a 52-tone DRU are defined as a combination of pilot tone indices for two 26-tone DRUs for configuring the 52-tone DRU.

7. The method of claim 6, wherein:
at least one 106-tone DRU is defined for a transmission of the PPDU, and
for the at least one 106-tone DRU, pilot tone indices for a 106-tone DRU are defined based one pilot tone indices for two 52-tone DRUs for configuring the 106-tone DRU.

8. The method of claim 1, wherein:
at least one DRU to be applied to the PPDU is indicated based on RU allocation information included in a trigger frame triggering a transmission of the PPDU.

9. The method of claim 1, wherein:
based on a set of subcarrier indexes included in a DRU for a x MHz channel of a y MHz bandwidth being indicated as S_x_y,
a 1st S_20_40=S_20_20−128,
a 2nd S_20_40=S_20_20+128.

10. The method of claim 9, wherein:
a 1st S_20_80=the 1st S_20_40−256,
a 2nd S_20_80=the 2nd S_20_40−256,
a 3rd S_20_80=the 1st S_20_40+256,
a 4th S_20_80=the 2nd S_20_40+256.

11. The method of claim 10, wherein:
a 1st S_20_160=the 1st S_20_80-512,
a 2nd S_20_160=the 2nd S_20_80-512,
a 3rd S_20_160=the 3rd S_20_80-512,
a 4th S_20_160=the 4th S_20_80-512,
a 5th S_20_160=the 1st S_20_80+512,
a 6th S_20_160=the 2nd S_20_80+512,
a 7th S_20_160=the 3rd S_20_80+512,
a 8th S_20_160=the 4th S_20_80+512.

12. The method of claim 11, wherein:
a 1st S_20_320=the 1st S_20_160-1024,
a 2nd S_20_320=the 2nd S_20_160-1024,
a 3rd S_20_320=the 3rd S_20_160-1024,
a 4th S_20_320=the 4th S_20_160-1024,
a 5th S_20_320=the 5th S_20_160-1024,
a 6th S_20_320=the 6th S_20_160-1024,
a 7th S_20_320=the 7th S_20_160-1024,
a 8th S_20_320=the 8th S_20_160-1024,
a 9th S_20_320=the 1st S_20_160+1024,
a 10th S_20_320=the 2nd S_20_160+1024,
a 11th S_20_320=the 3rd S_20_160+1024,
a 12th S_20_320=the 4th S_20_160+1024,
a 13th S_20_320=the 5th S_20_160+1024,
a 14th S_20_320=the 6th S_20_160+1024,
a 15th S_20_320=the 7th S_20_160+1024,
a 16th S_20_320=the 8th S_20_160+1024.

13. The method of claim 12, wherein:
a 1st S_20_640=the 1st S_20_320-2048,
a 2nd S_20_640=the 2nd S_20_320-2048,
a 3rd S_20_640=the 3rd S_20_320-2048,
a 4th S_20_640=the 4th S_20_320-2048,
a 5th S_20_640=the 5th S_20_320-2048,
a 6th S_20_640=the 6th S_20_320-2048,
a 7th S_20_640=the 7th S_20_320-2048,
a 8th S_20_640=the 8th S_20_320-2048,
a 9th S_20_640=the 9th S_20_320-2048,
a 10th S_20_640=the 10th S_20_320-2048,
a 11th S_20_640=the 11th S_20_320-2048,
a 12th S_20_640=the 12th S_20_320-2048,
a 13th S_20_640=the 13th S_20_320-2048,
a 14th S_20_640=the 14th S_20_320-2048,
a 15th S_20_640=the 15th S_20_320-2048,
a 16th S_20_640=the 16th S_20_320-2048,
a 17th S_20_640=the 1st S_20_320+2048,
a 18th S_20_640=the 2nd S_20_320+2048,
a 19th S_20_640=the 3rd S_20_320+2048,
a 20th S_20_640=the 4th S_20_320+2048,
a 21th S_20_640=the 5th S_20_320+2048,
a 22th S_20_640=the 6th S_20_320+2048,
a 23th S_20_640=the 7th S_20_320+2048,
a 24th S_20_640=the 8th S_20_320+2048,
a 25th S_20_640=the 9th S_20_320+2048,
a 26th S_20_640=the 10th S_20_320+2048,
a 27th S_20_640=the 11th S_20_320+2048,
a 28th S_20_640=the 12th S_20_320+2048,
a 29th S_20_640=the 13th S_20_320+2048,
a 30th S_20_640=the 14th S_20_320+2048,
a 31th S_20_640=the 15th S_20_320+2048,
a 32th S_20_640=the 16th S_20_320+2048.

14. The method of claim 12, wherein:
an additional tone shift value is applied for each of the 1st S_20_40 and the 2nd S_20_40.

15. The method of claim 11, wherein:
a 1st S_20_480=the 1st S_20_160-2048,
a 2nd S_20_480=the 2nd S_20_160-2048,
a 3rd S_20_480=the 3rd S_20_160-2048,
a 4th S_20_480=the 4th S_20_160-2048,
a 5th S_20_480=the 5th S_20_160-2048,
a 6th S_20_480=the 6th S_20_160-2048,
a 7th S_20_480=the 7th S_20_160-2048,
a 8th S_20_480=the 8th S_20_160-2048,
a 9th S_20_480=the 1st S_20_160,
a 10th S_20_480=the 2nd S_20_160,
a 11th S_20_480=the 3rd S_20_160,
a 12th S_20_480=the 4th S_20_160,
a 13th S_20_480=the 5th S_20_160,
a 14th S_20_480=the 6th S_20_160,
a 15th S_20_480=the 7th S_20_160,
a 16th S_20_480=the 8th S_20_160,
a 17th S_20_480=the 1st S_20_160+2048,
a 18th S_20_480=the 2nd S_20_160+2048,
a 19th S_20_480=the 3rd S_20_160+2048,
a 20th S_20_480=the 4th S_20_160+2048,
a 21th S_20_480=the 5th S_20_160+2048,
a 22th S_20_480=the 6th S_20_160+2048,
a 23th S_20_480=the 7th S_20_160+2048,
a 24th S_20_480=the 8th S_20 160+2048.

16. The method of claim 10, wherein:
a 1st S_20_240=the 1st S_20_80-1024,
a 2nd S_20_240=the 2nd S_20_80-1024,
a 3rd S_20_240=the 3rd S_20_80-1024,
a 4th S_20_240=the 4th S_20_80-1024,
a 5th S_20_240=the 1st S_20_80,
a 6th S_20_240=the 2nd S_20_80,
a 7th S_20_240=the 3rd S_20_80,
a 8th S_20_240=the 4th S_20_80,
a 9th S_20_240=the 1st S_20_80+1024,
a 10th S_20_240=the 2nd S_20_80+1024,
a 11th S_20_240=the 3rd S_20_80+1024,
a 12th S_20_240=the 4th S_20_80+1024.

17. An apparatus comprising:
at least one transceiver; and
at least one processor connected to the at least one transceiver,
wherein the at least one processor is configured to:
generate a physical layer protocol data unit (PPDU); and
transmit, through the at least one transceiver, the PPDU to at least one second station (STA) in a 20 MHz bandwidth,
wherein nine 26-tone distributed resource units (DRUs) are defined for the PPDU,
wherein each of the nine 26-tone DRUs comprises a plurality of data tones and two pilot tones, and
wherein an interval between a lowest tone index for the plurality of data tones and a lowest tone index for the two pilot tones is different for each of the nine 26-tone DRUs.

18. An apparatus comprising:
at least one transceiver; and
at least one processor connected to the at least one transceiver,
wherein the at least one processor is configured to:
receive, through the at least one transceiver, a physical layer protocol data unit (PPDU) from a first station (STA) in a 20 MHz bandwidth; and
process the PPDU,
wherein nine 26-tone distributed resource units (DRUs) are defined for the PPDU,
wherein each of the nine 26-tone DRUs comprises a plurality of data tones and two pilot tones, and
wherein an interval between a lowest tone index for the plurality of data tones and a lowest tone index for the two pilot tones is different for each of the nine 26-tone DRUs.

* * * * *